US005663867A

United States Patent [19]
Honda et al.

[11] Patent Number: 5,663,867
[45] Date of Patent: *Sep. 2, 1997

[54] PORTABLE ELECTRONIC APPARATUS HAVING A PLURALITY OF CARD STORAGE PORTIONS FOR REMOVABLY HOUSING A MEMORY CARD

[75] Inventors: Masami Honda; Kazuaki Kawabata, both of Tokyo, Japan

[73] Assignee: Kabushiki Kaisha Toshiba, Kawasaki, Japan

[*] Notice: The term of this patent shall not extend beyond the expiration date of Pat. No. 5,590,024.

[21] Appl. No.: 689,362

[22] Filed: Aug. 8, 1996

Related U.S. Application Data

[62] Division of Ser. No. 239,255, May 6, 1994, Pat. No. 5,590,024.

[30] Foreign Application Priority Data

Jun. 21, 1993 [JP] Japan .................... 5-149544

[51] Int. Cl.⁶ .................... G06F 1/16; H05K 7/16
[52] U.S. Cl. .................... 361/684
[58] Field of Search ............. 364/708.1; 439/152–160, 439/64, 377, 541.5; 361/680–686

[56] References Cited

U.S. PATENT DOCUMENTS

| | | |
|---|---|---|
| 4,479,198 | 10/1984 | Romano et al. . |
| 4,652,976 | 3/1987 | Fushimoto .................... 361/684 |
| 4,903,222 | 2/1990 | Carter et al. . |
| 4,926,291 | 5/1990 | Sarraf . |
| 5,025,211 | 6/1991 | Craft et al. . |
| 5,038,308 | 8/1991 | Le et al. . |
| 5,138,565 | 8/1992 | Satou . |
| 5,199,888 | 4/1993 | Condra et al. . |
| 5,278,730 | 1/1994 | Kikinis .................... 361/686 |
| 5,421,737 | 6/1995 | Chen et al. .................... 439/157 |

FOREIGN PATENT DOCUMENTS

3211758CS  10/1983  Germany .

OTHER PUBLICATIONS

German periodical "Design & Elektronik", edition (vol.) 2 5 of Dec. 8, 1987; pp. 143–145.
German Patent Office, Office Action with English translation.
Toshiba T6600C Portable Personal Computer Reference Manual, 1993.
Toshiba T6400 Series Portable Personal Compuer Reference Manual, 1989.

*Primary Examiner*—Michael W. Phillips
*Attorney, Agent, or Firm*—Limbach & Limbach, LLP

[57] ABSTRACT

A portable electronic apparatus has a box-like case. The case includes a peripheral surface having a card insertion port formed therein. A circuit board is housed in the case. First and second card storage portions are respectively arranged on the upper and lower surfaces of the circuit board. The storage portions are arranged at the same position to oppose each other across the circuit board, and respectively have opening portions formed to oppose the card insertion port. A memory card is detachably housed in the first and second card storage portions through the insertion port and the opening portions. The memory card is arranged parallel to the circuit board when the memory card housed in the storage portions.

5 Claims, 36 Drawing Sheets

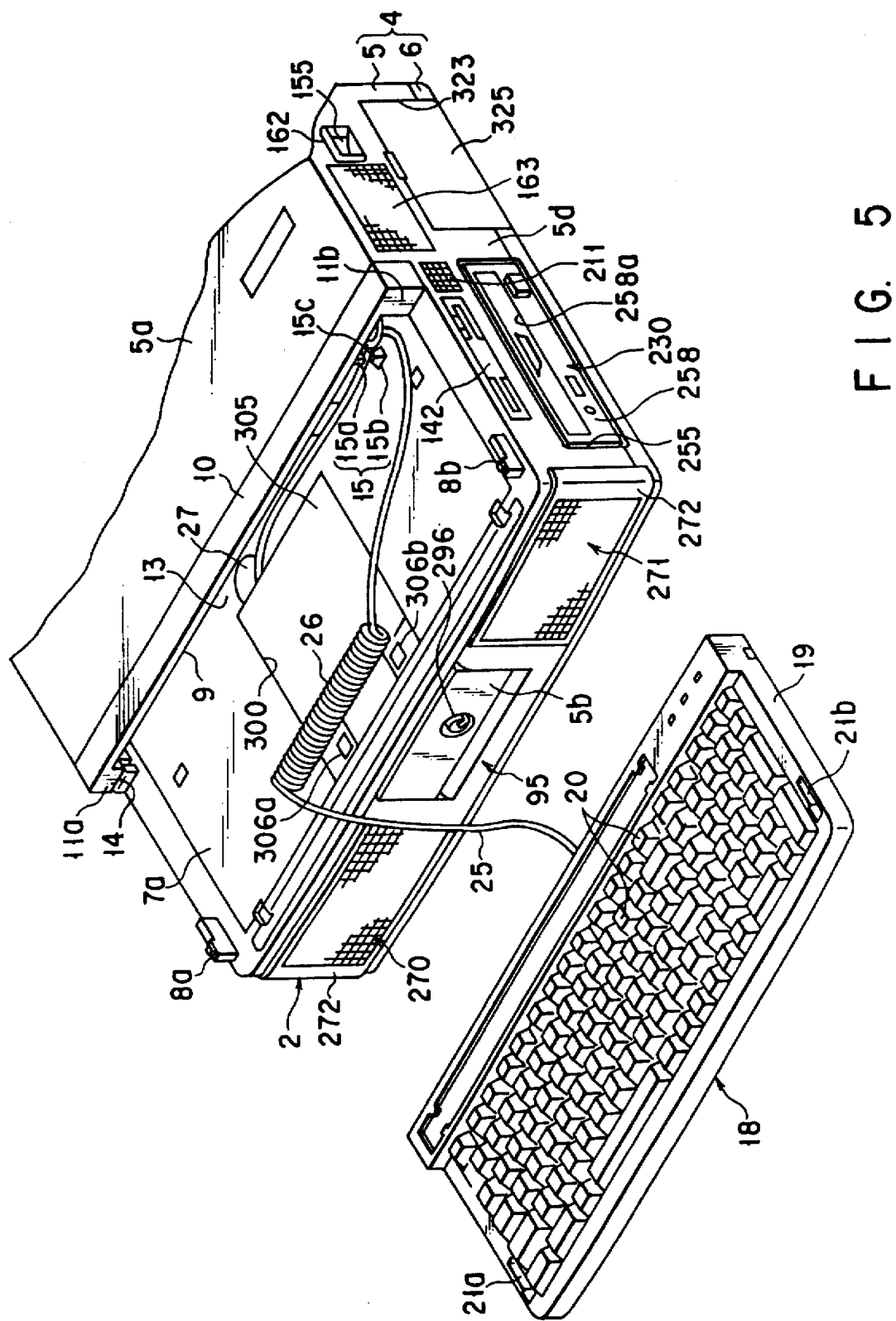
F I G. 5

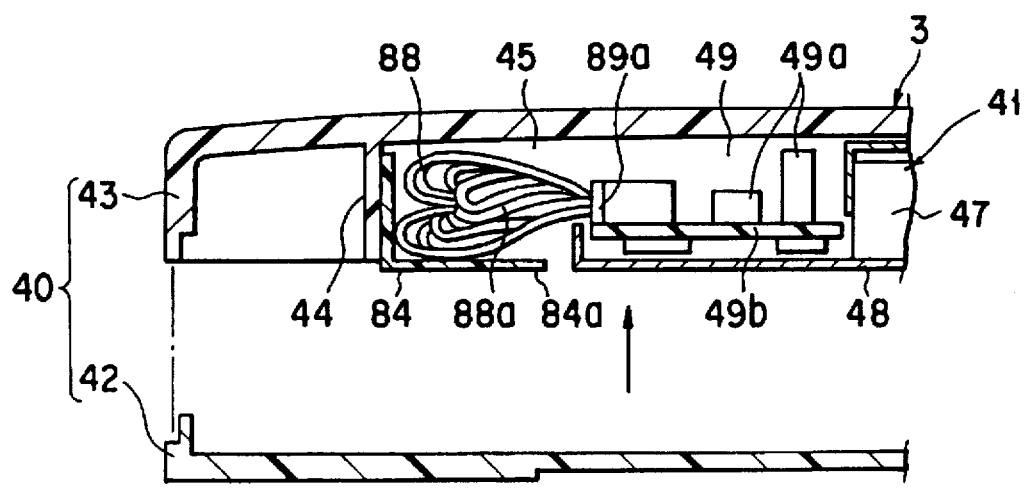
F I G. 16A
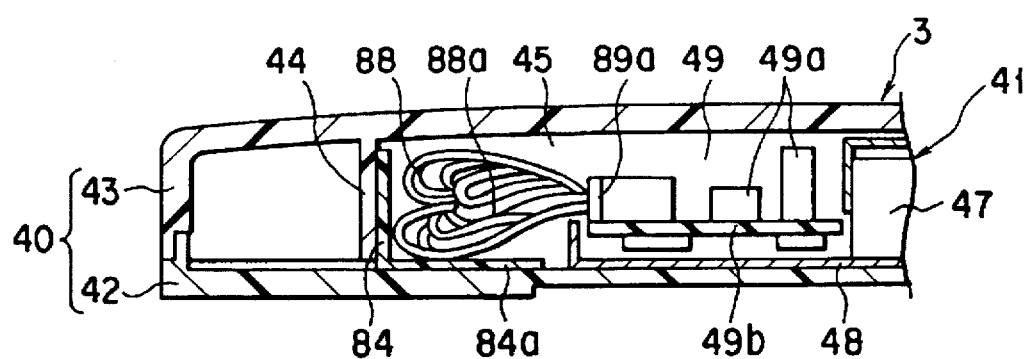
F I G. 16B

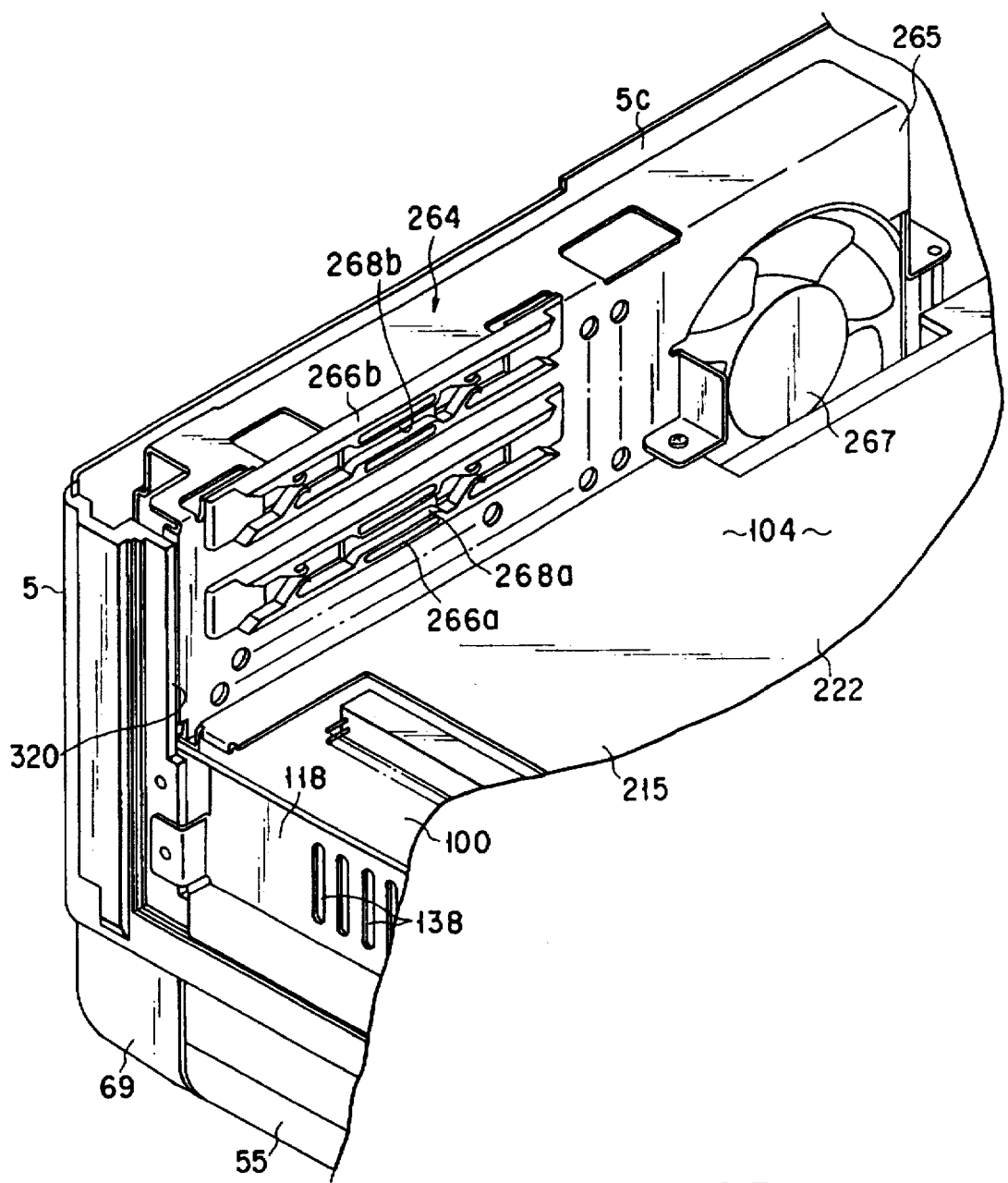
F I G. 25

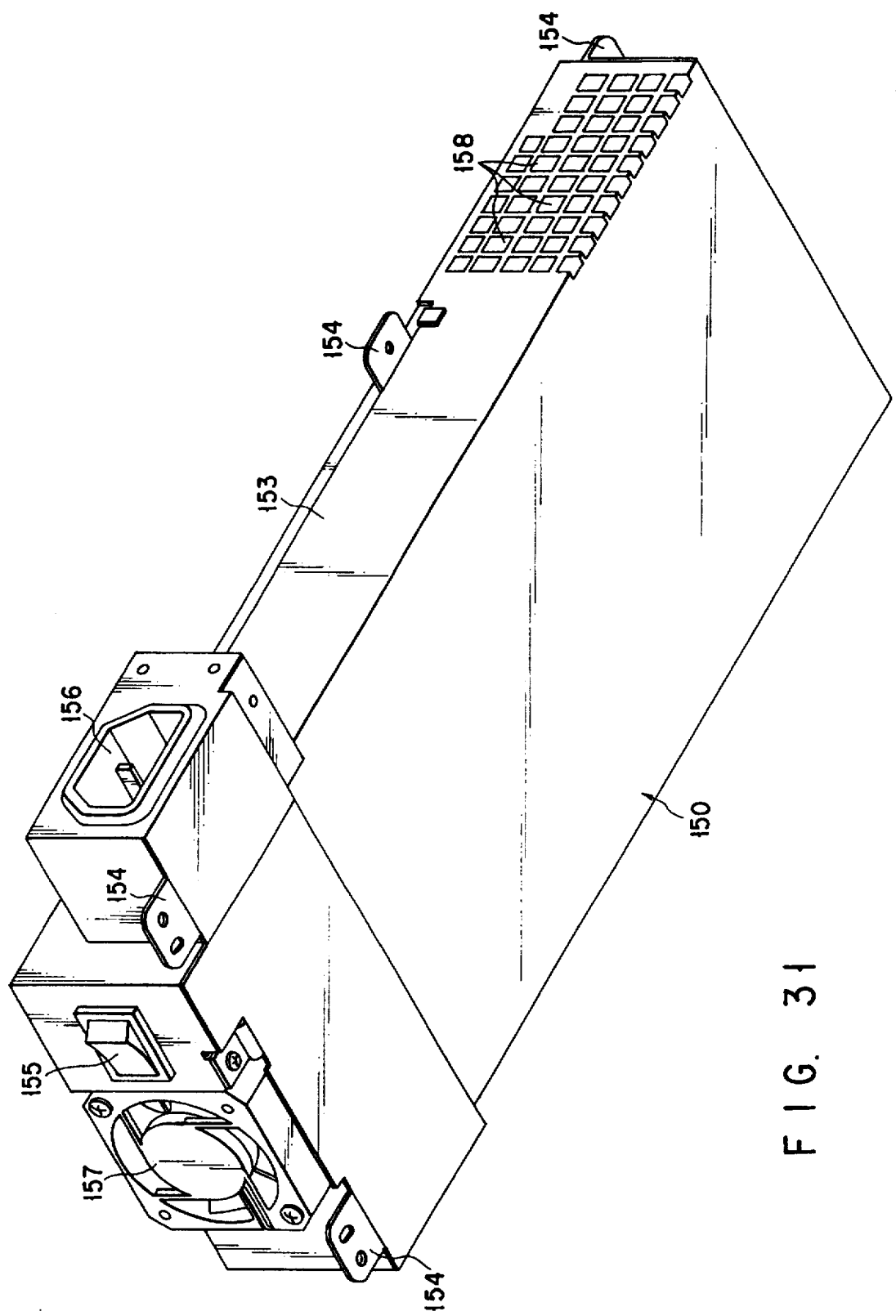
F I G. 31

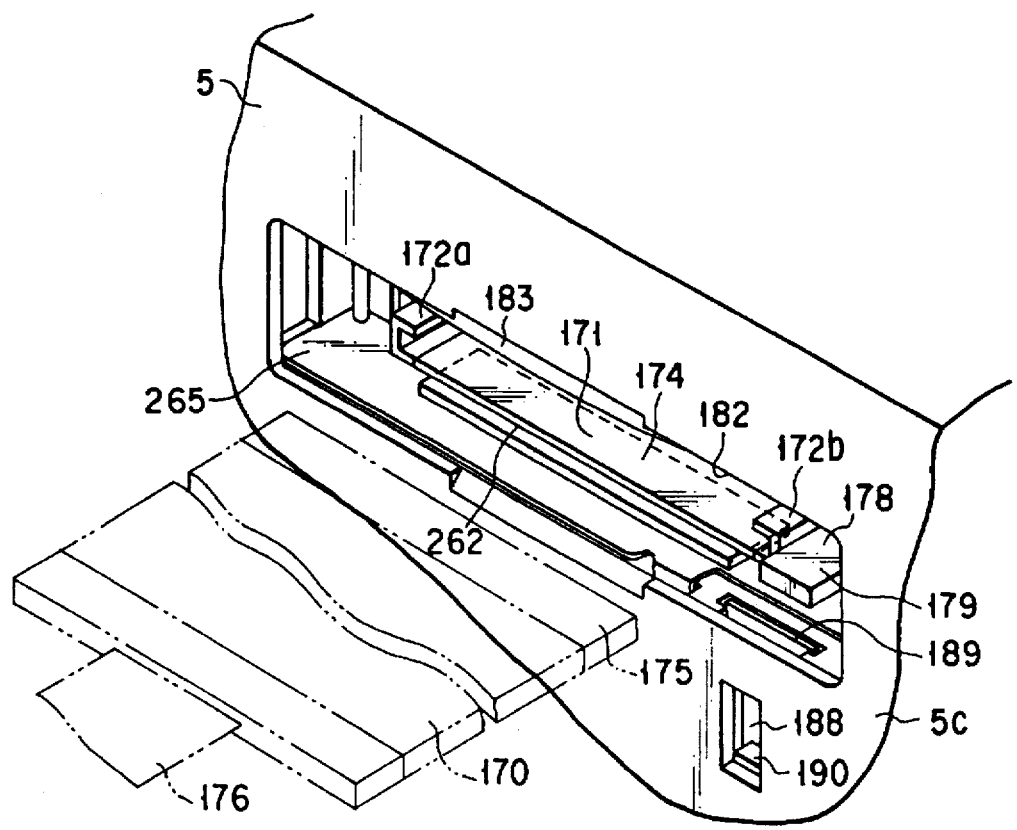
F I G. 34A
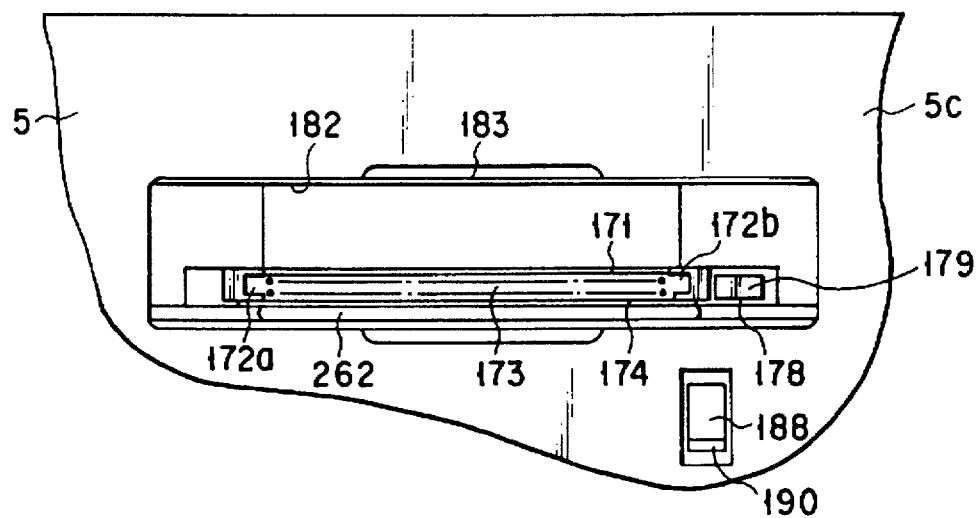
F I G. 34B

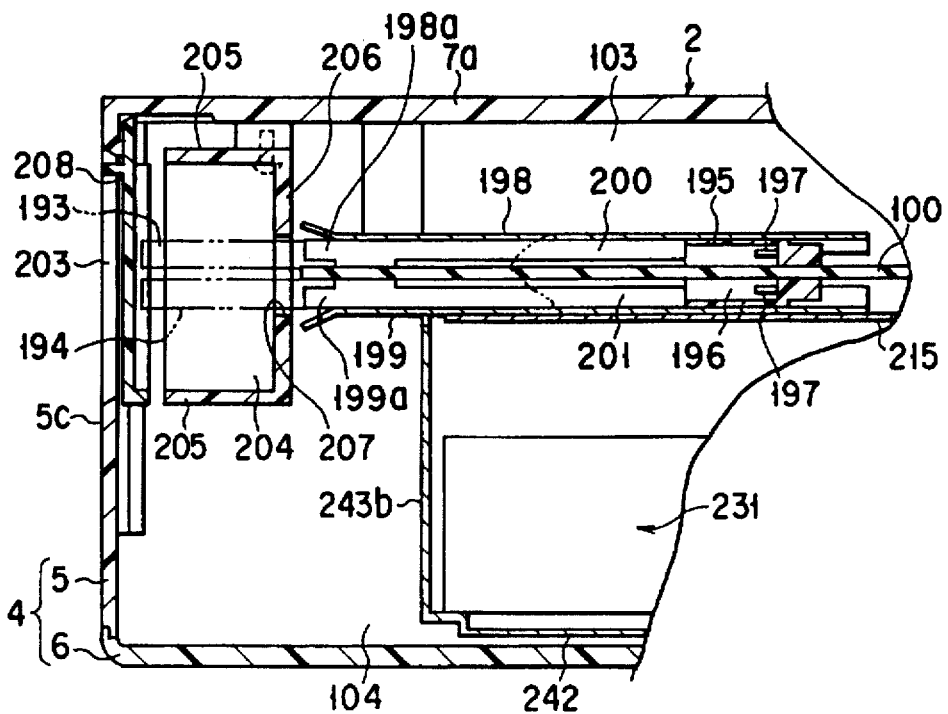
F I G. 36
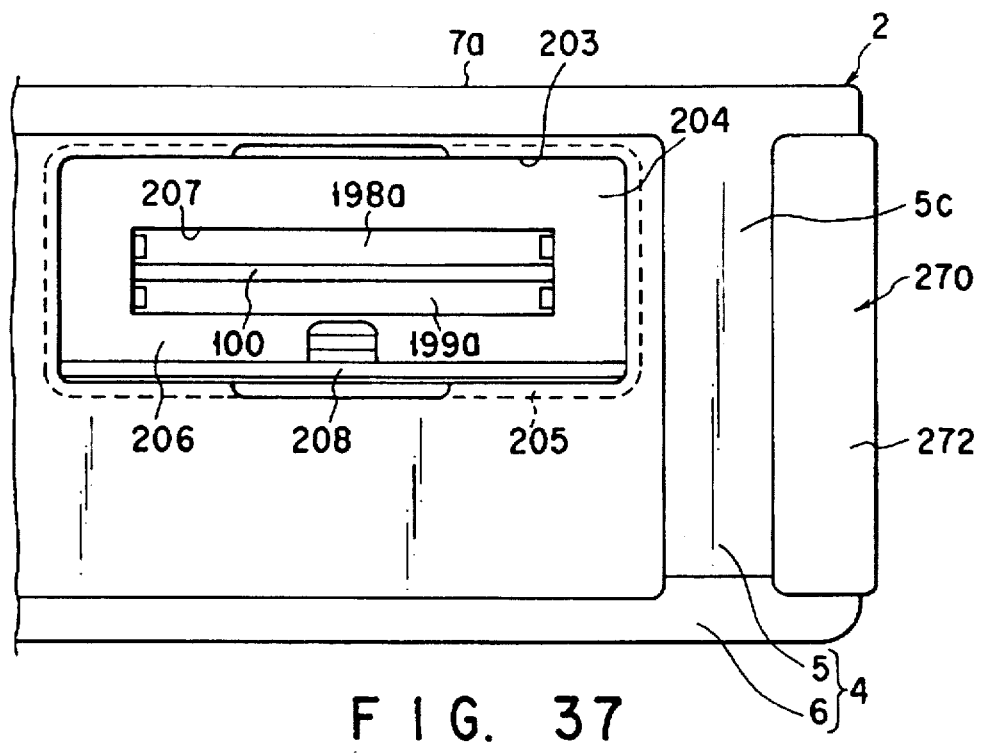
F I G. 37

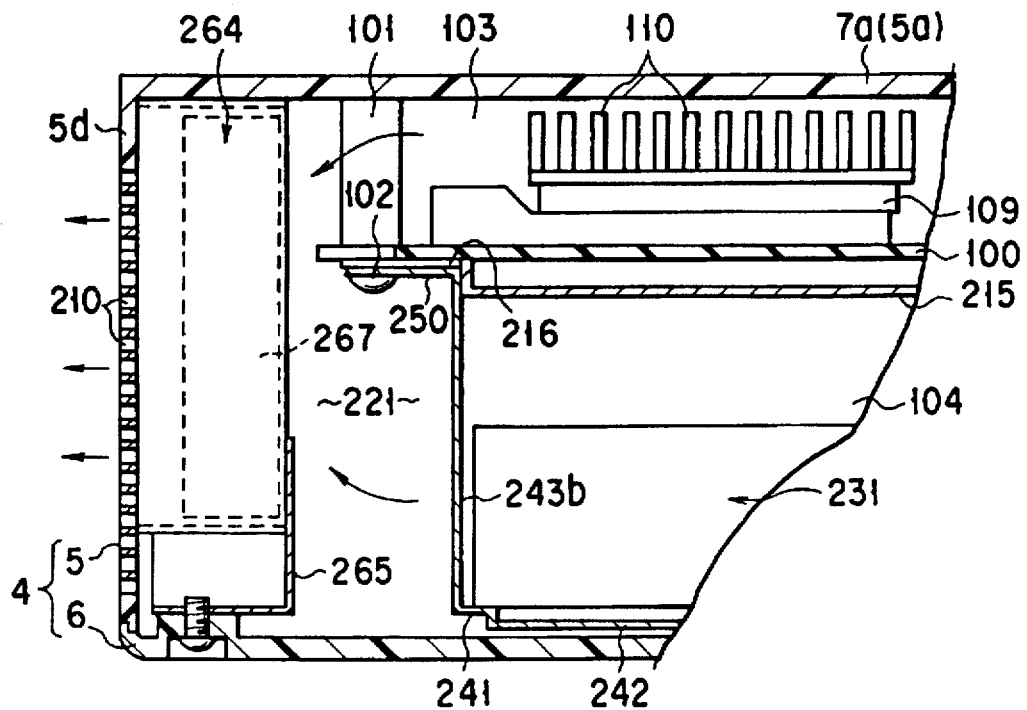
F I G. 38
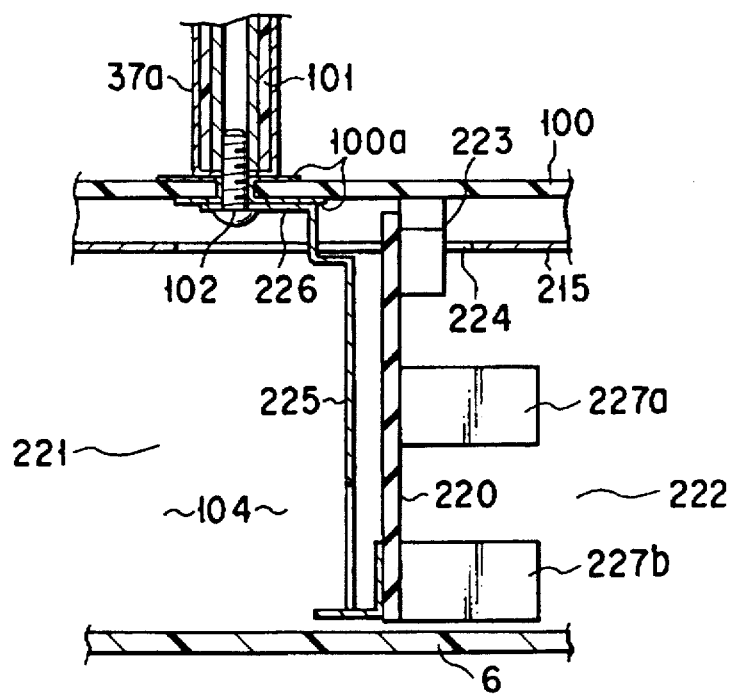
F I G. 39

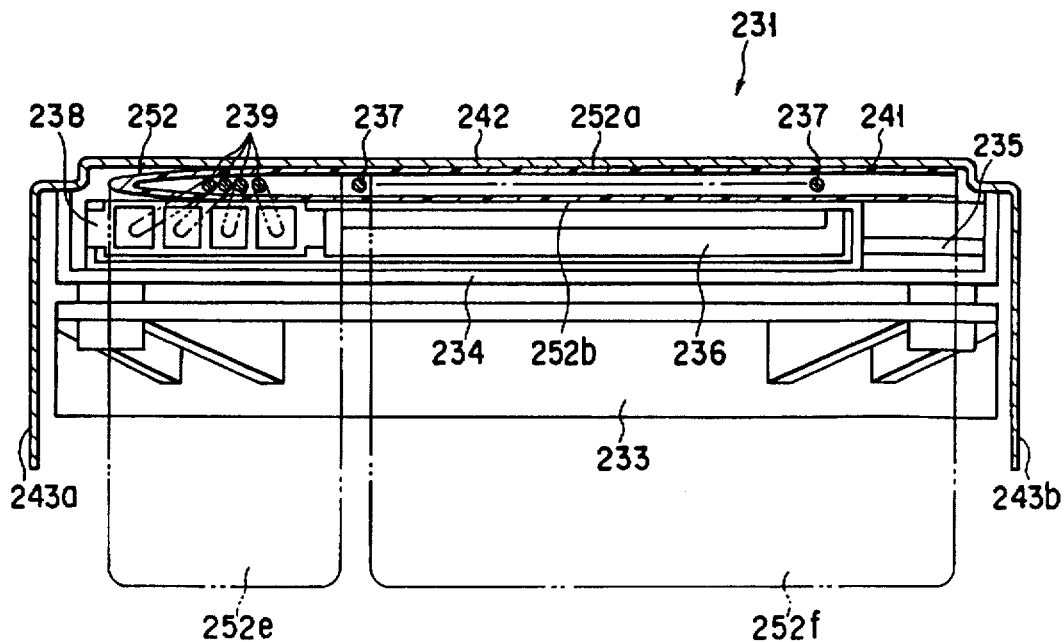
F I G. 41
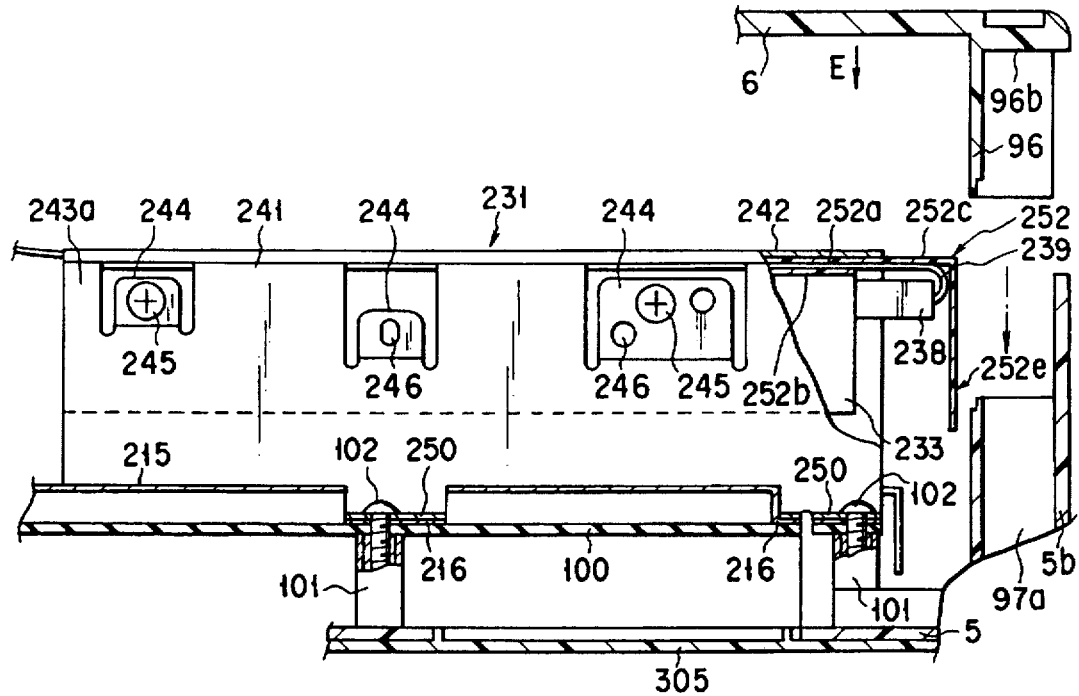
F I G. 42

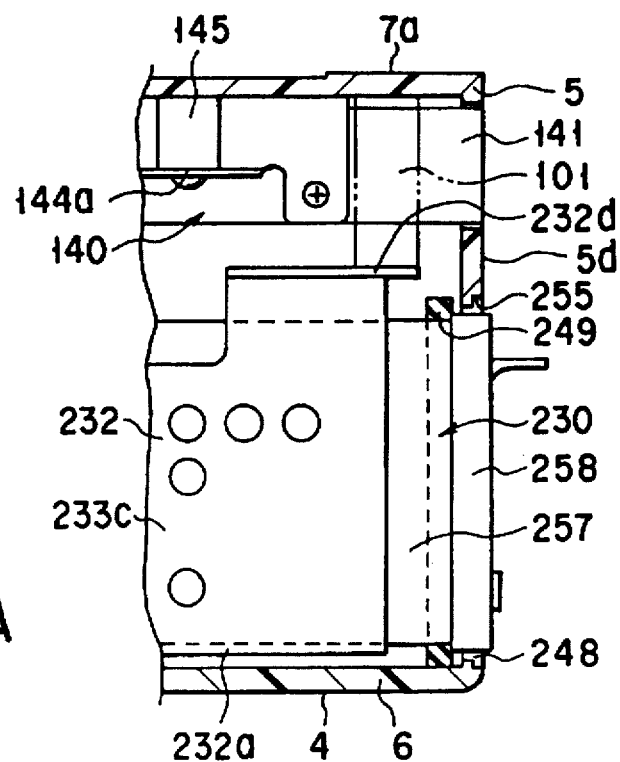
F I G. 46A
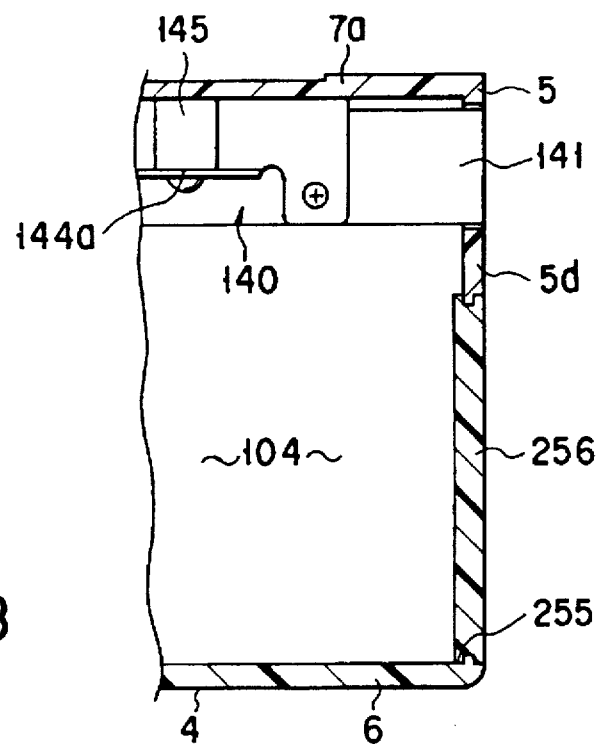
F I G. 46B

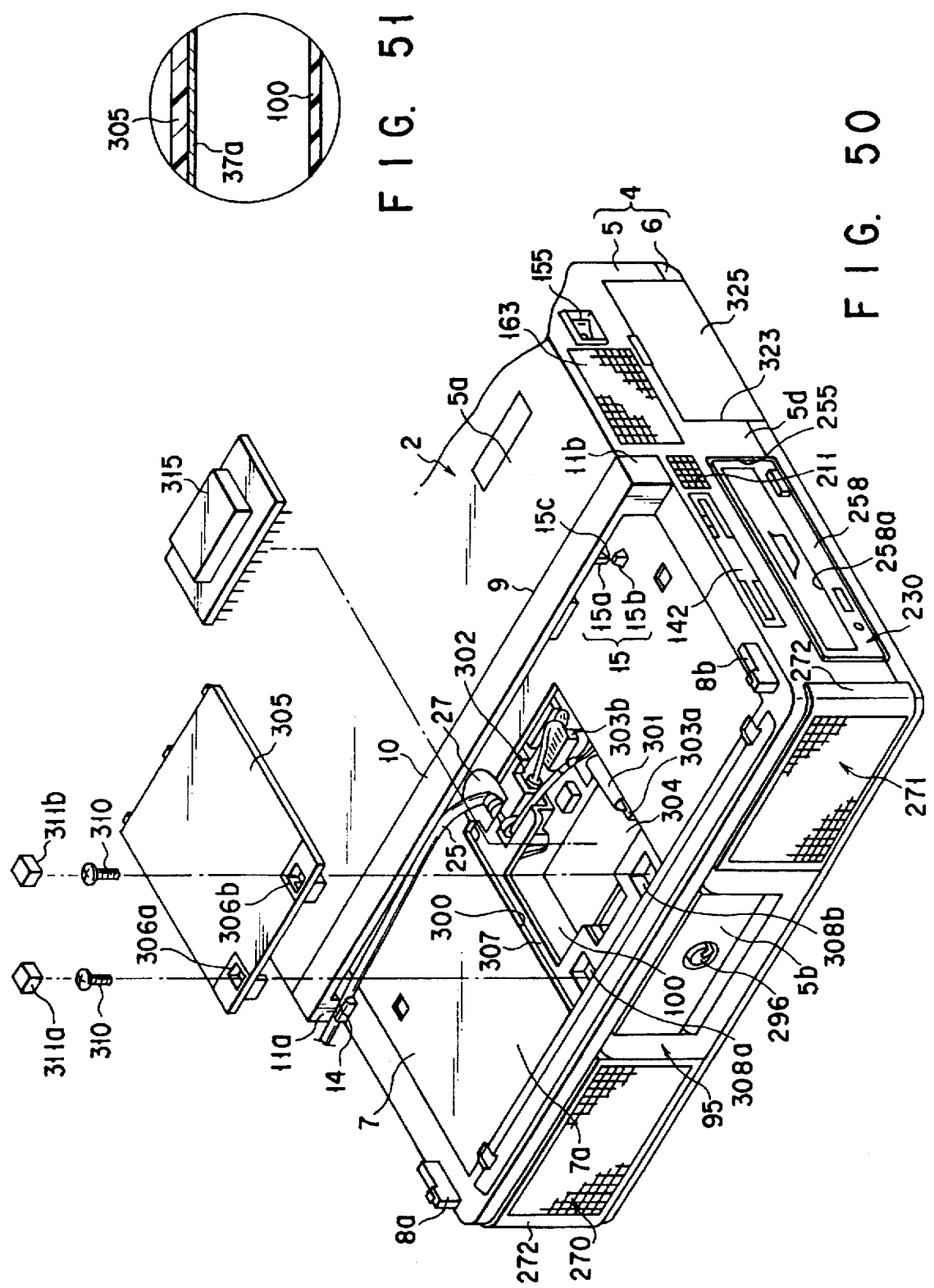

PORTABLE ELECTRONIC APPARATUS HAVING A PLURALITY OF CARD STORAGE PORTIONS FOR REMOVABLY HOUSING A MEMORY CARD

This is a divisional of application Ser. No. 08/239,255, filed May 6, 1994 now U.S. Pat. No. 5,590,024.

BACKGROUND OF THE INVENTION

1. Field of the Invention

The present invention relates to an electronic apparatus such as a portable computer or a wordprocessor and, more particularly, to a structure for increasing the number of optional units such as a compact disk drive and a hard disk drive which can be installed in the case of an electronic apparatus.

2. Description of the Related Art

Various types of high-performance laptop portable computers which can be easily carried have recently been provided. A computer of this type comprises a base unit having a keyboard, and a flat panel type display unit which is mounted on the base unit to be freely opened/closed. The base unit has a case consisting of a synthetic resin material. Functional units such as a floppy disk drive and a power supply unit and a circuit board on which various types of circuit parts such as IC chips are mounted are housed in this case.

In order to prevent an electrical shock and a failure, the case of a conventional computer is designed on the assumption that the case is not disassembled. The above circuit board and functional units are supported on the bottom surface of the case. The circuit parts mounted on the circuit board include parts which generate high-frequency noise while they are in operation. It is known that when this high-frequency noise leaks outside the case, an electric wave trouble or a communication trouble may be caused. For this reason, the inner surface of the case is plated with a conductive material or the circuit board is enclosed with a metal shield plate.

Since a computer of this type is used in a variety of applications, it often has only the minimum necessary functions required for the operation of a computer. For this reason, various types of optional units for functional expansion such as a large-capacity hard disk drive, an expansion card, and a modem unit for communication are prepared for a Conventional computer. Such a computer is designed to selectively mount these optional units in accordance with application purposes. More specifically, a storage space for storing optional units is partly ensured in the rear or side portion of a case. This storage space has insertion ports formed in the bottom or rear surface of the case. Each insertion port is closed by a detachable cover.

According to this arrangement, however, since a storage space for optional units is partly formed in the interior of the case, the case requires partition walls to define the storage space. For this reason, the structure of the case is complicated, and the manufacturing cost increases. The interior of the case is narrowed because of the presence of the partition walls, and escapes for bypassing the partition walls must be provided for a circuit board. In addition, the partition walls interfere with arrangement of various components.

As the number of optional units which can be additionally mounted increases, a larger number of storage spaces must be ensured in the case. Therefore, the number of storage spaces may be limited depending on the size of a case. Consequently, a large number of optional units cannot be additionally mounted, interfering with an improvement in the performance of the computer.

On the other hand, a large-capacity power supply unit and a CPU are housed in the case of the computer. The power supply unit and the CPU generate a large amount of heat while they are in operation. If the heat generated by the power supply unit and the CPU remains in the case, peripheral circuit components are greatly affected by the heat. For this reason, as disclosed in U.S. Pat. No. 4,479,198 issued to Romamo et al., Oct. 23, 1984, a computer having a functional component generating a large amount of heat is designed such that an inlet port for drawing outer air and an exhaust port for exhausting the drawn outer air are formed in a side surface of a case, and a cooling fan is arranged in the case to forcibly cool the functional component.

In addition, as disclosed in U.S. Pat. No. 5,199,888 issued to Condra et at., Apr. 6, 1993, a high-performance computer includes a plurality of expansion connectors for connection of various peripheral devices such as a printer and an external keyboard. These expansion connectors are arranged on a side or rear surface of a case. The expansion connectors are covered with a connector cover while no peripheral devices are connected. This connector cover is supported on the case to be movable between a closing position at which the expansion connectors are covered and an opening position at which the expansion connectors are exposed to the outside of the case.

In the computer having the above arrangement, if expansion connectors are arranged adjacent to the inlet port or the exhaust port formed in the case, when the connector cover is moved to the opening position, the connector cover may overlap the inlet port or the exhaust port. In this case, the inlet port or the exhaust port is closed by the connector cover, and the ventilation in the case is impaired. For this reason, the functional component which generates heat cannot be efficiently cooled.

As a portable computer, a computer having a speaker for outputting an alarm or warning as a sound during an operation of software is known. The speaker has a speaker frame supporting a cone. This speaker frame is supported on the inner surface of the case.

Various functional components such as a floppy disk drive as well as a circuit board are arranged in the case. In addition, since the internal space of the case is limited, the circuit board, the functional components, and the speaker are arranged to be adjacent to each other. For this reason, when the speaker frame is mounted in the case, the fragile cone may interfere with and may be damaged by the circuit board or a functional component, thus posing a problem in mounting the speaker in the case.

The types of portable computers capable of mounting interface cards for communication with external units and application cards storing application programs have been increasing. A computer capable of mounting such a type of card has a card storage portion in the case. This card storage portion has a card insertion port formed in a side surface of the case. A connector to which the card is detachably connected is arranged in the card storage portion. The connector is located at the opposite side to the card insertion port.

The card storage portion has an ejector for guides a card, inserted from the card insertion port, to the connector, and for ejecting the card from the card storage portion. The ejector has a push button to be depressed with a finger tip of an operator when the card is to be removed. The push button is exposed to the card insertion port and is located adjacent to the rear end portion of the card stored in the card storage portion.

According to this arrangement, however, since the push button is exposed to the card insertion port and can be depressed at any time, the push button may be erroneously depressed during an operation of the card. In order to prevent this, a known computer is designed such that a lock pawl which is locked to the trailing end of a card inserted from the card insertion port of the case is arranged at the card insertion port. According to this arrangement, since the card is locked/held in the card storage portion by the lock pawl, even if the push button is erroneously depressed during an operation of the card, removal of the card from the card storage portion can be prevented.

On the other hand, if the card needs to be removed and an operator forgets that the card is locked by the lock pawl, he/she may depress the push button hard. As a result, an excessive force is applied to the ejector, causing an ejector failure or damaging the ejector.

If a computer of this type has first and second card storage portions for loading a plurality of types of memory cards, in addition to the card storage portion for the interface card or the application card, a pair of card connectors to which memory cards are connected are arranged in the card storage portions, respectively. These card connectors are mounted on a main circuit board housed in the case.

In this case, in a computer having only one main circuit board, the pair of card connectors are laterally arranged on the main circuit board on the same plane. Consequently, the first and second card storage portions are also laterally arranged in the case.

According to this arrangement, however, since the first and second card storage portions are laterally arranged, the area occupied by the card storage portions in the case becomes extremely large. This poses a problem in arranging various functional components such as a floppy disk drive in the case. In addition, the first and second card storage portions have card insertion ports formed in a side surface of the case, and the card insertion ports are elongated in the lateral direction. As a result, the card insertion ports occupy a larger proportion of the side surface of the case. Therefore, when expansion connectors and the like are to be arranged on the side surface of the case, the arrangement of the connectors and the like are undesirably limited by the presence of the card insertion ports.

A portable computer has a display unit having a display. As disclosed in U.S. Pat. No. 5,103,377 issued to Kobayashi et al., Apr. 7, 1992 or U.S. Pat. No. 5,090,913 issued to Kobayashi, Feb. 25, 1992, this display unit is supported on the case to be pivotal between a closing position at which the unit covers a keyboard disposed on the upper surface of the case and an opening position at which the unit stands upright behind the keyboard. The display unit has leg portions extending toward the case, and the case has leg mount portions for receiving the leg portions. The leg portions are pivotally coupled to the leg mount portions via hinge mechanisms. In addition, the display is electrically connected to a circuit board, arranged in the case, via a cable. The cable is arranged between the leg portions and the leg mount portions. In this arrangement, the inner surface of the display unit including the leg portions and the inner surface of the case are covered with conductive layers. With this structure, noise from the cable for handling high-speed electrical signals can be sealed in the computer.

However, there are spaces between the leg portions and the leg mount portions, and the cable is exposed to the outside through these spaces. For this reason, in spite of the fact that the display unit and the case have an electromagnetic shield function, noise generated by the cable sometimes leaks to the outside of the computer through the spaces, posing a problem in realizing countermeasures against electromagnetic noise.

SUMMARY OF THE INVENTION

The present invention has been made in consideration of the above situation, and has as its first object to obtain a structure, in a portable electronic apparatus capable of mounting optional units in its case, which can ensure a sufficient space for mounting optional units without impairing the electromagnetic shield function of the case, facilitates additional mounting of optional units, and can simplify the structure of the case.

It is the second object of the present invention to provide a structure, in a portable electronic apparatus, which can sufficiently ensure the ventilation of the interior of a case by preventing a connector cover from closing a vent of the case when the connector cover is opened.

It is the third object of the present invention to obtain a structure, in a portable electronic apparatus having a speaker mounted in a case, which facilitates mounting of the speaker and can prevent damage to the speaker.

It is the fourth object of the present invention to obtain a structure, in a portable electronic apparatus capable of mounting a card-like electronic component, which can prevent the card-like electronic component from being erroneously removed while the component is used, and can also prevent an excessive force from being applied to an ejector for ejecting the card-like electronic component, thereby preventing damage to the ejector.

It is the fifth object of the present invention to obtain a structure, in a portable electronic apparatus capable of mounting a plurality of card-like electronic components, which allows compact card storage portions for storing the card-like electronic components to be arranged in a case to realize a reduction in the size of the case, and can increase the degree of freedom in arranging other components such as connectors and switches on the peripheral surface of the case.

It is the sixth object of the present invention to obtain a structure, in a portable electronic apparatus having a cable arranged between a display unit and a case, which can reliably shield noise leaking from the cable.

In order to achieve the first object, according to the present invention, there is provided a portable electronic apparatus comprising a case made of a synthetic resin material, the case including a box-like body having a detachable bottom cover, and the body and the bottom cover having inner surfaces covered with electromagnetic shield means, a main circuit board housed in the case, the main circuit board partitioning the case into an upper mount area and a lower mount area, having an upper surface opposing the upper mount area and a lower surface opposing the lower mount area, and having a circuit component, which generates noise during an operation, arranged on the upper surface, a conductive shield plate covering the lower surface of the main circuit board, the shield plate being electrically connected to the electromagnetic shield means and surrounding the upper mount area together with the electromagnetic shield means, and an optional component arranged in the lower mount area, the optional component being exposed to the outside of the case and capable of being removed from the case when the bottom cover is removed.

According to this arrangement, the lower mount area on which optional components are arranged is determined by the space defined by the main circuit board and the bottom cover of the case. For this reason, the entire space below the main circuit board can be used as an expansion space for the optional components. In addition, since no partition walls for defining an expansion space are required in the case, the shape of the case can be simplified. In this case, the upper mount area is enclosed with the shield plate and the electromagnetic shield means which are electrically connected to each other. Therefore, noise generated by circuit components can be shielded, and leakage of noise from the case can be prevented.

Furthermore, according to the above arrangement, when the bottom cover is removed, the entire lower mount area is exposed. For this reason, an optional component can be easily arranged without disassembling the case and removing the main circuit board.

In order to achieve the second object, according to the present invention, there is provided a portable electronic apparatus comprising a box-like case having a peripheral surface in which a vent and a connector exposure port are formed side by side, the vent causing the outside and inside of the case to communicate with each other, a circuit component which is housed in the case and generates heat during an operation, and a connector cover arranged on the peripheral surface of the case and supported to be movable between a first position at which the cover closes the connector exposure port and a second position at which the cover overlaps an opening portion of the vent in the peripheral surface to open the connector exposure port, the connector cover having a communicating hole which communicates with the vent when the connector cover is moved to the second position.

According to this arrangement, when the connector cover is moved to the second position, the communicating hole of the connector cover serves as a vent. Hence, the vent is not closed by the connector cover. Therefore, the ventilation in the case can be maintained to prevent heat generated by circuit components from remaining in the case.

In order to achieve the third object, according to the present invention, there is provided a portable electronic apparatus comprising a box-like case including a peripheral surface having a speaker mount portion, various functional components including a circuit board housed in the case, the functional components being arranged adjacent to the speaker mount portion, and a speaker unit detachably mounted on the speaker mount portion, the speaker unit including a support panel detachably mounted on the speaker mount portion and having a communicating hole for causing the inside and outside of the case to communicate with each other, and an inner surface exposed inside the case, and a speaker supported on the inner surface of the support panel and including a speaker frame and a cone supported on the speaker frame and opposing the communicating hole, the speaker being supported on the support panel before the support panel is mounted on the speaker mount portion so that the speaker unit is assembled as one module in advance.

According to this arrangement, the speaker can be mounted on the support panel in a wide place outside the case. For this reason, the cone of the speaker does not easily interfere with functional components in the case, and good workability can be ensured to reduce damage to the cone, as compared with the case wherein the speaker is mounted, as a single unit, on the peripheral surface of the case.

In order to achieve the fourth object, according to the present invention, there is provided a portable electronic apparatus comprising a box-like case having a card storage portion in which a card-like electronic component can be stored, and a peripheral surface having a card insertion port communicating with the card storage portion, an ejector, arranged in the card storage portion, for ejecting the card-like electronic component from the card storage portion, the ejector having an ejector operating member exposed to the card insertion port and located adjacent to the card-like electronic component, and a lock member supported on the case to be movable between a first position at which the ejector operating member is covered and a second position at which the ejector operating member is exposed, the lock member having a lock portion which is locked to the card-like electronic component inserted in the card storage portion when the lock member is moved to the first position.

According to this arrangement, when a card-like electronic component is mounted in the card storage portion, and the lock member is moved to the first position, the ejector operating member is covered with the lock member to inhibit an operator from depressing the ejector operating member with his/her finger tip. This prevents an erroneous operation of ejecting a card-like electronic component from the card storage portion while the card is used. In addition, there is no possibility that the operator pushes the ejector operating member with a large force, forgetting that the card-like electronic component is locked, thereby protecting the ejector from damage and failure.

Furthermore, even if an external force is applied to the card-like electronic component to remove it from the card insertion port, the component is held in the card storage portion by the lock member. Therefore, the card-like electronic component can be prevented from removal from the card storage portion.

In order to achieve the fifth object, according to the present invention, there is provided a portable electronic apparatus comprising a case having a bottom surface, an upper surface opposing the bottom surface, and a peripheral surface continuous with the bottom surface and the upper surface, the peripheral surface having an card insertion port formed therein, a circuit board housed in the case to be parallel to the bottom surface and the upper surface, the circuit board having upper and lower surfaces, and first and second card storage portions which are respectively arranged on the upper and lower surfaces of the circuit board and in which card-like electronic components are removably stored to be parallel to the circuit board, the first and second card storage portions being arranged at the same position to oppose each other through the circuit board and respectively having opening portions formed to oppose the card insertion port.

According to this arrangement, the first and second card storage portions are arranged in a stacked state in the direction of thickness of the case. Card-like electronic components stored in the first and second card storage portions have very small thicknesses as compared with their widths. Even if, therefore, these components are stored in the card storage portions, the overall thickness in the vertical direction is small. For this reason, the space occupied by the card storage portions in the case is small, as compared with the case wherein the two card storage portions are laterally arranged, thus realizing a compact case.

In addition, since the opening portions of the card storage portions are vertically arranged, the size of each card insertion port formed in the peripheral surface of the case can be reduced in the lateral direction. Therefore, the card insertion ports occupy a small proportion of the peripheral surface of the case, increasing the freedom in arranging connectors and switches on the peripheral surface.

In order to achieve the sixth object, according to the present invention, there is provided a portable electronic apparatus comprising a case made of a synthetic resin material and having a leg mount portion on an upper surface thereof, the case having an inner surface covered with electromagnetic shield means, a circuit board which is housed in the case and on which a circuit component which generates noise during an operation is mounted, a display unit having a display and a leg portion coupled to the leg mount portion, a conductive guide tube extending between the leg mount portion and the leg portion, the guide tube having one end portion introduced into the case through the leg mount portion, and the one end portion being electrically connected to the electromagnetic shield means, and a cable for electrically connecting the display to the circuit board, the cable extending through the guide tube and being arranged between the case and the display unit.

According to this arrangement, since the cable for transmitting electrical signals is covered with the guide tube at the portions where the cable extends between the leg portions and the leg mount portions, noise leaking from the cable can be shielded by the guide tube. In addition, since the guide tube is grounded to the case via the electromagnetic shield means, leakage of noise from the spaces between the leg portions and the leg mount portions can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 1A to 51 show a laptop computer according to an embodiment of the present invention, in which FIG. 1A is a sectional view of the laptop computer;

FIG. 1B is an enlarged sectional view of a portion IA in FIG.

FIG. 1C is an enlarged sectional view of a portion IB in FIG. 1A;

FIG. 2 is a sectional view taken along a line II—II in FIG. 1A;

FIG. 3 is a perspective view of the computer in a state wherein a display unit is pivoted to an opening position;

FIG. 4 is a perspective view of the computer in a state wherein the display unit is pivoted to the opening position, and a keyboard unit is removed from a base unit;

FIG. 5 is a perspective view showing a state wherein the keyboard unit is removed from the base unit;

FIG. 6 is a perspective view of the keyboard unit;

FIG. 7 is a side view of the keyboard in a tilt-up state;

FIG. 8 is a left side view of the computer in a state wherein the display unit is pivoted to the opening position;

FIG. 9 is a perspective view showing a state wherein the display unit is pivoted to a closing position to fold the computer into a box-like shape;

FIG. 10 is a perspective view of the display unit in a state wherein a front panel is removed therefrom;

FIG. 11 is an enlarged perspective view of a portion XI in FIG. 10;

FIG. 12 is a sectional view showing a wiring portion of a cable extending between the base unit and the display unit;

FIG. 13 is a sectional view taken along a line XIII—XIII in FIG.

FIG. 15 is a plan view of a connecting portion between the cable and a liquid crystal display in the display unit;

FIG. 16A is a sectional view of the display unit in a state wherein a front panel is to be stacked on a rear panel;

FIG. 16B is a sectional view showing a state wherein the front panel is stacked on the rear panel to assemble the housing of the display unit;

FIG. 17 is a plan view showing a connecting portion between the cable and a converter circuit in the display unit;

FIG. 19 is a sectional view taken along a line XIX—XIX in FIG. 12;

FIG. 20 is an exploded perspective view of the computer in a state wherein a case body is removed from a bottom cover;

FIG. 21 is a perspective view of the computer in a state wherein a lower mount area is exposed;

FIG. 22 is a side view of a main circuit board;

FIG. 23 is an exploded perspective view showing the positional relationship between the main circuit board and a connector board;

FIG. 24 is a perspective view of the computer in a state wherein the bottom cover and the rear panel are removed from the case body;

FIG. 25 is a perspective view showing a mount portion of a cooling fan;

FIG. 26 is a perspective view of the computer in a state wherein a connector cover is open;

FIG. 27 is a perspective view of the computer in a state wherein the connector cover is kept closed;

FIG. 28 is a sectional view of the rear portion of the computer in a state wherein the connector cover is open;

FIG. 29 is a sectional view of the rear portion of the computer in a state wherein the connector cover is kept closed;

FIG. 30 is a rear view of the computer in a state wherein the rear panel is removed to expose the lower mount area;

FIG. 31 is a perspective view of a power supply unit;

FIG. 32 is a perspective view of the right rear end portion of the computer;

FIG. 33 is a sectional view of a card storage portion in the case;

FIG. 34A is a perspective view of the computer in a state wherein a shutter plate is opened to expose the card storage portion;

FIG. 34B is a side view of the computer in a state wherein the shutter plate is opened to expose the card storage portion;

FIG. 36 is a sectional view of a memory card mount portion in the case;

FIG. 37 is a side view of the memory card mount portion in the case;

FIG. 38 is a sectional view of a mount portion of a fan unit in the case;

FIG. 39 is a sectional view of a mount portion of an expansion circuit board in the case;

FIG. 40 is an exploded perspective view of an HDD assembly;

FIG. 41 is a sectional view of the HDD assembly;

FIG. 42 is a sectional view showing a state wherein the HDD assembly is mounted in the lower mount area in the case;

FIG. 43 is a plan view showing a state wherein the HDD assembly is mounted in the lower mount area in the case;

FIG. 44 is an exploded perspective view of a CD drive and a bracket;

FIG. 45 is a perspective view showing a state wherein the CD drive is mounted in the lower mount area in the case;

FIG. 46A is a sectional view showing a state wherein the CD drive is mounted in the lower mount area in the case;

FIG. 46B is a sectional view showing a state wherein an opening portion of the case is covered with a cover;

FIG. 47 is an exploded perspective view showing a state wherein a speaker unit is removed from the case body;

FIG. 48 is a sectional view showing a state wherein the speaker unit is mounted on the case body;

FIG. 49 is an exploded perspective view of the speaker unit;

FIG. 50 is an exploded perspective view showing a state wherein an opening/closing cover is removed from a keyboard mount portion of the case; and FIG. 51 is a sectional view showing the positional relationship between the opening/closing cover and the circuit board.

DETAILED DESCRIPTION OF THE PREFERRED EMBODIMENTS

A laptop portable computer according to an embodiment of the present invention will be described below with reference to the accompanying drawings.

Figure 3:
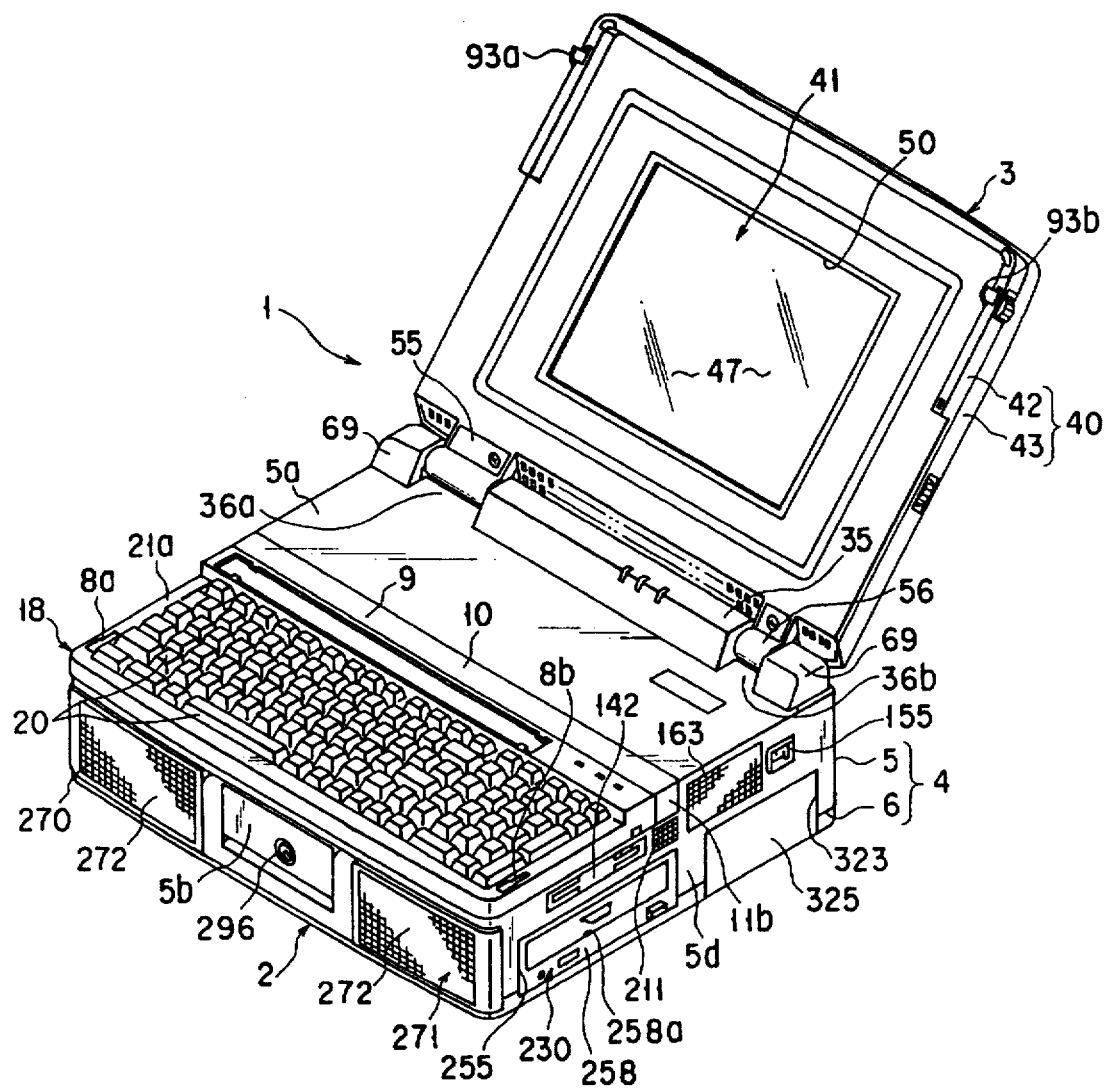

FIG. 3 shows the outer appearance of a portable computer 1. The portable computer 1 comprises a base unit 2 and a flat panel type display unit 3.

Figure 1:
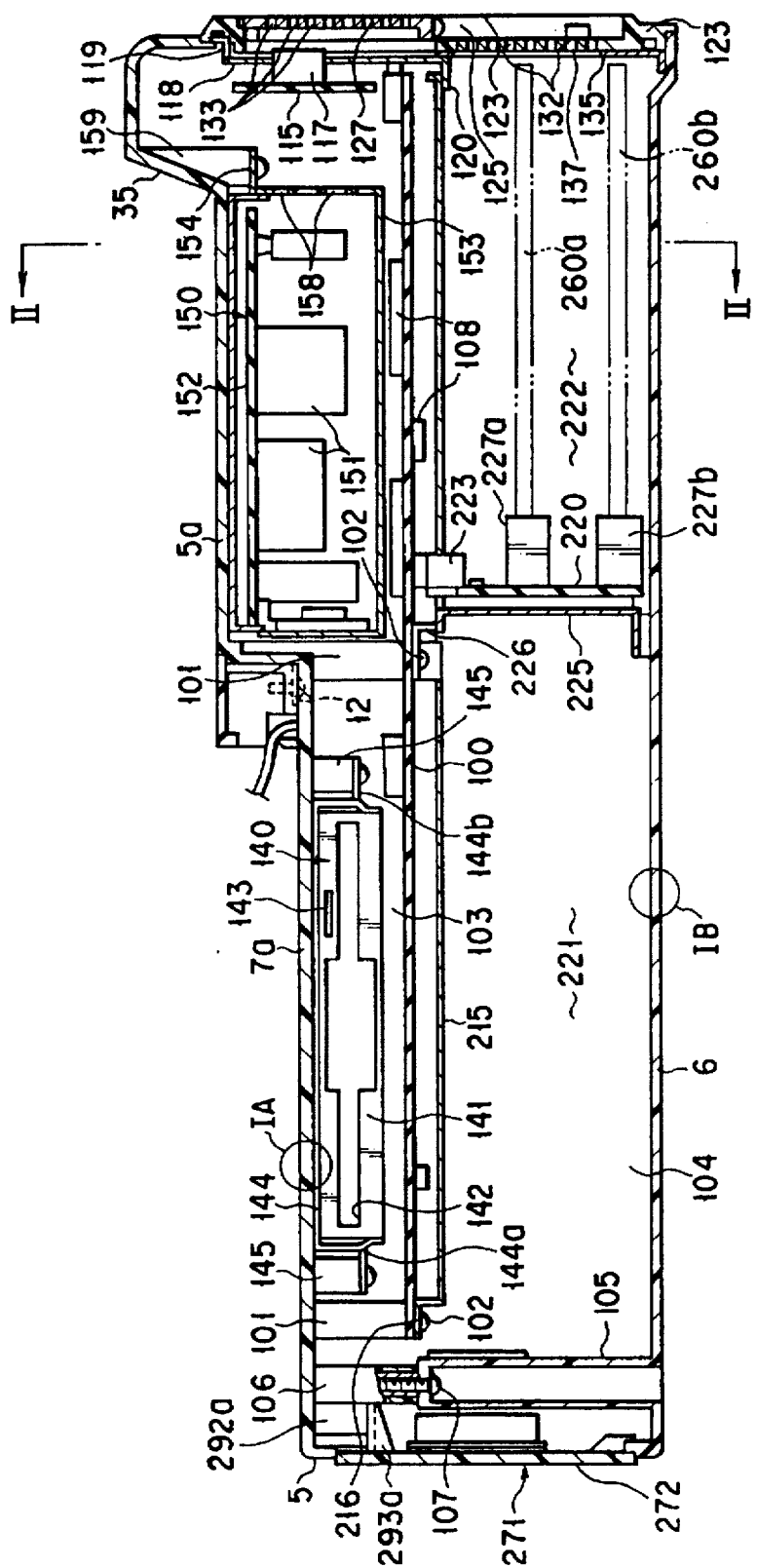
Figure 20:
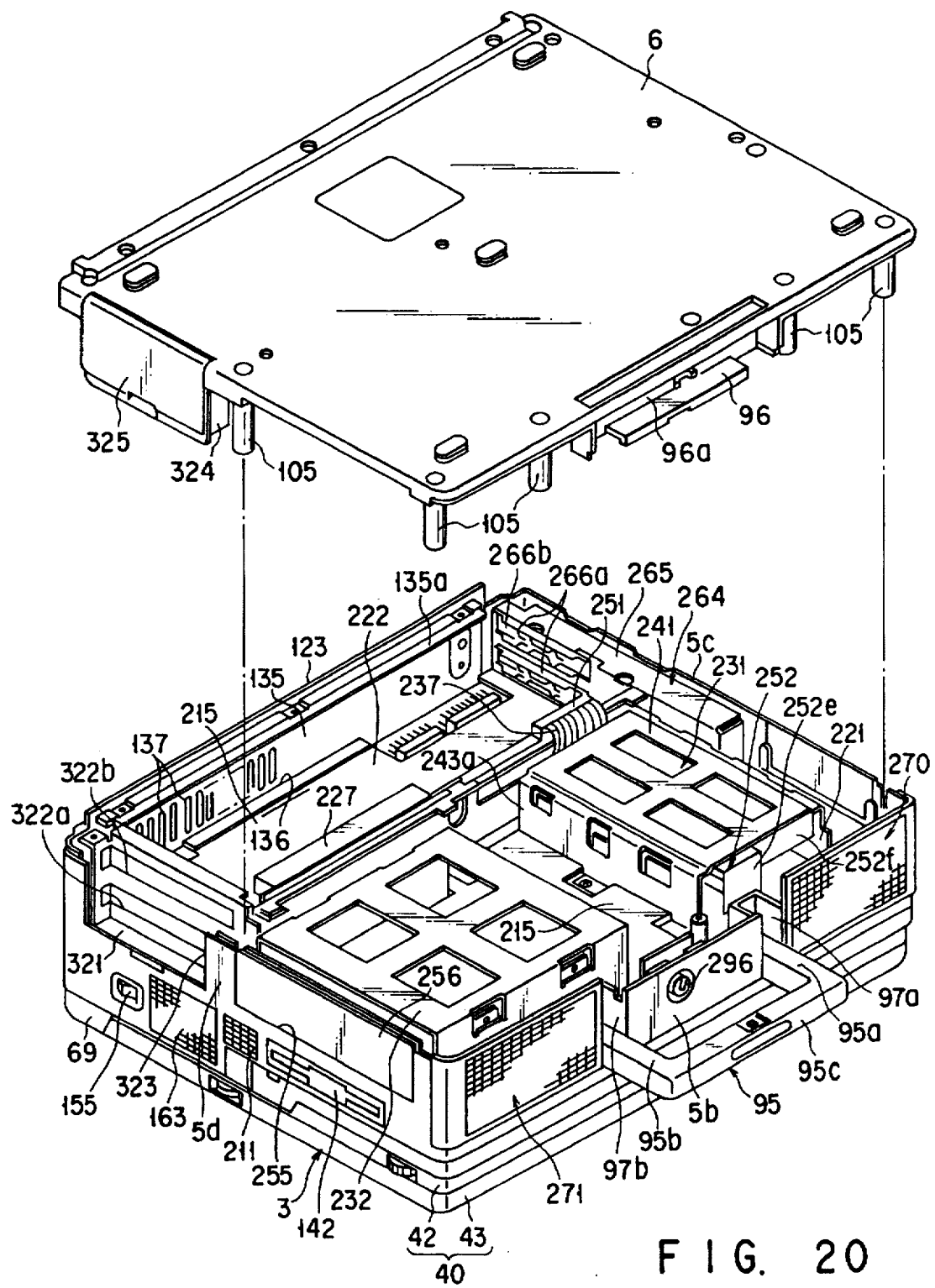

The base unit 2 has a box-like case 4. As shown in FIGS. 1A and 20, the case 4 is divided into two parts, i.e., a case body 5 and a bottom cover 6. The entire bottom and rear surfaces of the case body 5 are open. The rear surface is continuous with the bottom surface. The bottom cover 6 covers the opening portion on the bottom surface of the case body 5. The case body 5 and the bottom cover 6 are made of a synthetic resin material such as an ABS resin. The case 4 of this embodiment is colored in a whitish color.

Figure 4:
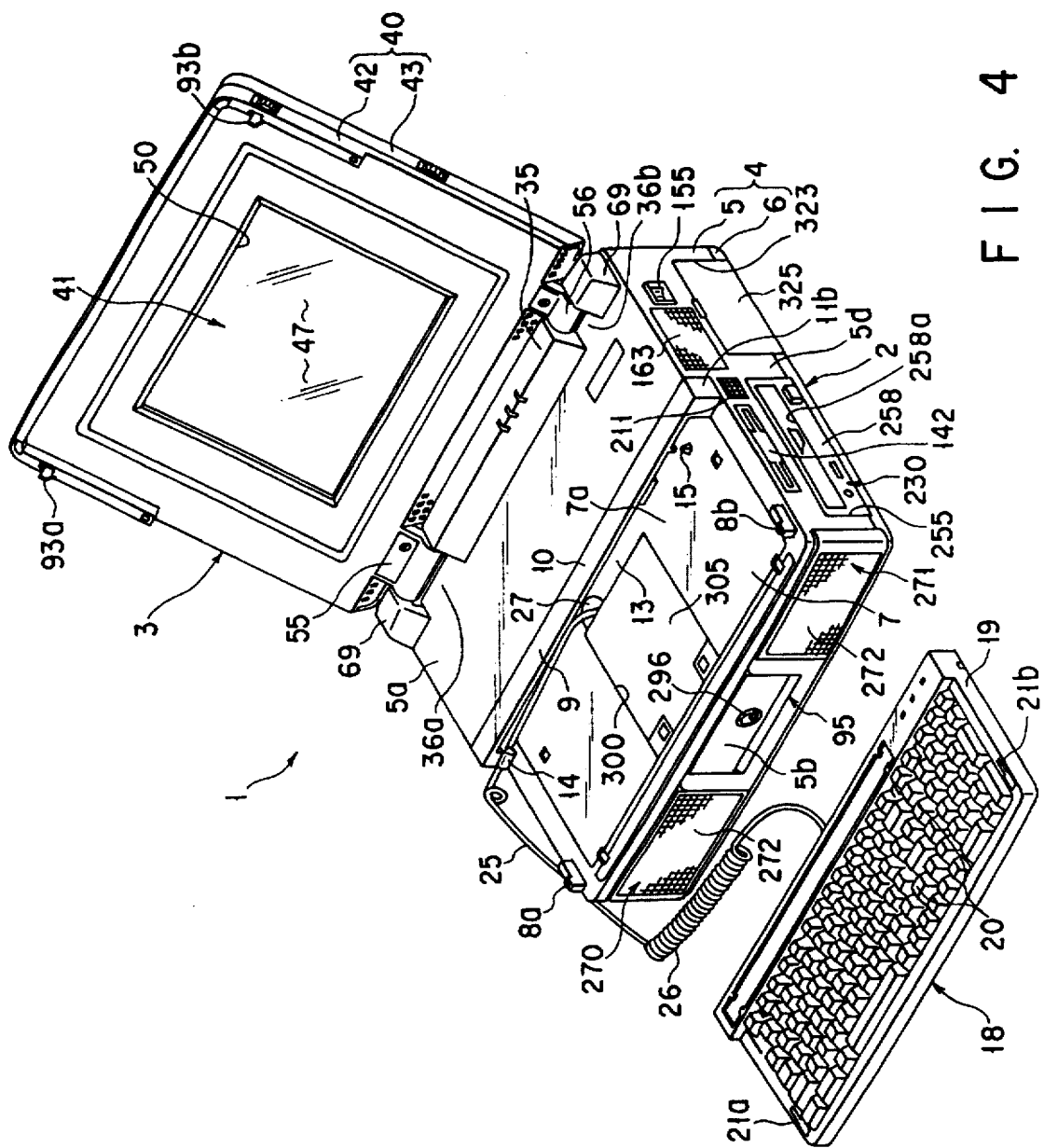

The case body 5 has a flat upper wall 5a, a front wall 5b, and left and right side walls 5c and 5d. The latter three walls are continuous with the upper wall 5a. As shown in FIG. 4, a keyboard mount portion 7 is formed on the front half of the upper wall 5a. The keyboard mount portion 7 has a flat mount surface 7a which is lower in level than the rear half of the upper wall 5a. The mount surface 7a is open and continuous with the front wall 5b and the left and right side walls 5c and 5d of the case body 5. Positioning projections 8a and 8b are formed upright on the left and right side portions of the front end of the mount surface 7a.

As shown in FIG. 5, a cord guide 9 is mounted on the rear end portion of the keyboard mount portion 7. The cord guide 9 has an upper wall portion 10 which is continuous with the rear half of the upper wall 5a on the same plane. The upper wall portion 10 has a length equal to the total width of the case body 5. Seat portions 11a and 11b are respectively formed on the left and right end portions of the upper wall portion 10. The seat portions 11a and 11b are fixed to the upper wall 5a via screws 12 shown in FIG. 1A. The left and right side surfaces of the seat portions 11a and 11b are continuous with the left and right side walls 5c and 5d of the case body 5 on the same plane.

A cord storage portion 13 is formed between the upper wall portion 10 of the cord guide 9 and the mount surface 7a. The cord storage portion 13 is open to the keyboard mount portion 7. The left and right end portions of the cord storage portion 13 are closed by the seat portions 11a and 11b. The left seat portion 11a has a groove-like cord extraction port 14 which is continuously formed in the front and side surfaces of the seat portion 11a. A cord engaging portion 15 is formed on the right end portion of the cord storage portion 13. The cord engaging portion 15 has a first projection 15a protruding downward from the upper wall portion 10, and a second projection 15b protruding upward from the mount surface 7a. A space 15c is formed between the distal end portions of the first and second projections 15a and 15b. The space 15c is open to the cord storage portion 13 and the keyboard mount portion 7.

A keyboard unit 18 is detachably mounted on the keyboard mount portion 7. The keyboard unit 18 has a rectangular keyboard case 19 and a large number of keys 20 incorporated in the keyboard case 19. When the keyboard unit 18 is mounted on the mount surface 7a, the upper surfaces of the keyboard case 19 and the keys 20 are almost continuous with the upper wall 5a of the case body 5 on the same plane. The keyboard case 19 has fitting holes 21a and 21b in the left and right side portions thereof. These fitting holes 21a and 21b are opened in the upper and lower surfaces of the keyboard case 19.

With this structure, when the keyboard unit 18 is mounted at a predetermined position on the mount surface 7a, the projections 8a and 8b p are fitted in the fitting holes 21a and 21b. with this fitting operation, the keyboard unit 18 is positioned in all directions with respect to the mount surface 7a. The projections 8a and 8b are exposed on the upper surface of the keyboard unit 18 via the fitting holes 21a and 21b.

As shown in FIG. 5, the keyboard unit 18 is connected to the base unit 2 via a cord 25. The cord 25 has an extendible curl portion 26. One end of the cord 25 is connected to the keyboard case 19, and the other end of the cord 25 is inserted into the base unit 2 via a cord introduction port 27 opened in the mount surface 7a.

Figure 7:
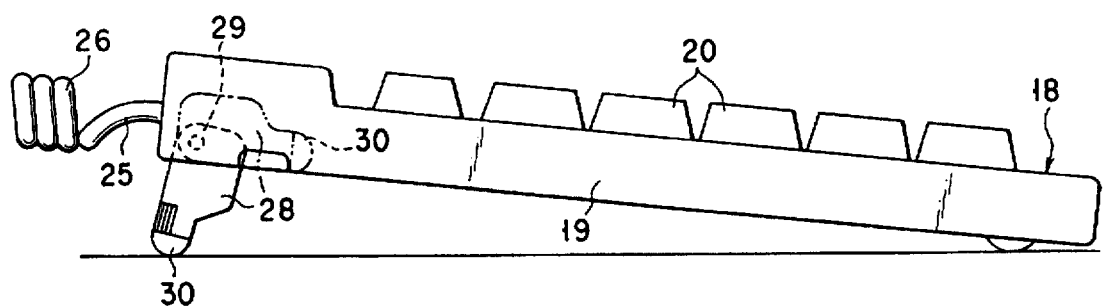
Figure 8:
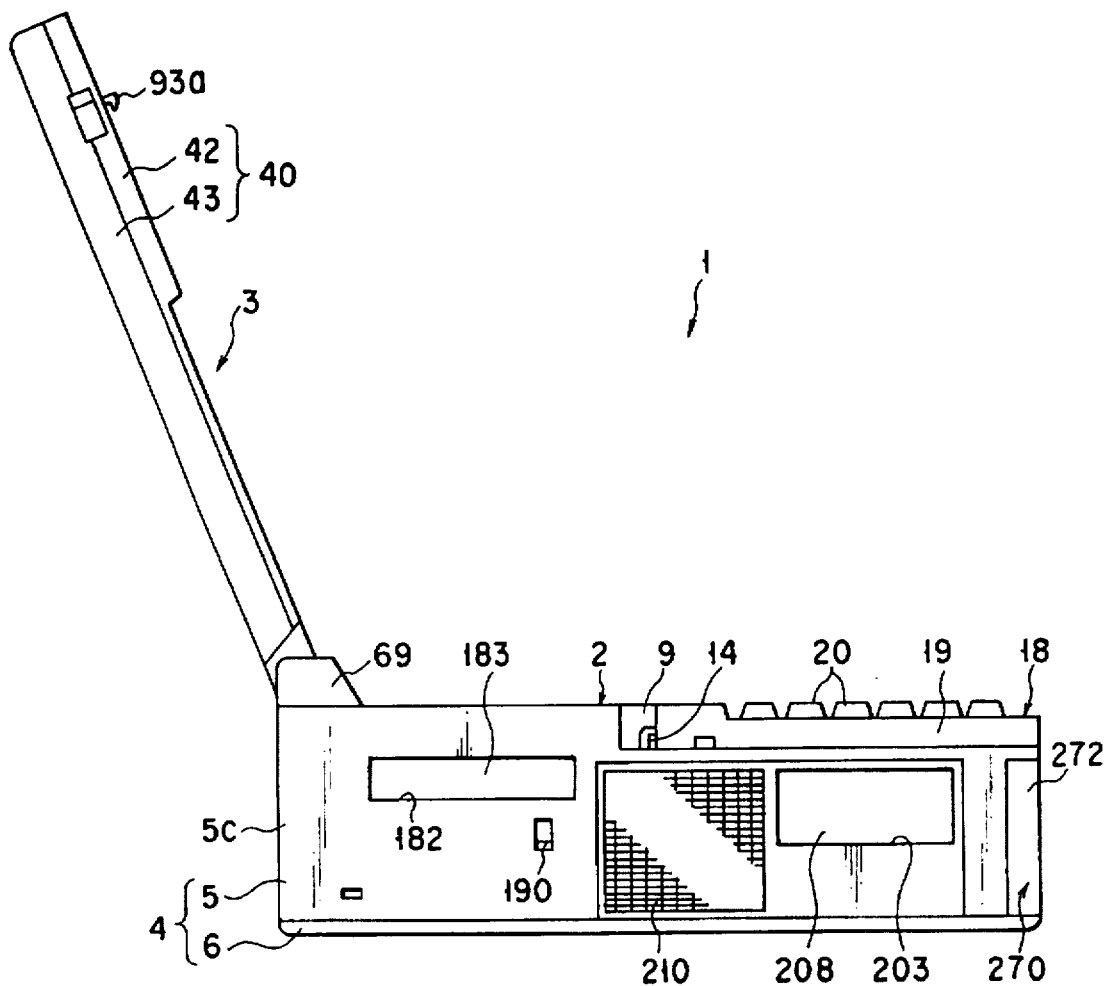

As shown in FIG. 7, the keyboard unit 18 has a pair of left and right tilt legs 28 (only one of them is shown in FIG. 7)

at the rear end portion of the keyboard case 19. The tilt legs 28 serve to cause the keyboard unit 18 to tilt up such that the front side becomes lower in level than the rear side, when the keyboard unit 18 is detached from the base unit 2 and placed on, e.g., the surface of a desk. Each tilt leg 28 is supported on the keyboard case 19 through a pivot shaft 29 to be pivotal between a storing position at which the leg is retracted into the keyboard case 19 and a using position at which the leg protrudes downward from the keyboard case 19. Rubber slip preventing members 30 are attached to the distal ends of the tilt legs 28. The slip preventing members 30 serve to prevent the keyboard unit 18 from slipping when the unit 18 is placed on a flat desk surface and operated, thus improving the operability of the keyboard unit 18 together with the above-mentioned tilt-up structure.

Figure 6:
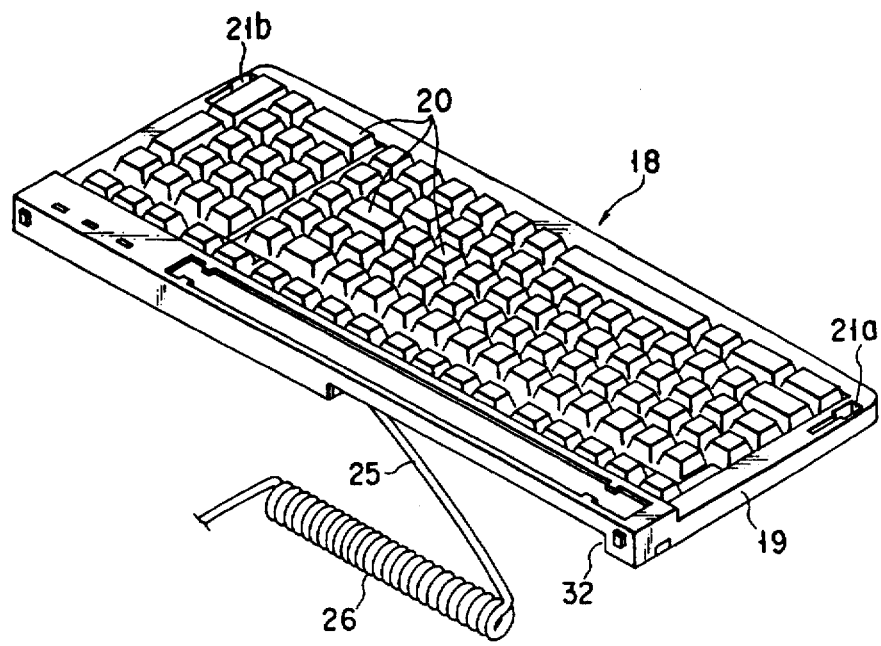

As shown in FIG. 6, the keyboard case 19 has a cord receiving portion 32. The cord receiving portion 32 is formed in the left half of the rear end of the keyboard case 19. One end of the cord 25 is inserted in the cord receiving portion 32. The cord receiving portion 32 becomes continuous with the cord storage portion 13 when the keyboard unit 18 is mounted on the keyboard mount portion 7.

When the keyboard unit 18 is to be mounted on the keyboard mount portion 7, the cord 25 pulled out from the cord introduction port 27 is inserted into the right side of the cord storage portion 13 and is reversed at the right end portion of the cord storage portion 13, as shown in FIG. 5. The reversed portion of the cord 25 is then pushed into the cord storage portion 13 via the space 15c of the cord engaging portion 15 to locate the curl portion 26 at the left side of the cord storage portion 13. In this state, the keyboard unit 18 is mounted on the mount surface 7a, and the curl portion 26 is stored in the space defined by the cord storage portion 13 and the cord receiving portion 32.

When the keyboard unit 18 is to be detached from the keyboard mount portion 7 and used, the keyboard unit 18 is detached from the mount surface 7a first, and the cord 25 is then pulled out from the cord storage portion 13 onto the mount surface 7a via the space 15c of the cord engaging portion 15. In this state, the cord 25 is placed across the mount surface 7a and hence becomes noticeable, which is undesirable in terms of the outer appearance. For this reason, as shown in FIG. 4, the cord 25 pulled out onto the mount surface 7a is introduced to the left side of the mount surface 7a and is pushed into the left end portion of the cord storage portion 13 via the cord extraction port 14. Since the cord extraction port 14 is continuously formed in the left side surface of the case body 5, the cord 25 pushed into the cord storage portion 13 is introduced to the left side of the base unit 2 without crossing the mount surface 7a. With this structure, in using the keyboard unit 18 detached from the mount surface 7a, the cord 25 can be neatly placed without being noticeable by introducing the cord 25 to the left side of the mount surface 7a and extracting it from the cord extraction port 14.

As described above, immediately after the cord 25 is pulled out from the cord introduction port 27, the cord 25 is pulled either to the left or the right depending on the setting position of the keyboard unit 18. For this reason, in this embodiment, the diameter of the cord introduction port 27 is set to be much larger than that of the cord 25, and the inner surface of the cord introduction port 27 is inclined in the form of a cone. According to this structure, the cord 25 is guided by the inner surface of the cord introduction port 27 to be smoothly bent. Therefore, no excessive force is applied to the cord 25 when the pulling direction of the cord 25 is changed.

As shown in FIG. 4, the upper wall 5a of the case body 5 has a projection 35 on the rear end portion of the rear half thereof. The projection 35 extends along the widthwise direction of the case body 5. A pair of left and right leg mount portions 36a and 36b for coupling the display unit 3 to the case body 5 are formed on the left and right side portions of the projection 35. The entire inner surfaces of the case body 5 including the projection 35 and the bottom cover 6 are respectively covered with conductive layers 37a and 37b formed by deposition of aluminum, as shown in FIGS. 1B and 1C. In this embodiment, the layers 37a and 37b constitute an electromagnetic shield means.

The display unit 3 comprises a box-like housing 40 consisting of a synthetic resin material, and a liquid crystal display 41 housed in the housing 40. The housing 40 has a rear panel 43 and a front panel 42 detachably coupled to the rear panel 43. As shown in FIG. 14, the inner surfaces of the front and rear panels 42 and 43 are respectively covered with conductive layers 42a and 43a formed by deposition of aluminum.

Figure 10:
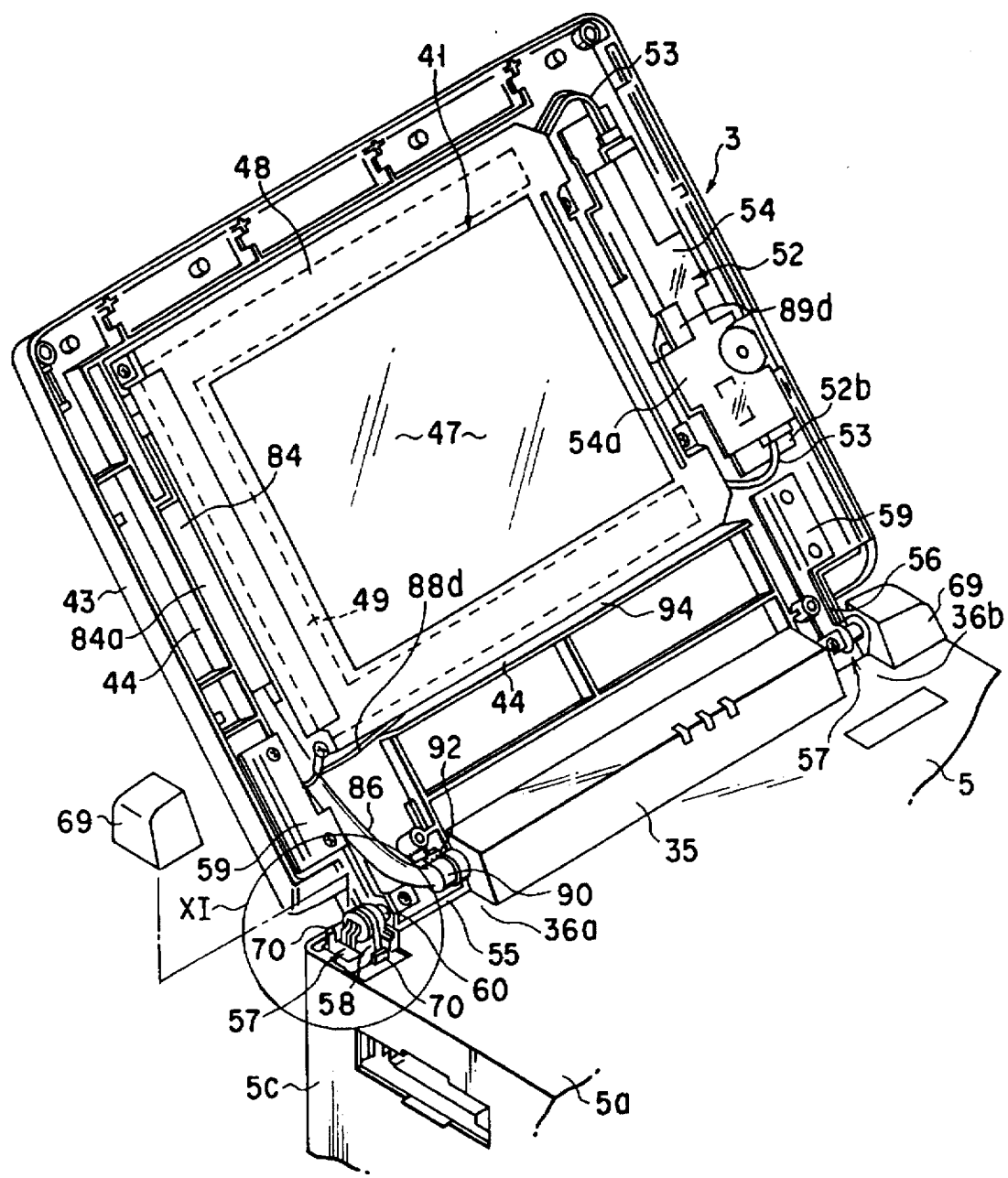

As shown in FIG. 10, the liquid crystal display 41 comprises a liquid crystal panel 47 and a metal frame 48 enclosing the liquid crystal panel 47. A driving circuit 49 for the liquid crystal display 41 is arranged at the upper and lower portions and left side portion of the liquid crystal panel 47. As shown in FIGS. 16A and 16B, the driving circuit 49 has a circuit board 49b on which a large number of circuit components 49a are mounted. The circuit board 49b is supported on the frame 48. The frame 48 is fixed to the rear panel 43 with screws. By this fixing operation using the screws, the liquid crystal panel 47 is exposed to the outside of the housing 40 through a display window 50 formed in the front panel 42.

Figure 15:
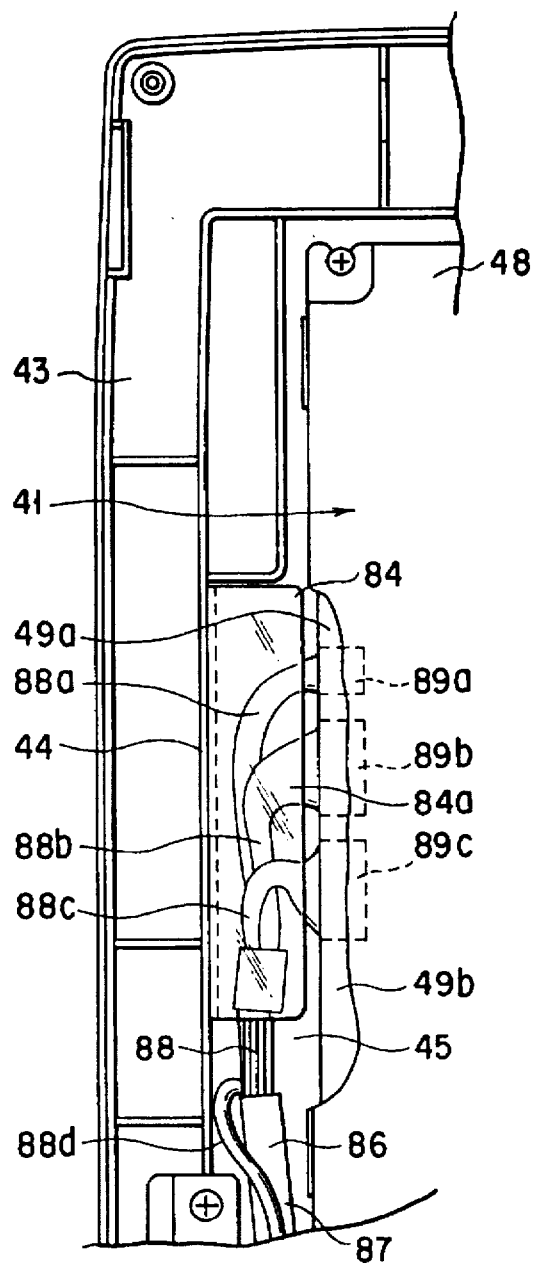

A rib 44 is formed on the inner surface of the rear panel 43 to surround the liquid crystal display 41. As shown in FIGS. 16B and 18B, the distal end of the rib 44 is located near the inner surface of the front panel 42 when the front panel 42 is coupled to the rear panel 43. As shown in FIG. 15, a first cable insertion path 45 is formed between the left end portion of the liquid crystal display 41 and the rib 44.

Figure 17:
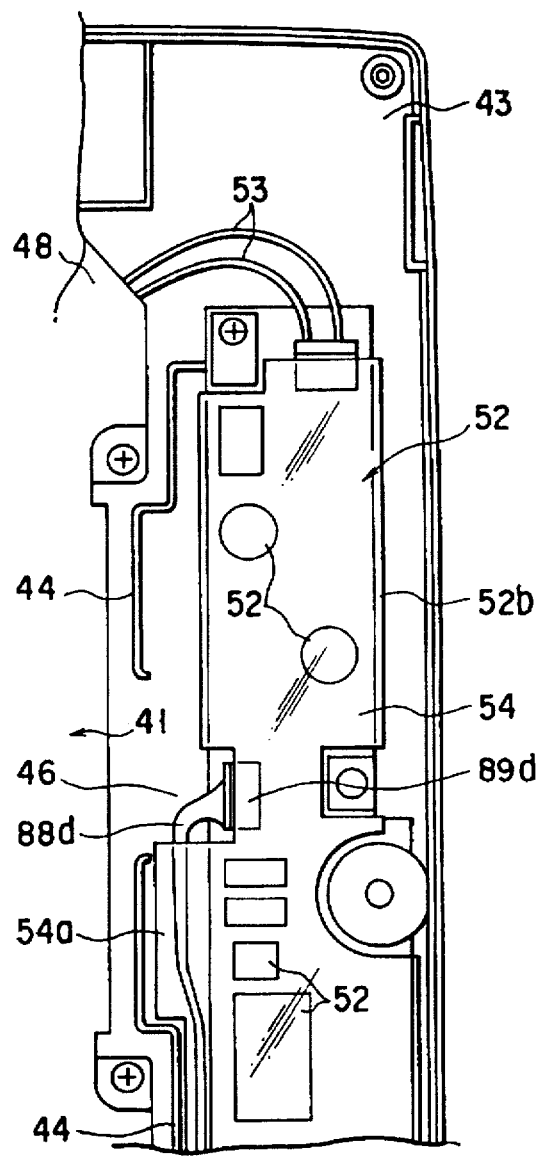

As shown in FIGS. 10 and 17, a converter circuit 52 of the liquid crystal display 41 is supported on the inner surface of the rear panel 43. The converter circuit 52 has a circuit board 52b on which a large number of circuit components 52a are mounted. This converter circuit 52 is located on the right side of the liquid crystal display 41 and the rib 44. A second cable insertion path 46 is formed between the left end portion of the converter circuit 52 and the rib 44. The converter circuit 52 is electrically connected to the driving circuit 49 via a lead wire 53.

The housing 40 has first and second leg portions 55 and 56. The first and second leg portions 55 and 56 are spaced apart from each other in the lateral direction of the housing 40. The leg portions 55 and 56 are respectively coupled to the leg mount portions 36a and 36b of the case body 5 via metal hinge members 57. Since the left and right metal hinge members 57 are identical to each other, the left metal hinge member 57 will be described as a representative.

Figure 11:
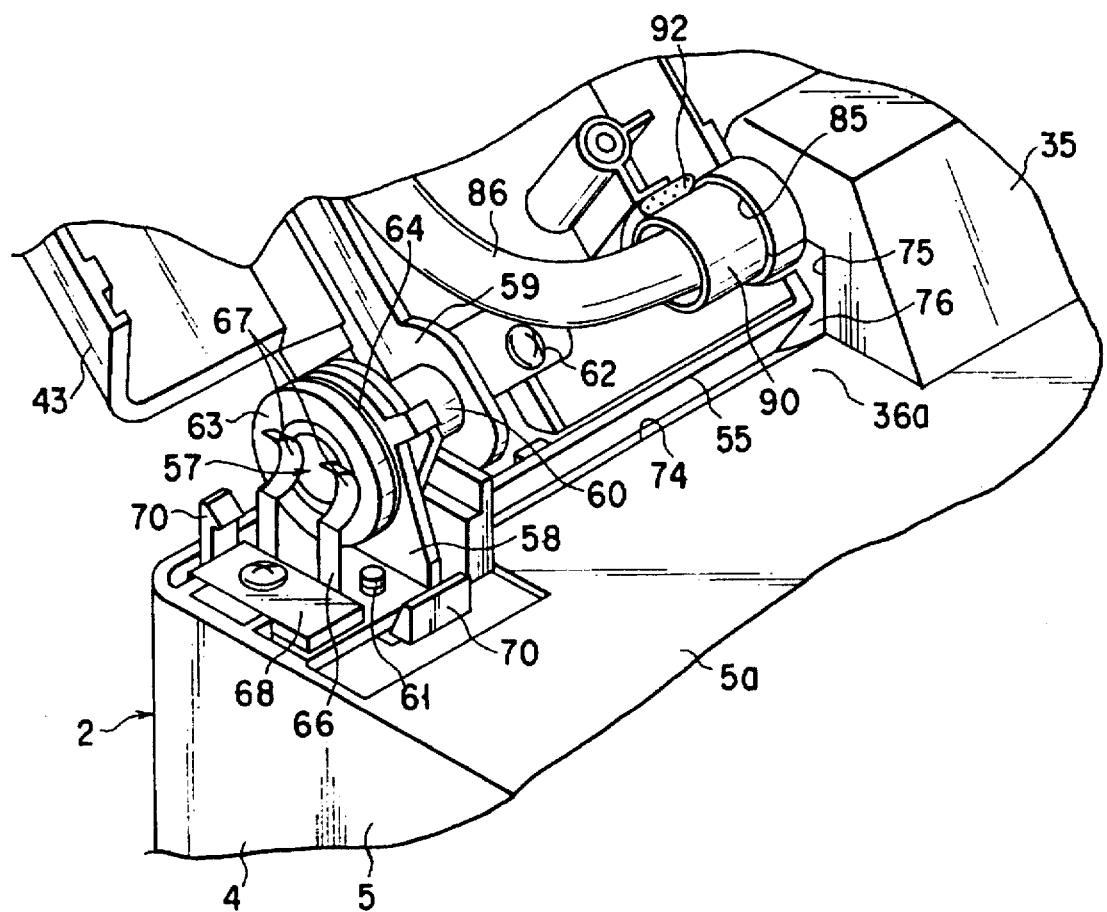

As shown in FIG. 11, the metal hinge member 57 comprises a first bracket 58 fixed to the leg mount portion 36a, a second bracket 59 fixed to the inner surface of the rear panel 43 including the first pivot leg portion 55, and a hinge shaft 60 extending between the brackets 58 and 59. The first and second brackets 58 and 59 and the hinge shaft 60 are made of a conductive metal material. The first bracket 58 is fixed to the case body 5 via a metal screw 61 threadably engaged therewith from the inside of the case body 5. With this structure, the first bracket 58 is electrically connected to the layer 37a of the case body 5 via the metal screw 61. The second bracket 59 is fixed to the inner surface of the rear panel 43 via a metal screw 62. The second bracket 59 is in contact with the layer 43a covering the inner surface of the rear panel 43 to be electrically connected to the layer 43a. The hinge shaft 60 extends through the left side surface of the first leg portion 55. One end of the hinge shaft 60 is fixed to the second bracket 59, and the other end of the hinge shaft 60 is coupled to the first bracket 58 to be pivotal about the axis. A large-diameter metal press ring 63 is fixed to the other end of the hinge shaft 60. A wave washer 64 is clamped between the press ring 63 and the first bracket 58. The wave washer 64 provides a frictional resistance between the first bracket 58 and the hinge shaft 60. Owing to the presence of this frictional resistance, free pivotal movement of the hinge shaft 60 is restrained.

Figure 9:
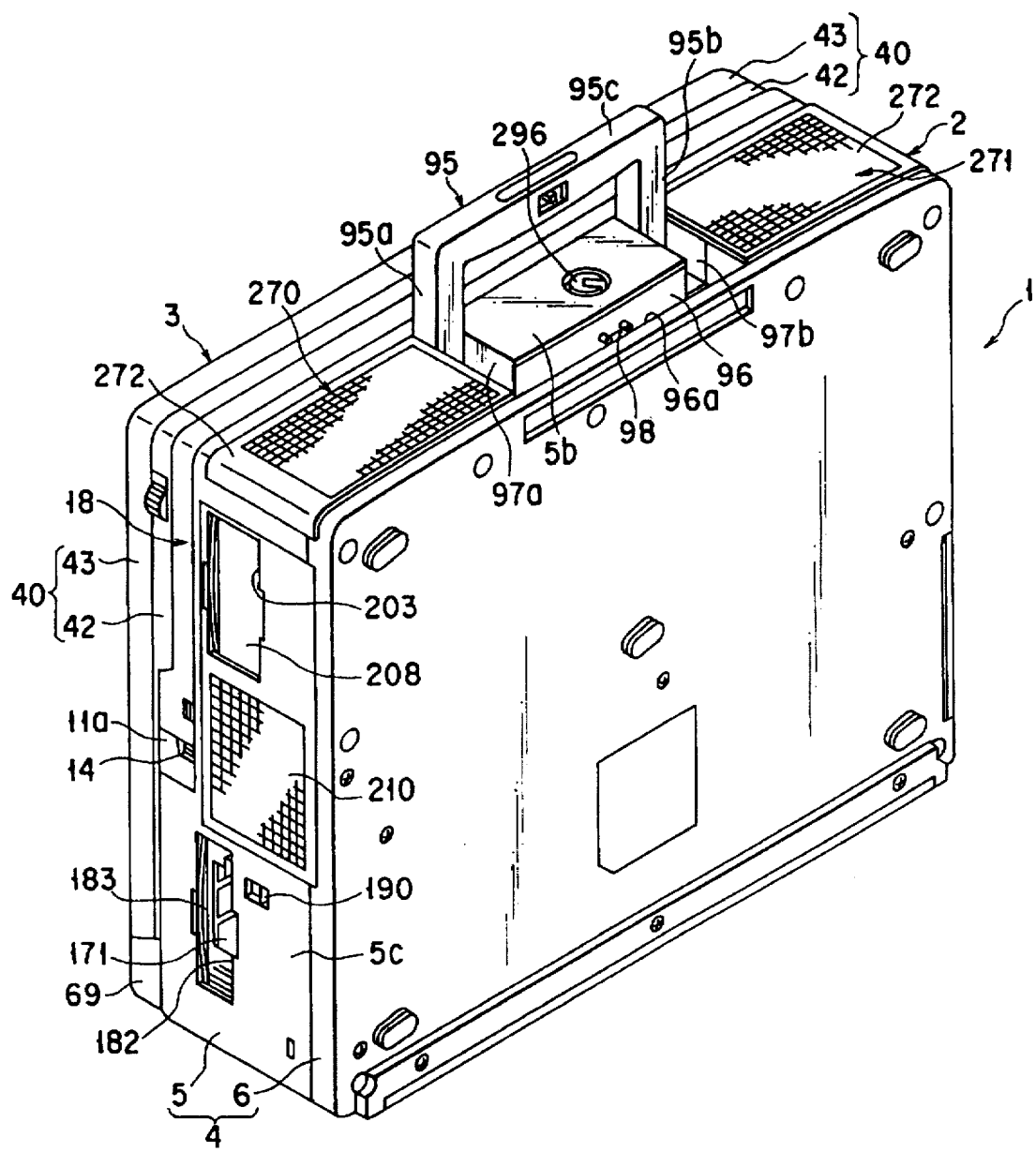

With this structure, the display unit 3 is supported on the base unit 2 to be pivotal between the first position at which the display unit 3 covers the rear half of the case body 5 and the keyboard unit 18 from above and the second position at which an operator can operate the keys 20 while watching the liquid crystal panel 47. As shown in FIG. 9, when the display unit 3 is pivoted to the first position, the housing 40 of the display unit 3 becomes continuous with the front, left, and right surfaces of the case body 5 and the upper surface of the projection 35 on the same plane. Hence, the portable computer 1 becomes a portable box-like unit as a whole.

As shown in FIG. 11, the metal hinge member 57 has a ground terminal 66. The ground terminal 66 has a pair of contact pieces 67 which are in slidable contact with the end face of the hinge shaft 60. The ground terminal 66 is clamped between the first bracket 58 and a press plate 68 fixed to the first bracket 58 with screws. With this structure, the ground terminal 66 is electrically connected to the layer 37a of the case body 5 via the first bracket 58, and is also electrically connected to the layer 43a of the display unit 3 via the second bracket 59. With this structure, the display unit 3 is grounded to the base unit 2 via the metal hinge member 57.

The first bracket 58 and ground terminal 66 of the metal hinge member 57 are covered with a hinge cover 69. The hinge cover 69 is detachably engaged by lock pawls 70 extending vertically upward from the case body 5 and the press plate 68. The first leg portion 55 is inserted between the hinge cover 69 and the projection 35.

Figure 12:
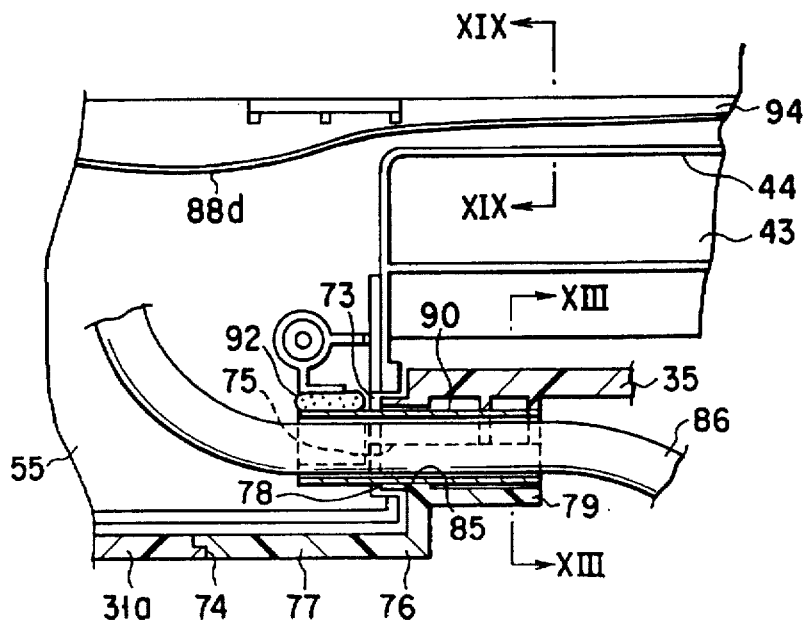

As shown in FIGS. 11 and 12, a cable insertion hole 73 is opened in the right side surface of the first leg portion 55. The right side surface of the first leg portion 55 opposes the left side surface of the projection 35. The left side surface of the projection 35 is continuous with the bottom surface of the leg mount portion 36a. A bottom opening 74 communicating with the inside of the case body 5 is formed in the bottom surface of the leg mount portion 36a. A side opening 75 communicating with the bottom opening 74 is formed in the left side surface of the projection 35.

Figure 13:
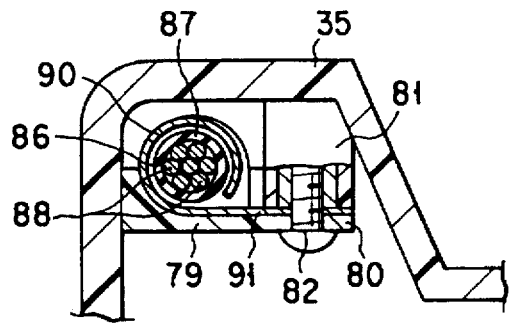

A cover 76 consisting of a synthetic resin material is mounted on the leg mount portion 36a from the inside of the case body 5. The cover 76 has a bottom wall covering the bottom opening 74 and a side wall 78 covering the side opening 75. The side wall 78 has a support piece 79 extending inside the projection 35. As shown in FIG. 13, the support piece 79 has a tongue piece 80, which is fixed to a seat portion 81 on the inner surface of the projection 35 with a screw 82.

The upper edge portion of the side opening 75 and the upper edge portion of the side wall 78 constitute a cable path 85. The cable path 85 communicates with the cable insertion hole 73. A cable 86 extends through the cable path 85 and the cable insertion hole 73. The cable 86 serves to electrically connect the liquid crystal display 41 of the display unit 3 to the base unit 2. As shown in FIG. 13, the cable 86 comprises a flexible outer tube 87 and a plurality of lead wires 88 extending through the outer tube 87. One end of the cable 86 is inserted into the first cable insertion path 45 in the housing 40 from the inside of the first leg portion 55. In addition, the other end of the cable 86 is inserted into the case body 5 via the inside of the projection 35.

Figure 19:
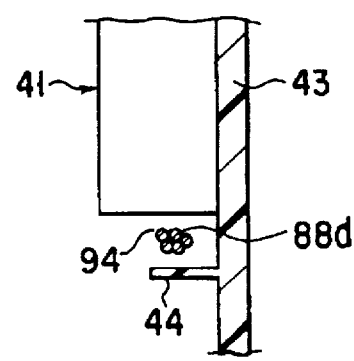

As shown in FIG. 15, the lead wires 88 of the cable 86 are introduced from the outer tube 87 in the first cable insertion path 45. The extracted portions of the lead wires 88 are grouped into four bundles 88a, 88b, 88c, and 88d. The bundles 88a, 88b, 88c, and 88d respectively have connectors 89a, 89b, 89c, and 89d at their distal ends. The connectors 89a, 89b, and 89c of the three bundles 88a, 88b, and 88c, of the four bundles 88a to 88d, are connected to the circuit board 49b of the driving circuit 49. As shown in FIG. 19, the remaining bundle 88d is guided to the right side of the liquid crystal display 41 via a space 94 between the rib 44 and the lower end portion of the liquid crystal display 41. The distal end of the bundle 88d is introduced to the second cable insertion path 46 together with the connector 86d, which is connected to the circuit board 52b of the converter circuit 52. With this structure, the bundle 88d of the lead wires 88 is arranged in the housing 40 from the left to the right without passing between the liquid crystal display 41 and the rear panel 43, thereby allowing the operator to easily check the wiring position of the bundle 88d.

As shown in FIGS. 16A and 16B, a transparent insulator 84 consisting of a synthetic resin material is bonded to the rib 44. The insulator 84 has a plate-like spacer piece 84a inserted between the first cable insertion path 45 and the front panel 42. The spacer piece 84a holds the bundles 88a, 88b, and 88c of the lead wires 88 inside the first cable insertion path 45 to prevent the bundles 88a to 88c from being caught between the front panel 42 and the rib 44 when the front panel 42 is placed on the rear panel 43, as shown in FIG. 16A.

Figure 18A:
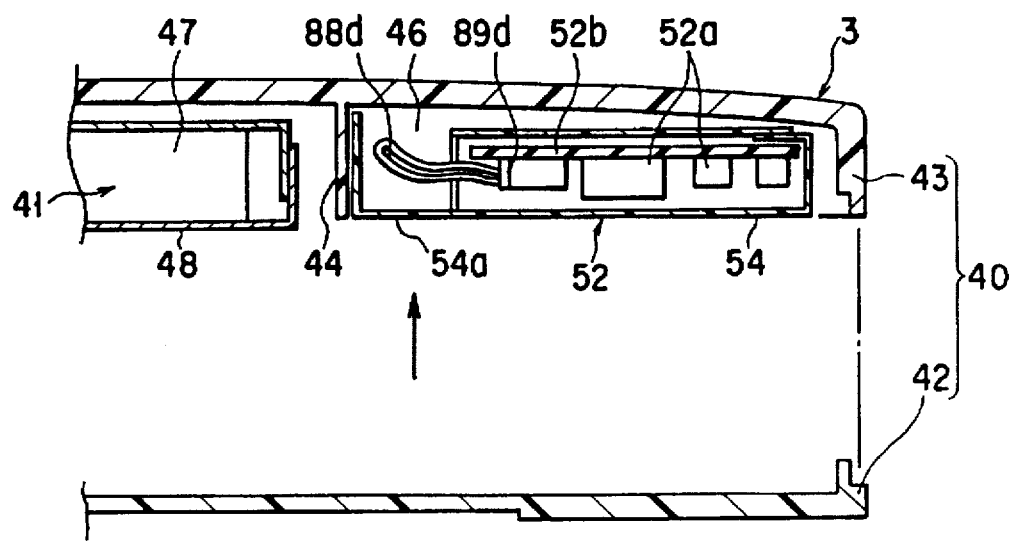
FIG. 18A is a sectional view of the display unit in a state wherein the front panel is to be stacked on the rear panel.
Figure 18B:
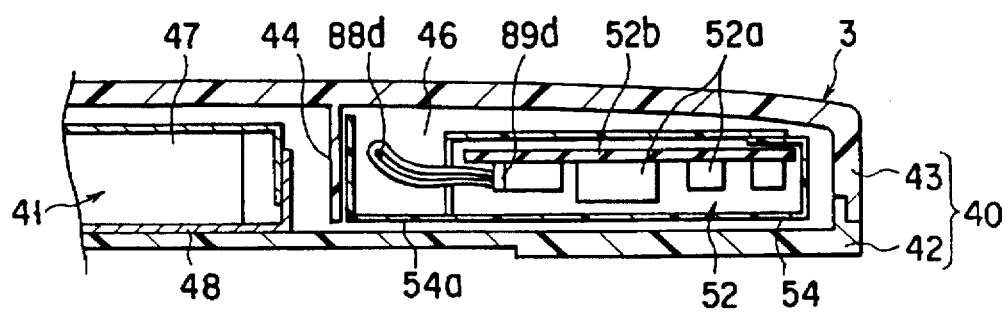
FIG. 18B is a sectional view showing a state wherein the front panel is stacked on the rear panel to assemble the housing of the display unit.

As shown in FIGS. 17, 18A, and 18B, the converter circuit 52 has a cover 54 for covering the circuit components 52a and the circuit board 52b. The cover 54 is made of a transparent synthetic resin material. The cover 54 has a plate-like spacer piece 54a partly protruding inside the second cable insertion path 46. The spacer piece 54a holds the bundle 88d of the lead wires 88 inside the second cable insertion path 46 to prevent the bundle 88d from being caught between the front panel 42 and the rib 44 when the front panel 42 is placed on the rear panel 43, as shown in FIG. 18A.

As shown in FIGS. 11 to 13, a metal guide tube 90 extends through the cable insertion hole 73 and the cable path 85. The guide tube 90 has a cylindrical shape and is coaxially arranged with the hinge shaft 60 of the metal hinge member 57. One end of the guide tube 90 is inserted in the first leg portion 55, and the other end of the guide tube 90 is inserted inside the projection 35. The cable 86 extends through the guide tube 90. A support piece 91 is integrally formed on the other end of the guide tube 90. The support piece 91 is clamped between the tongue piece 80 and the seat portion 81 inside the projection 35. In this case, since the seat portion 81 is covered with the conductive layer 37, the guide tube 90 is electrically connected to the layer 37 via the support piece 91.

Figure 14B:
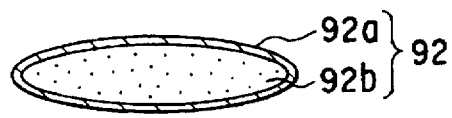
FIG. 14B is a sectional view of the shield member.
Figure 14A:
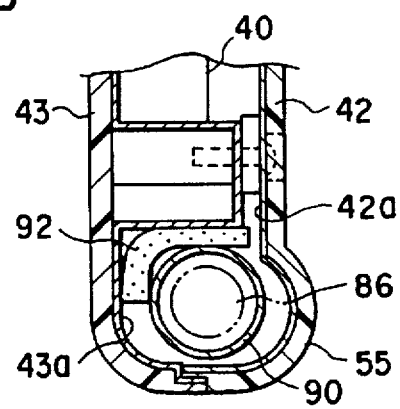
FIG. 14A is a sectional view of a mount portion of a shield member.

As shown in FIGS. 12 and 14A, a shield member 92 is bonded to the inner surface of the first leg portion 55. As shown in FIG. 14B, the shield member 92 comprises an outer tube 92a formed by plating the surface of a polyester fiber with a conductive metal, and a foamed urethane elastic member 92b filling the outer tube 92a. The shield member 92 is bent along the outer surface of the guide tube 90 and is in slidable contact therewith. Since the inner surface of the first leg portion 55 is covered with the layer 43a, the guide tube 90 is electrically connected to the layer 43a via the shield member 92.

As shown in FIG. 3, the display unit 3 has a pair of left and right latch pawls 93a and 93b on the upper portion of the front surface of the housing 40. When the display unit 3 is pivoted to the first position, the latch pawls 93a and 93b are engaged in the projections 8a and 8b exposed on the upper surface of the keyboard unit 18 to be freely disengaged therefrom. With this engaging operation, the display unit 3 is located at the first position, and the keyboard unit 18 is held between the display unit 3 and the mount surface 7a of the base unit 2 so as not be fall off.

As shown in FIG. 9, the case 4 has a carrying handle 95 at the central portion of the front wall 5b. The handle 95 comprises a pair of leg portions 95a and 95b pivotally coupled to the front wall 5b via a metal hinge member 99 (shown in FIG. 43), and a grip portion 95c extending between the leg portions 95a and 95b. The front wall 5b is continuous with the front end portion of the bottom cover 6. A handle receiving portion 96 is formed on the front end portion of the bottom cover 6. The handle receiving portion 96 has a first recess 96a in which the grip portion 95c of the handle 95 can be retracted. The front wall 5b has second and third recesses 97a and 97b in which the leg portions 95a and 95b of the handle 95 can be retracted. The second and third recesses 97a and 97b are continuous with the two ends of the first recess 96a.

With this structure, the handle 95 is held on the case 4 to be pivotal between a using operation at which the handle 95 protrudes from the case 4, as shown in FIG. 9, and a storing position at which the handle 95 is retracted in the first to third recesses 96a, 97a, and 97b, as shown in FIG. 3. When the handle 95 is pivoted to the storing position, the leg portions 95a and 95b and the grip portion 95c become continuous with the front wall 5b on the same plane.

Note that a push latch unit 98 locked in the grip portion 95c to be freely disengaged therefrom is mounted in the first recess 96a. The handle 95 is held at the storing position by the latch unit 98.

Figure 2:
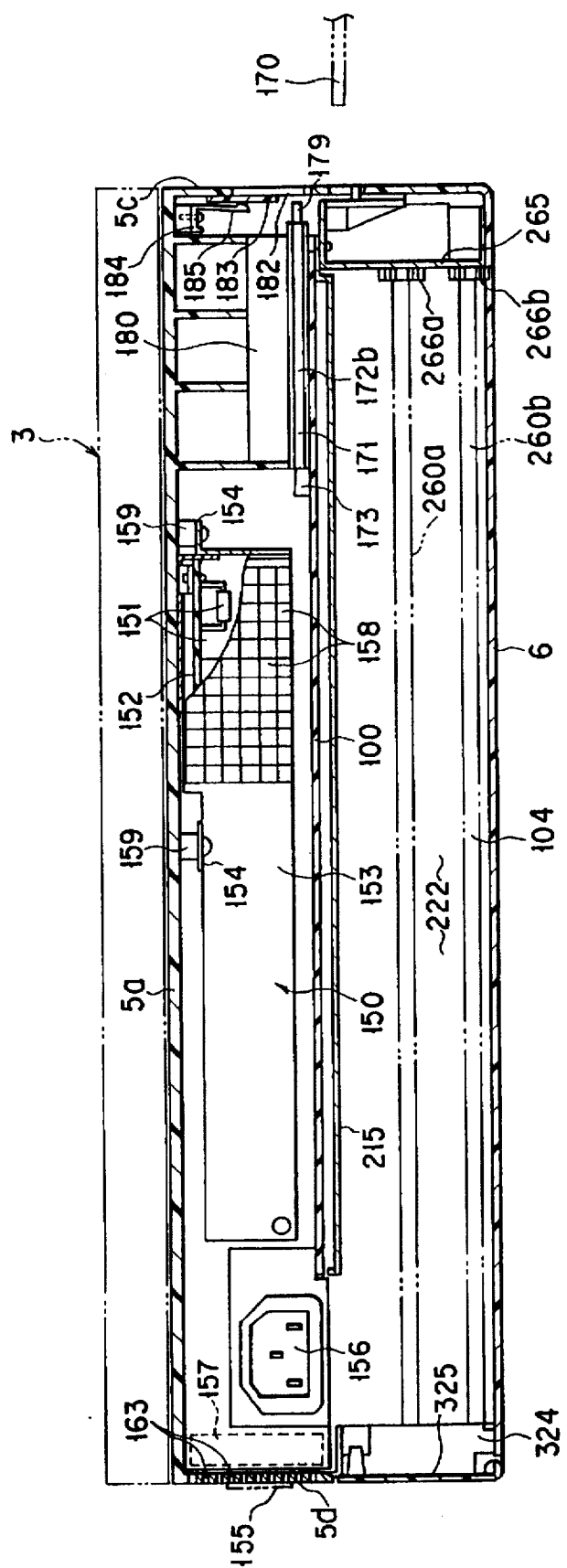

As shown in FIGS. 1A and 2, a main circuit board 100 is housed in the case 4. The main circuit board 100 has substantially the same size as that of the bottom cover 6. A plurality of portions of the peripheral and central portions of the main circuit board 100 are supported on the upper wall 5a of the case body 5. This support structure will be further described below. As shown in FIG. 1A, a plurality of columnar boss portions 101 are integrally formed on the inner surface of the upper wall 5a to extend downward. The lower end faces of the boss portions 101 are located on the same plane and at a substantially intermediate position of the case 4 in the direction of thickness. The main circuit board 100 is stacked on the lower end faces of the boss portions 101 and is fastened and fixed thereto with metal screws 102. With this structure, the interior of the case 4 is partitioned into an upper mount area 103 and a lower mount area 104 by the main circuit board 100.

As shown in FIGS. 1A and 20, the bottom cover 6 as the bottom of the lower mount area 104 integrally has a plurality of hollow cylindrical mount seat portions 105. The mount seat portions 105 extend upward from a plurality of portions of the peripheral portion of the bottom cover 6 and from its central portion. These mount seat portions 105 are open to the bottom surface of the bottom cover 6. A plurality of columnar coupling seat portions 106 are integrally formed upright on the inner surface of the upper wall 5a. The coupling seat portions 106 extend downward from the upper wall 5a. The lower end faces of the coupling seat portions 106 are abutted against the upper end faces of the mount seat portions 105. The bottom cover 6 is detachably coupled to the case body 5 by threadably engaging screws 107, which are inserted from the opening ends of the mount seat portions 105, with the coupling seat portions 106. When the bottom cover 6 is detached from the case body 5 upon loosening the screws 107, the entire lower mount area 104 is open to the outside of the case 4.

Figure 22:
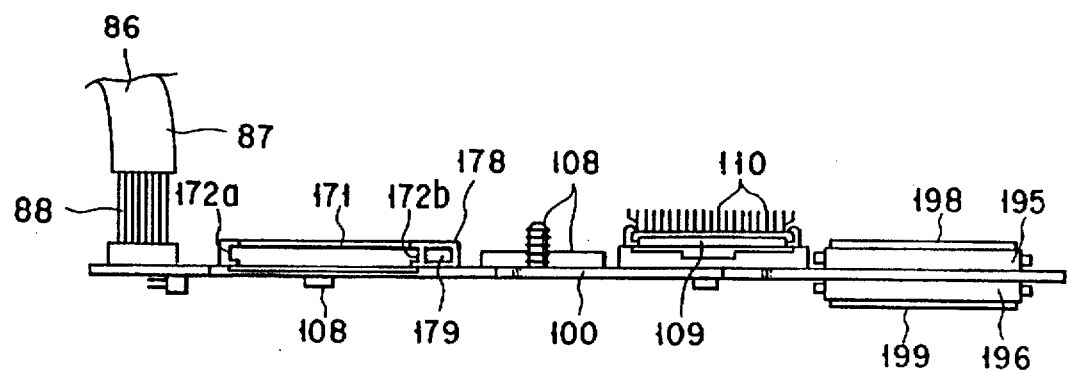

The main circuit board 100 has an upper surface opposing the upper mount area 103 and a lower surface opposing the lower mount area 104. As shown in FIG. 22, various types of circuit components 108 such as IC chips and resistors are mounted on the upper and lower surfaces of the main circuit board 100. These circuit components 108 include parts which generate high-frequency noise while they are in operation. A main CPU 109 is mounted on the upper surface of the main circuit board 100 to be adjacent to the circuit components 108. This CPU 109 has a large number of cooling fins 110 because it generate a large amount of heat. Of the circuit components 108, large and tall parts such as IC chips and condensers are mounted on the upper surface of the main circuit board 100 and arranged in the upper mount area 103. In contrast to this, small circuit components 108 such as resistors are mounted on the lower surface of the main circuit board 100 and arranged in the lower mount area 104. With this structure, the lower surface, of the main circuit board 100, which opposes the lower mount area 104 is kept flat with small unevenness even in a state wherein the circuit components 108 are mounted thereon. The lead wires 88 are connected to the rear end portion of the upper surface of the main circuit board 100.

Figure 23:
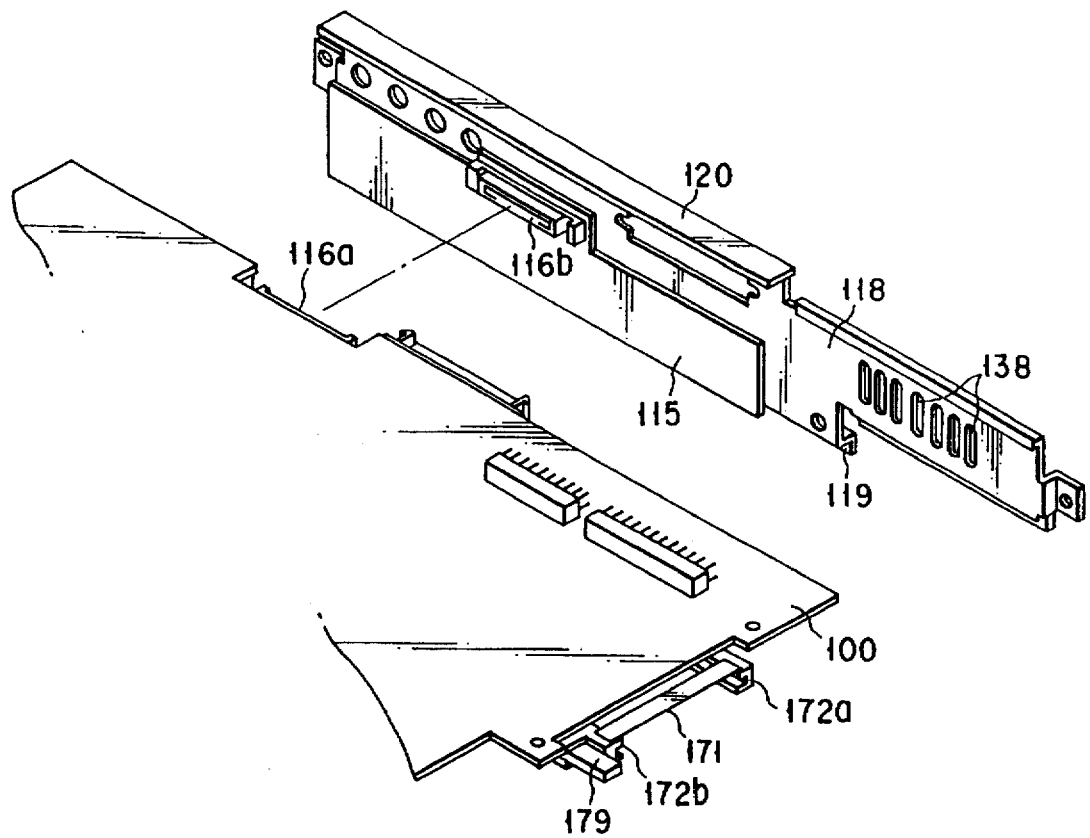

As shown in FIGS. 1A and 23, a connector board 115 is arranged at the rear end portion of the main circuit board 100. The connector board 115 is arranged independently of the main circuit board 100 and positioned at a right angle with respect to the main circuit board 100. The main circuit board 100 and the connector board 115 are electrically and mechanically connected to each other via connectors 116a and 116b. The connector board 115 is located at the rear end portion of the upper mount area 103 to oppose the opening portion of the rear surface of the case body 5.

Figure 24:
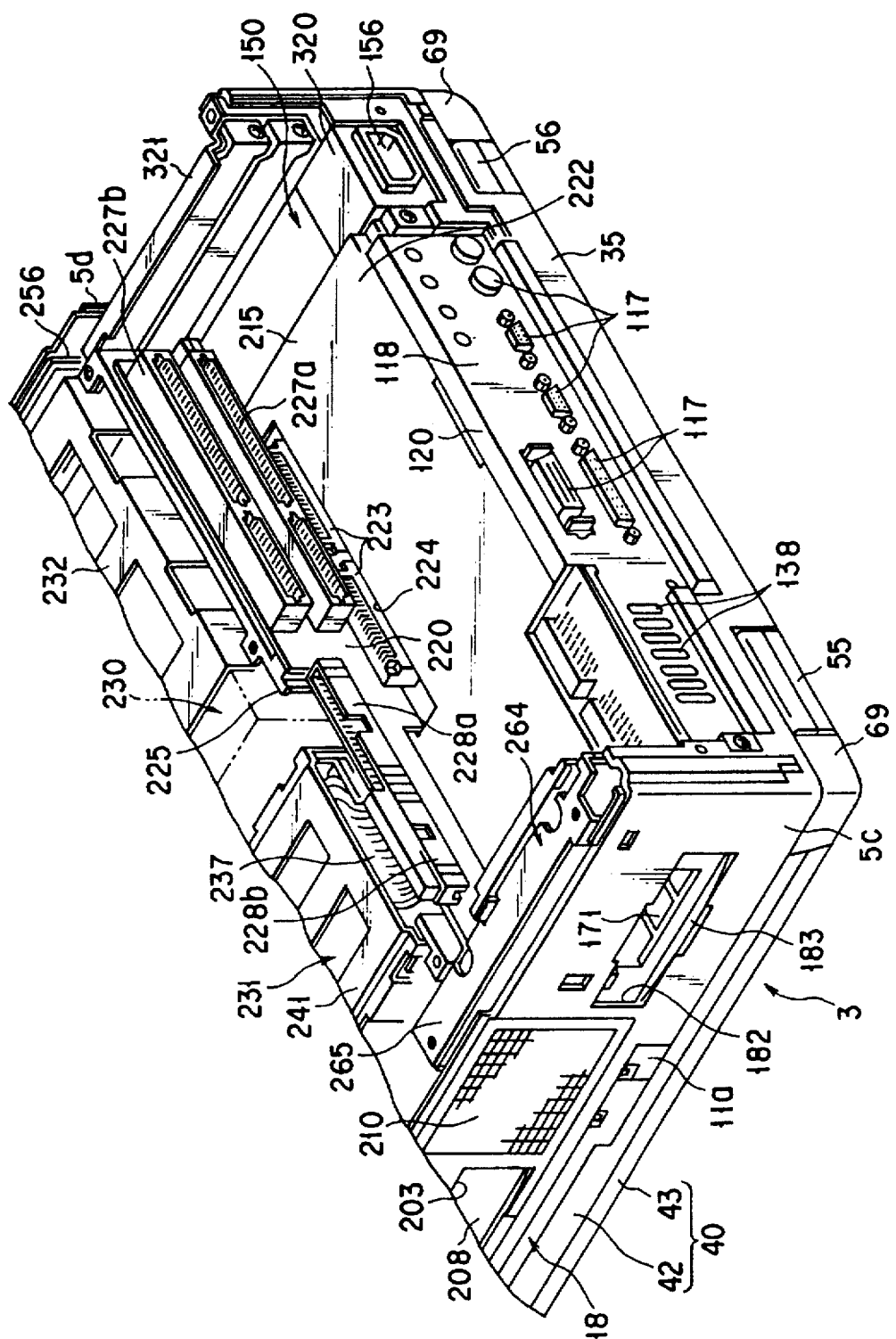
Figure 28:
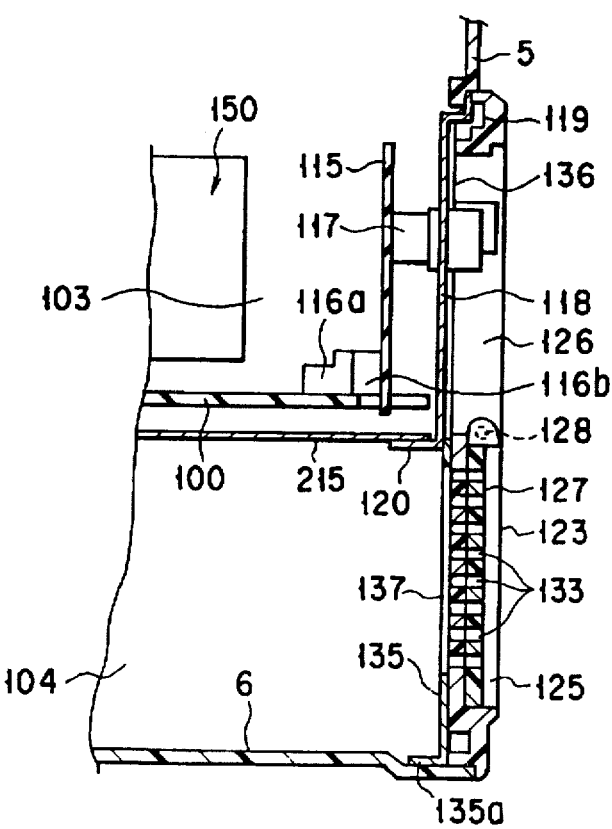

As shown FIGS. 24 and 28, a plurality of expansion connectors 117 for connection of peripheral devices such as an external CRT, a printer, and a large-capacity floppy disk drive are mounted on the rear surface of the connector board 115. The expansion connectors 117 are located above the upper surface of the main circuit board 100, so that parts are three-dimensionally arranged at the rear portion of the main circuit board 100. With this structure, the main circuit board 100 need not have a space for mounting the expansion connectors 117, thereby achieving a reduction in the size of the main circuit board 100. In addition, parts can be easily arranged on the main circuit board 100 in terms of the space.

Figure 30:
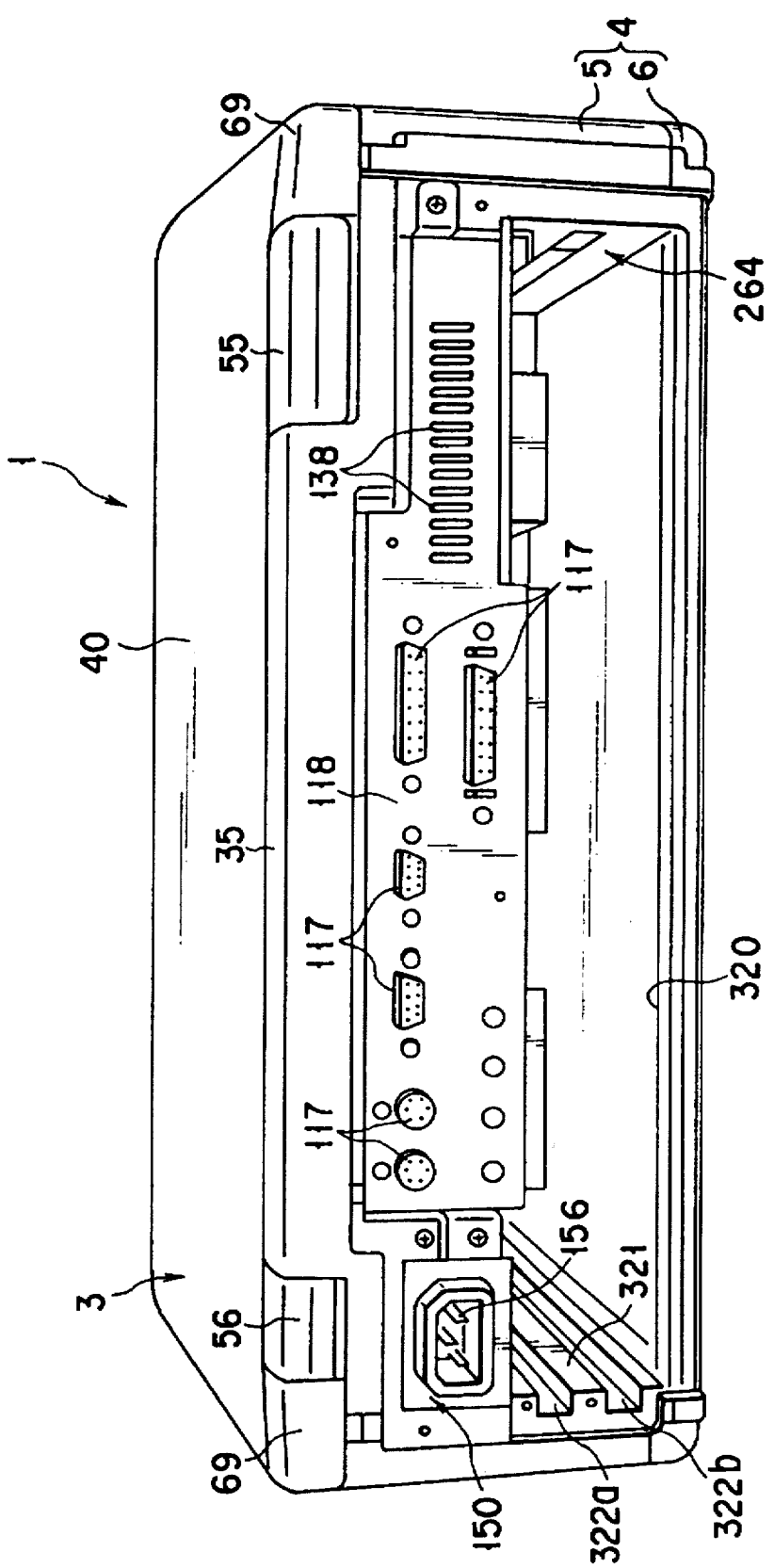

A rear shield plate 118 consisting of a metal is supported on the rear end portion of the main circuit board 100. The rear shield plate 118 is parallel to the connector board 115 and covers the connecting portion between the connector board 115 and the expansion connectors 117 and the upper mount area 103 from behind. The rear shield plate 118 has upper and lower flange portions 119 and 120 at its upper and lower edges, respectively. The upper flange portion 119 is in contact with the layer 37a of the case body 5 at the upper edge of the opening of the rear surface of the case body 5. As shown in FIGS. 23 and 30, a plurality of communicating holes 138 communicating with the upper mount area 103 are opened in the right end portion of the rear shield plate 118.

Figure 27:
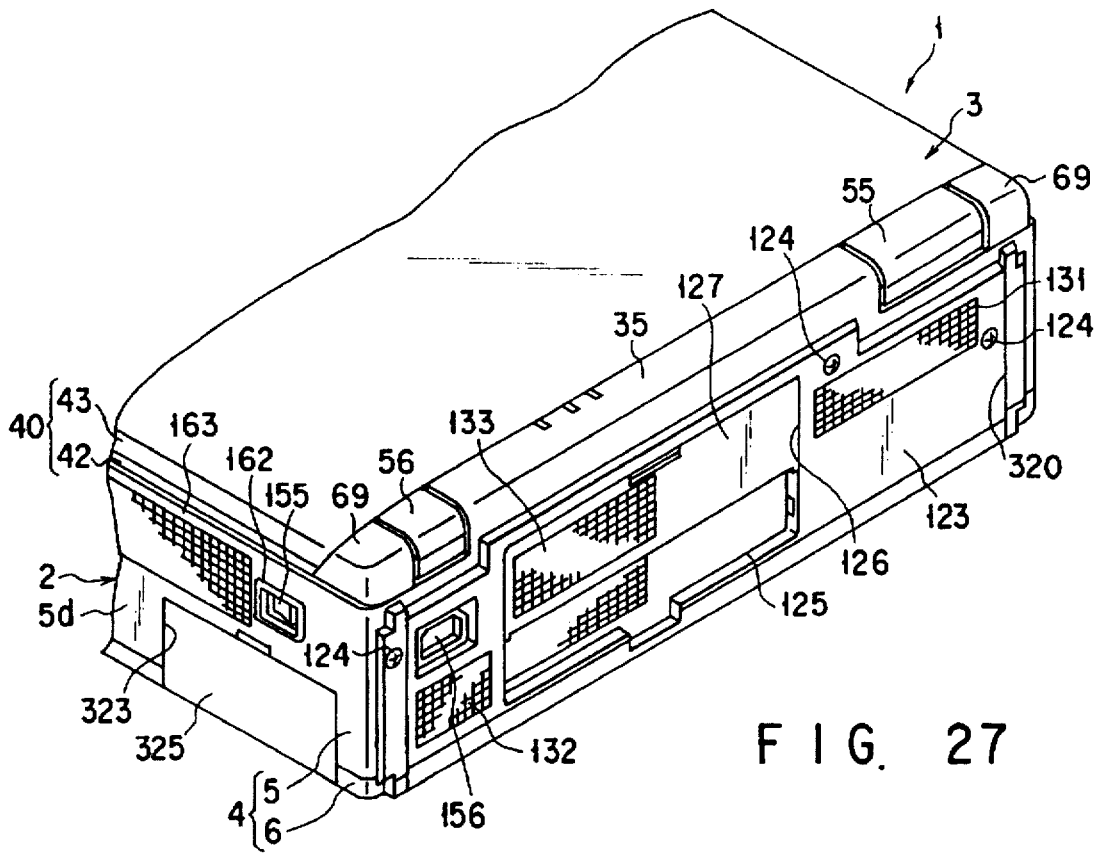

As shown in FIG. 27, a rear panel 123 consisting of a synthetic resin material is detachably mounted on the case body 5 with screws 124 so as to cover the rear opening portion. A rectangular recess 125 is formed in the central portion of the rear panel 123. A connector exposure port 126 for exposing the expansion connectors 117 is formed in the upper half of the recess 125. A connector cover 127 consisting of a synthetic resin material is supported on the recess 125. The connector cover 127 serves to open/close the connector exposure port 126.

Figure 26:
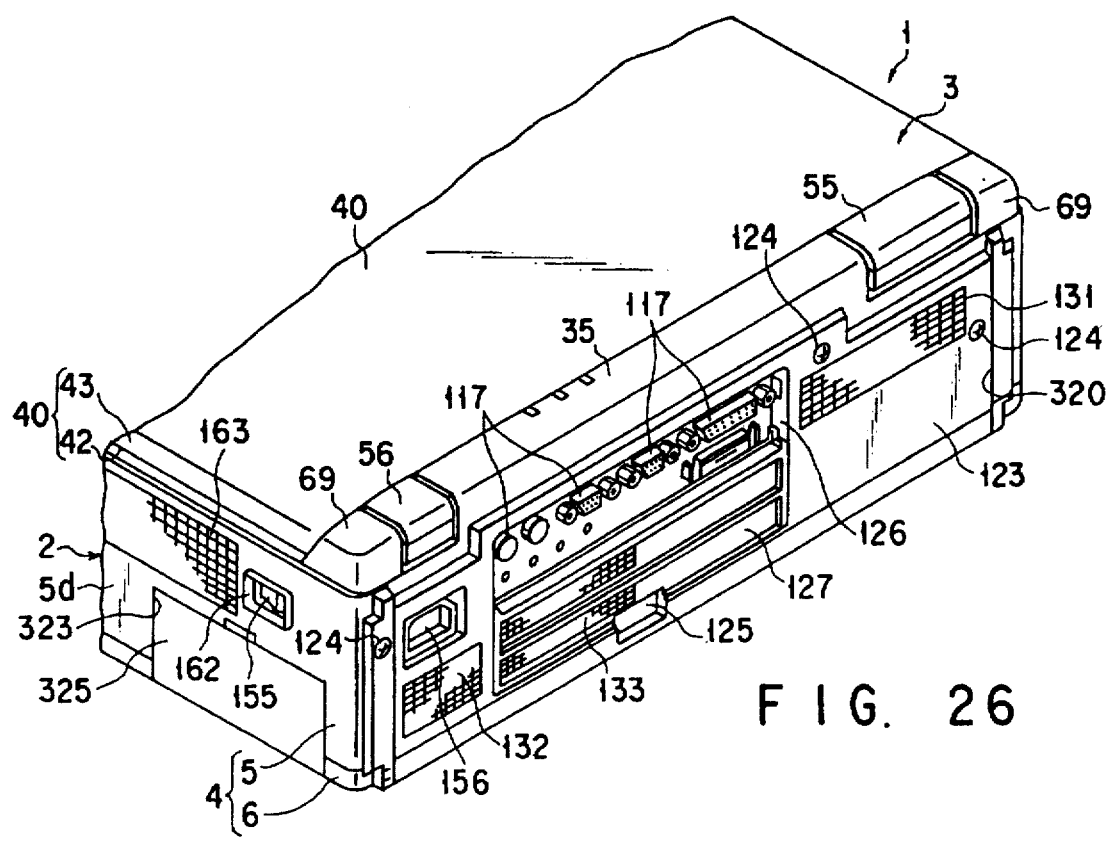
Figure 29:
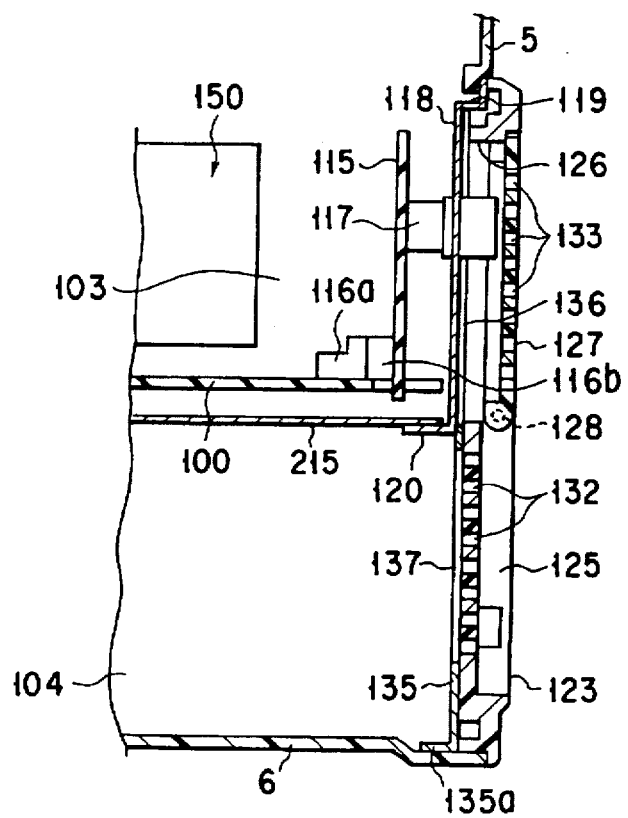

As shown in FIGS. 28 and 29, the connector cover 127 has shaft portions 128 on its left and right end portions. The shaft portions 128 are pivotally supported on the left and right side surfaces of the recess 125. With this structure, the connector cover 127 is supported on the rear panel 123 to be pivotal between a closing position at which the connector exposure port 126 is closed, as shown in FIGS. 27 and 29, and an opening position at which the connector exposure port 126 is opened to expose the expansion connectors 117, as shown in FIGS. 26 and 28. When the connector cover 127 is pivoted to the closing position, the connector cover 127 becomes continuous with the rear panel 123 on the same plane to constitute part of the rear panel 123. When the connector cover 127 is pivoted to the opening position, the connector cover 127 enters the lower half of the recess 125 to prevent a deterioration in integrity with the rear panel 123.

The rear panel 123 has an upper vent 131 communicating with the upper mount area 103, and a lower vent 132 continuous with the lower mount area 104. The vents 131 and 132 are constituted by a large number of small holes arranged in the form of a mesh. As shown in FIGS. 26 and 27, the upper vent 131 is arranged on the right side of the recess 125 to communicate with the communicating holes 138 of the rear shield plate 118, when viewed from the rear side of the portable computer 1. The lower vent 132 is arranged on the left side of the recess 125 and the left side of the lower half of the recess 125. A communicating hole 133 is formed in the left half of the connector cover 127. The communicating hole 133 is constituted by a large number of small holes arranged in the form of a mesh. As shown in FIG. 28, when the connector cover 127 is pivoted to the opening position, the communicating hole 133 communicates with the lower vent 132. With this structure, even in the open state of the connector cover 127, the lower vent 132 is not closed by the lower vent 132.

As shown in FIGS. 28 and 29, a metal reinforcing plate 135 is stacked on the inner surface of the rear panel 123. The reinforcing plate 135 serves to prevent the rear panel 123 from being deformed or damaged when the case 4 is pressed vertically. With the reinforcing plate 135, the rigidity of the case 4 is increased. As shown in FIGS. 20 and 28, the reinforcing plate 135 has a notched portion 136 bypassing the connector exposure port 126, and a plurality of communicating holes 137 communicating with the upper vent 131 and the lower vent 132. The reinforcing plate 135 is stacked on the rear shield plate 118 and is fixed to the case body 5 with the screws 124 together with the rear shield plate 118 and the rear panel 123. A flange portion 135a is formed on the lower end portion of the reinforcing plate 135. When the rear panel 123 is fixed to the case body 5, the flange portion 135a is brought into contact with the layer 37b covering the inner surface of the bottom cover 6. With this structure, the reinforcing plate 135 and the case 4 are electrically connected to each other.

As shown in FIG. 1A, a floppy disk drive (to be referred to as an FDD hereinafter) 140 and a power supply unit 150 as standard units are arranged in the upper mount area 103 to be adjacent to each other in the back-and-forth direction. The FDD 140 is located below the keyboard mount portion 7. The FDD 140 has a metal casing 141. An insertion port 142 and a push button 143 are arranged on the front surface of the casing 141. The insertion port 142 allows a floppy disk to be loaded/unloaded therethrough. The push button 143 is depressed to eject an inserted floppy disk. A bracket 144 is mounted on the casing 141. This bracket 144 has tongue pieces 144a and 144b extending from the two sides of the casing 141. The FDD 140 is stacked on the inner surface of the mount surface 7a. The tongue pieces 144a and 144b of the bracket 144 are fixed to boss portions 145 on the inner surface of the mount surface 7a with screws. With this structure, the FDD 140 is suspended from the mount surface 7a, and the insertion port 142 and the push button 143 are exposed on the right side wall 5d of the case body 5.

As shown in FIG. 1A, the power supply unit 150 is disposed in the rear half of the upper mount area 103. As shown in FIG. 31, the power supply unit 150 has a metal case 153. This case 153 has a box-like shape extending in the lateral direction of the case 4. A plurality of fixing tongue pieces 154 are integrally formed on the peripheral portion of the case 153. As shown in FIGS. 1A and 2, a power supply board 152 is housed in the case 153. Various circuit components 151 constituting a power supply circuit are mounted on the power supply board 152.

As shown in FIG. 31, a power supply connector 156, and a first cooling fan 157 are incorporated in the case 153. The power supply connector 156 allows connection of an external power supply. The first cooling fan 157 serves to draw heat from the case 153. The power switch 155 and the first cooling fan 157 are arranged on the right side surface of the power supply unit 150 to be adjacent to each other in the back-and-forth direction. The power supply connector 156 is disposed on the right end portion of the rear surface of the power supply unit 150. A plurality of inlet holes 158 communicating with the inside and outside of the case 153 are formed in the left end portion of the rear surface of the case 153. Note that FIG. 2 is a sectional view of the portable computer 1 when viewed from behind, and the positions of the power switch 155, the power supply connector 156, and the like are laterally reversed to those described above.

The power supply unit 150 is stacked on the inner surface of the upper wall 5a in a posture in which the power switch 155 and the first cooling fan 157 face the right side of the case body 5, and the power supply connector 156 faces the rear surface side of the case body 5. The tongue pieces 154 of the power supply unit 150 are fixed to boss portions 159 extending from the inner surface of the upper wall 5a with screws. With this structure, the power supply unit 150 is suspended from the inner surface of the upper wall 5a, and the lower surface of the case 153 is disposed near the main circuit board 100.

As shown in FIG. 2, the inner surface of the rear portion of the right side wall 5d of the case body 5 is located near the right side surface of the power supply unit 150. As shown in FIGS. 26 and 27, an exposure port 162 and an exhaust port 163 are formed in the rear portion of the right side wall 5d.

The exposure port 162 serves to expose the power switch 155. The exhaust port 163 opposes the first cooling fan 157. The exhaust port 163 is constituted by a large number of small holes arranged in the form of a mesh. With this structure, when the first cooling fan 157 is operated, outer air is drawn into the rear portion of the upper mount area 103 via the upper vent 131 of the case body 5. The air is then introduced from the rear portion into the case 153 via the inlet holes 158. The outer air introduced into the case 153 flows around the circuit components 151 which generate heat, thus cooling the circuit components 151 and the power supply board 152. The outer air is directly exhausted outside the case 4 via the exhaust port 163.

Figure 33:
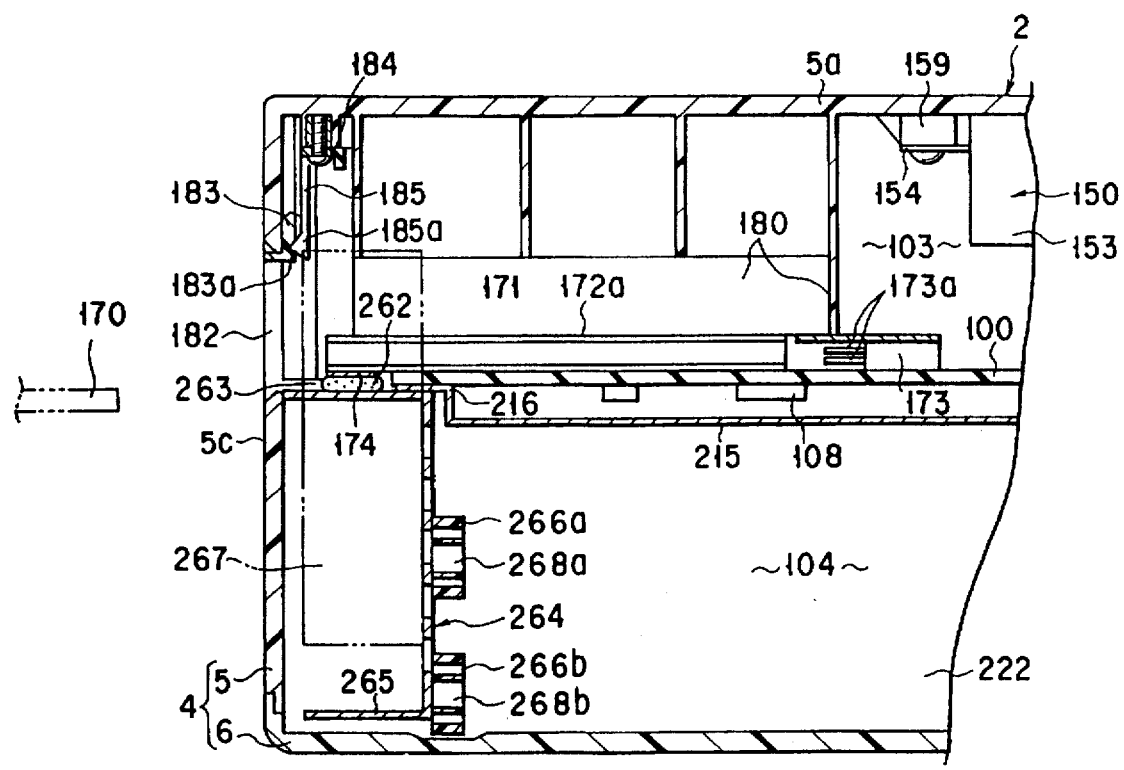

As shown in FIGS. 2 and 33, a card storage portion 171 in which a card modem 170 is mounted is disposed on the upper surface of the main circuit board 100. The card storage portion 171 is positioned at the left end portion of the rear half of the upper mount area 103 to be disposed on the left side of the power supply unit 150. As shown in FIGS. 33, 34A, 34B, 35A, and 35B, the card storage portion 171 has a pair of guide rails 172a and 172b for guiding insertion of the card modem 170, and a card connector 173 located at the distal end portions of the guide rails 172a and 172b. The distal end portions, of the guide rails 172a and 172b, located on the opposite side to the card connector 173 protrude more to the left side than a side edge portion of the main circuit board 100. A metal shield plate 174 extends between the distal end portions of the guide rails 172a and 172b. The card connector 173 has a large number of pin terminals 173a. A terminal portion 175 on the lead leading end (in the inserting direction) of the card modem 170 is detachably fitted/connected in/to the card connector 173. A cable 176 for allowing connection of an external unit extends from the trailing end of the card modem 170.

The card storage portion 171 further includes an ejector 178 for ejecting the inserted card modem 170. The ejector 178 has the same arrangement as that of a known ejector. The ejector 178 has a push lever 179 for pushing the leading end face of the card modem 170 in a direction to separate it from the card connector 173. The push lever 179 is located adjacent to the guide rail portion 172b.

As shown in FIG. 33, a partition wall 180 protruding downward from the inner surface of the rear half of the upper wall 5a to oppose the card storage portion 171. The lower end of the partition wall 180 is in contact with the upper surfaces of the guide rails 172a and 172b and the card connector 173 to partition the card storage portion 171 from the upper mount area 103.

The card storage portion 171 having the above structure is located adjacent to the inner surface of the left side wall 5c of the case body 5. The left side wall 5c has a card insertion port 182 communicating with the card storage portion 171. The card insertion port 182 has a rectangular shape extending in the back-and-forth direction. The distal end portions of the guide rails 172a and 172b and the push lever 179 are exposed through the card insertion port 182. Card modems 170 vary in thickness depending on the types. The thickness of card modems 170 differs in accordance with the types of card modems 170. The difference of the thickness between the thickest card modem 170 and the thinnest modem 170 reaches several mm. For this reason, the height of the card insertion port 182 is set to allow insertion of the thickest card modem 170.

A shutter plate 183 for opening/closing the card insertion port 182 is supported on the left side wall 5c of the case body 5. The shutter plate 183 has a rectangular shape conforming to the shape of the card insertion port 182, and is placed along the inner surface of the left side wall 5c. The shutter plate 183 is designed to slide between a closing position at which the plate closes the card insertion port 182 and an opening position at which the plate is pushed above the card insertion port 182 to open it.

The shutter plate 183 can be stopped at a position corresponding to the thickness of the card modem 170 when the card modem 170 is mounted in the card storage portion 171. More specifically, as shown in FIG. 33, a braking member 184 consisting of a synthetic resin material is fixed to the inner surface of the upper wall 5a with screws. The braking member 184 has an elastic press piece 185. The press piece 185 extends downward from the upper wall 5a and has an engaging projection 185a on its distal end. The engaging projection 185a is in slidable contact with the inner surface of the shutter plate 183. With this structure, the shutter plate 183 is clamped between the left side wall 5c and the press piece 185 to be vertically slidable, and is held at an arbitrary position between the opening position and the closing position by a frictional force generated between the left side wall 5c and the press piece 185. A recess 183a is formed in the lower end portion of the inner surface of the shutter plate 183. When the shutter plate 183 is slid to the opening position, the engaging projection 185a is detachably engaged with the recess 183a.

With this structure, when a thin card modem 170 is loaded in the card storage portion 171, the card insertion port 182, which has a large opening area compared with the thickness of the card modem 170, can be closed to the minimum necessary height by lowering the shutter plate 183 to the position of the card modem 170 and allowing only the cable 176 to extend from the card insertion port 182. Therefore, entrance of dust and foreign substances into the card storage portion 171 can be prevented, and the portable computer 1 can be maintained in a good state in terms of the outer appearance while the card modem 170 is used.

A lock mechanism 188 for preventing removal of the card modem 170 is arranged in the card storage portion 171. The lock mechanism 188 has a metal lock plate 189. The lock plate 189 is designed to be vertically slidable between a lock position at which the plate enters the card insertion port 182 to cover the push lever 179 and a storing position at which the plate is retreated below the push lever 179. The lock plate 189 has a knob 190 to be operated by a finger of the operator. The knob 190 is exposed on the left side wall 5c of the case body 5. When the knob 190 is pressed vertically by a finger of the operator, the lock plate 189 is slid to the storing position or the lock position.

Figure 35A:
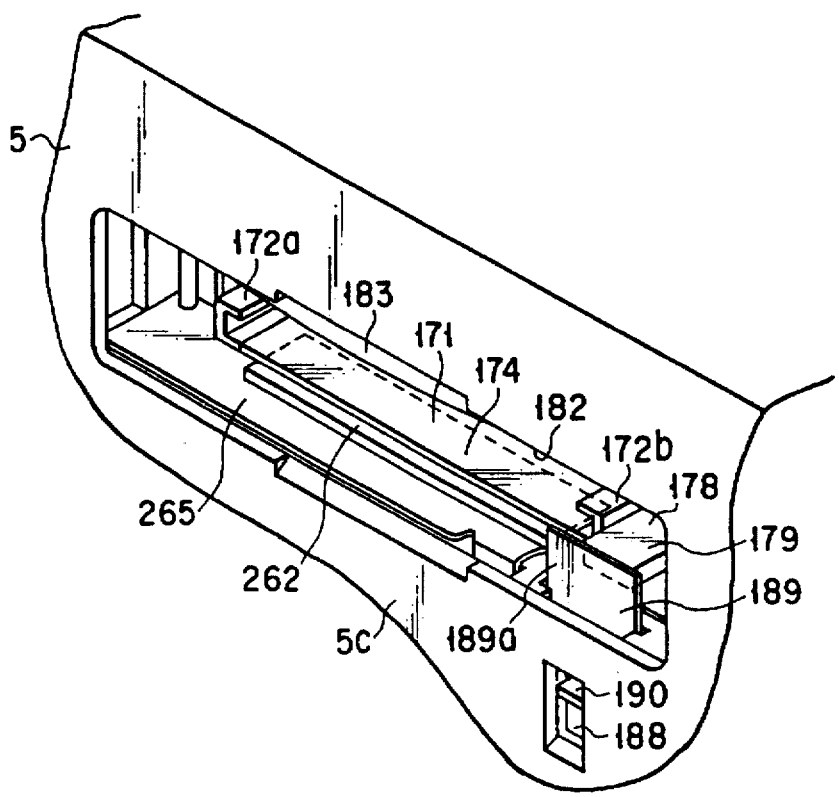
FIG. 35A is a perspective view of the computer in a state wherein a lock plate is slid to a lock position.
Figure 35B:
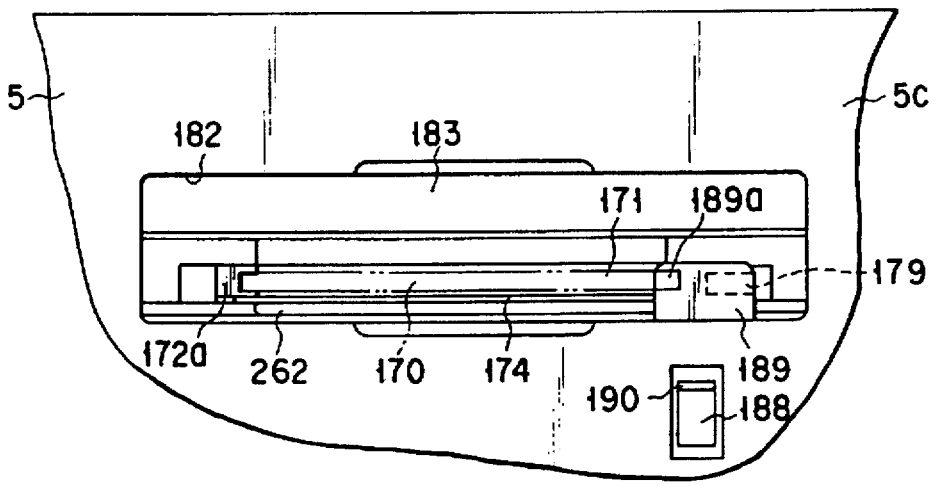
FIG. 35B is a side view of the computer in a state wherein the lock plate is slid to the lock position.

As shown in FIG. 35B, the lock plate 189 has a width larger than that of the push lever 179, and has a lock portion 189a protruding between the guide rails 172a and 172b. The lock portion 189a is hooked to the trailing end of the card modem 170 loaded into the card storage portion 171 when the lock plate 189 is pushed up to the lock position.

According to this lock mechanism 188, when the lock plate 189 is pushed up to the lock position after the card modem 170 is mounted in the card storage portion 171, the push lever 179 is covered with the lock plate 189 and hence cannot be depressed while the card modem 170 is used. This prevents the operator from erroneously ejecting the card modem 170 from the card storage portion 171 while the card modem 170 is used.

According to the above description, while the card modem 170 is used, the lock portion 189a of the lock plate 189 is hooked to the trailing end of the card modem 170. For this reason, removal of the card modem 170 from the card storage portion 171 can be prevented even if an external force is applied to the card modem 170 to extract it from the card storage portion 171 when, for example, the cable 176 extending from the card insertion port 182 is pulled.

Since the lock plate 189 is hooked to the trailing end of the card modem 170 at the same time the plate covers the push lever 179, the operator cannot depress the push lever 179 with his/her finger while removal of the card modem 170 is prevented. If the card storage portion 171 is designed such that the card modem 170 is locked therein by only pushing the trailing end of the card modem 170, the operator may forget to lock the card modem 170, and depress the push lever 179. In this case, an undesirable force acts on a portion, of the ejector 178, which depresses the card modem 170. As a result, the ejector 178 may be damaged.

In contrast to this, according to the lock mechanism 188 having the above-described arrangement, when the lock plate 189 is pushed up to the lock position, the push lever 179 is covered with the lock plate 189 and hence cannot be accidentally depressed. This prevents the ejector 178 from being damaged when the push lever 179 is erroneously operated.

As shown in FIGS. 22 and 36, first and second card storage portions 195a and 196a are provided inside the case 4. Each of the first and second card storage portions 195a and 196a removably houses the memory cards 193 and 194 as card-like electronic components. The first card storage portion 195a is disposed on the upper surface of the main circuit board 100. The second card storage portion 196a is disposed on the lower surface of the main circuit board 100. Therefore, the first and second card storage portions 195a and 196a are provided at the same position so as to oppose each other across the main circuit board 100.

The first and second card storage portions 195a and 196a have a pair of card connectors 195 and 196 to which the memory cards 193 and 194 are detachably connected. The card connectors 195 and 196 are located on the left end portion of the front half of the main circuit board 100. The card connectors 195 and 196 are respectively disposed on the upper and lower surfaces of the main circuit board 100 at the same position so as to oppose each other through the main circuit board 100. The card connectors 195 and 196 have many pin terminals 197, respectively. The pin terminals 197 to the card connectors 195 and 196 detachably connected to the terminal portions of the memory cards 193 and 194.

As shown in FIG. 36, the first and second card storage portions 195a and 196a have metal housings 198 and 199. The metal housings 198 and 199 are disposed on the upper and lower surfaces of the main circuit board 100, and cover the card connectors 195 and 196, respectively.

The housings 198 and 199 respectively have opening portions 198a and 199a on their end portions on the opposite side to the pin terminals 197. The opening portions 198a and 199a respectively allow the memory cards 193 and 194 to be inserted/removed therein/therefrom. Guide paths 200 and 201 for respectively guiding the memory cards 193 and 194 to the card connectors 195 and 196 are formed between the housings 198 and 199 and the main circuit board 100. The guide paths 200 and 201 communicate with the opening portions 198a and 199a, respectively. The opening portions 198a and 199a are located near the inner surface of the left side wall 5c of the case body 5.

As shown in FIGS. 36 and 37, a card insertion port 203 is formed in the front half of the left side wall 5c of the case body 5 so as to oppose the opening portions 198a and 199a. The card insertion port 203 has a rectangular shape extending in the lateral direction. An inner cover 204 is disposed between the card insertion port 203 and the opening portions 198a and 199a of the guide paths 200 and 201. The inner cover 204 has a peripheral wall 205 extending along the edge portion of the card insertion port 203, and an end wall 206 continuous with the peripheral wall 205. The inner cover 204 is fixed to the inner wall of the case body 5 with screws. The peripheral wall 205 covers the space between the left side wall 5c and the main circuit board 100. The end wall 206 is located between the guide paths 200 and 201 and the card insertion port 203. An introduction port 207 communicating with the opening portions 198a and 199a is opened in the end wall 206.

A card cover 208 for opening/closing the card insertion port 203 is supported on the left side wall 5c of the case body 5. The card cover 208 has a plate-like rectangular shape conforming to the shape of the card insertion port 203. The card cover 208 is disposed along the inner surface of the left side wall 5c and is designed to be vertically slidable between a closing position at which the cover closes the card insertion port 203 and an opening position at which the cover is pushed below the card insertion port 203 to open the card insertion port 203. As shown in FIG. 36, while the memory cards 193 and 194 are connected to the card connectors 195 and 196, the memory cards 193 and 194 are located deeper in the case 4 than the card insertion port 203. With this structure, the card cover 208 can be slid to the closing position to close the card insertion port 203 regardless of the presence/absence of the memory cards 193 and 194.

Figure 21:
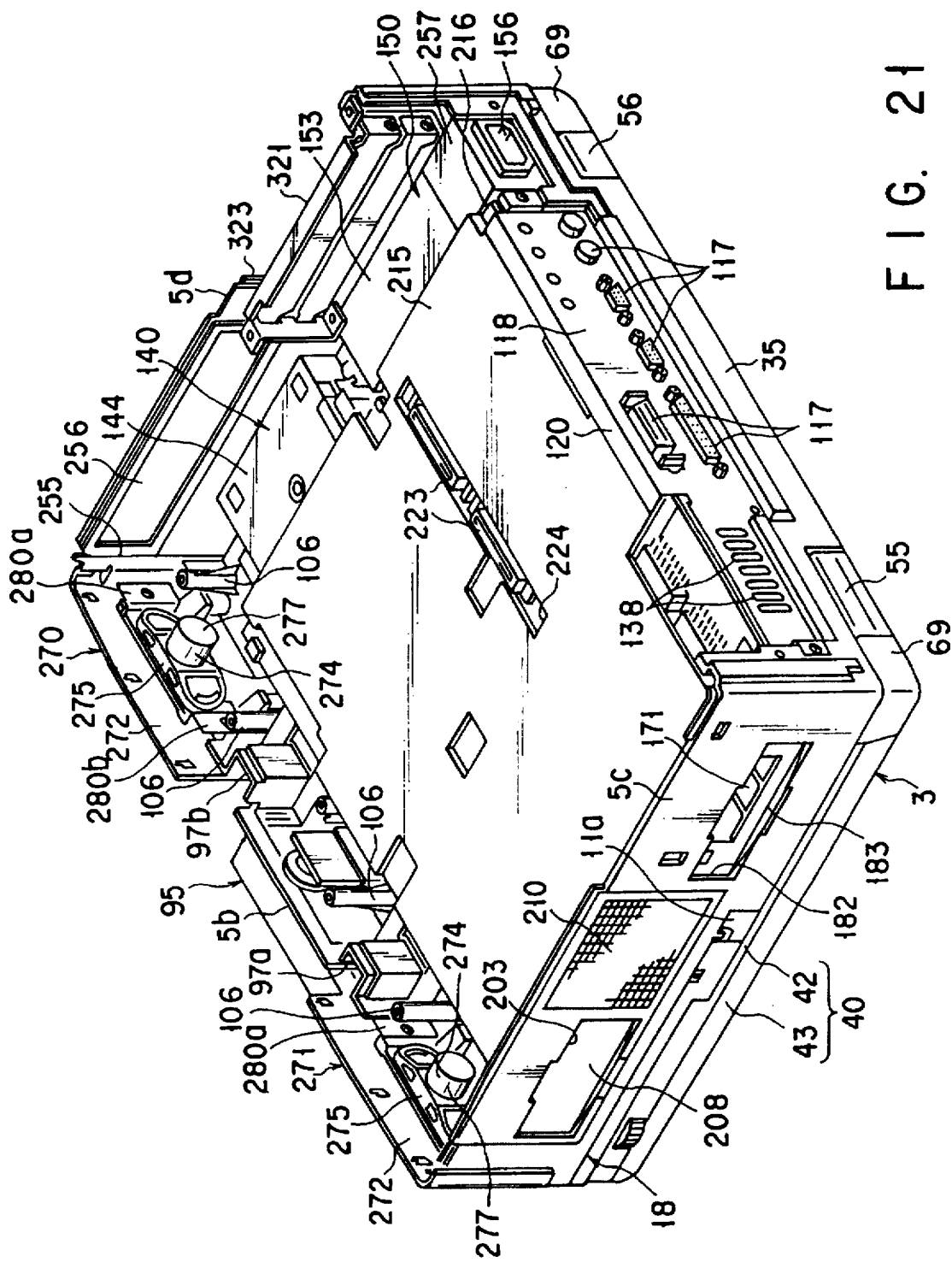
Figure 32:
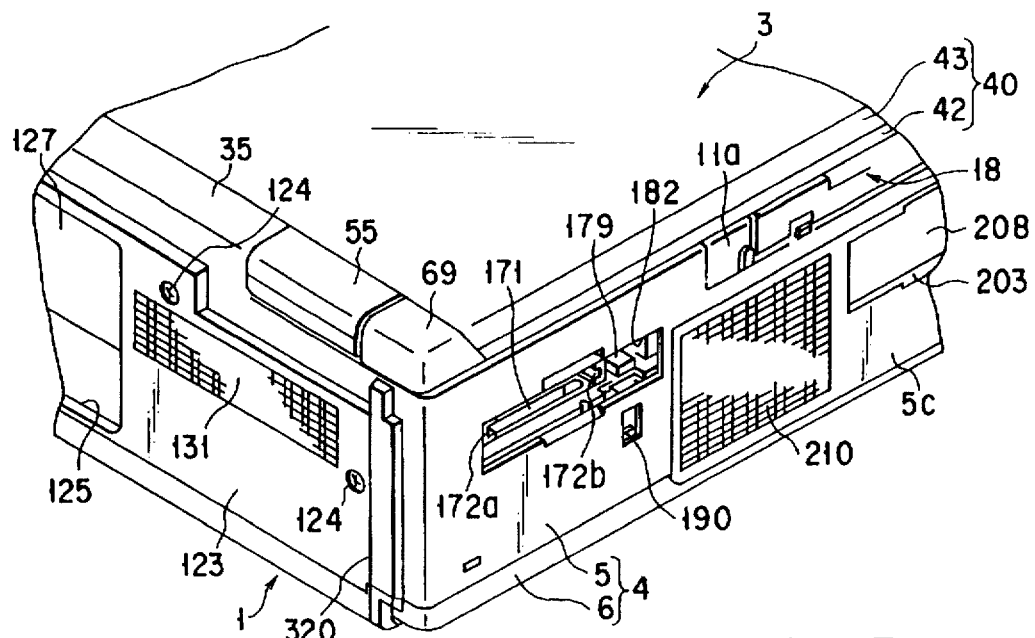

As shown in FIGS. 21 and 32, the card insertion ports 182 and 203 are formed in the left side wall 5c of the case body 5 to be spaced apart from each other in the back-and-forth direction. An exhaust port 210 for causing the inside and outside of the case 4 to communicate with each other is formed between the card insertion ports 182 and 203. The exhaust port 210 is constituted by a large number of small holes arranged in the form of a mesh. As shown in FIG. 38, the exhaust port 210 communicates with both the upper mount area 103 and the lower mount area 104. The CPU 109 which generates a large amount of heat is disposed near the exhaust port 210. As shown in FIGS. 4 and 5, a vent 211 communicating with the upper mount area 103 is formed in the right side wall 5d of the case body 5. This vent 211 is also constituted by a large number of small holes arranged in the form of a mesh, and is located on the opposite side to the exhaust port 210.

As shown in FIGS. 1A and 2, the lower surface of the main circuit board 100 which faces the lower mount area 104 is covered with a main shield plate 215 consisting of a metal. The main shield plate 215 has substantially the same size as that of the main circuit board 100. A plurality of mount pieces 216 bent upward are formed on the peripheral portion of the main shield plate 215. The main shield plate 215 is fixed to the case body 5 in such a manner that the mount pieces 216 are stacked on the lower surface of the main circuit board 100 and are fixed to the boss portions 101 with screws together with the main circuit board 100. In this case, the main circuit board 100 has ground wiring patterns 100a (shown in FIG. 39) at its portions in contact with the mount pieces 216 and the boss portions 101. With this structure, when the main circuit board 100 and the main shield plate 215 are fixed to the boss portions 101 with screws, the wiring patterns 100a are brought into contact with the layer 37a of the case body 5 and the main shield plate 215 so as to electrically connect the main circuit board 100 and the main shield plate 215 to the case body 5. As shown in FIGS. 28 and 29, the rear end portion of the main shield plate 215 is stacked on the lower flange portion 120 of the rear shield plate 118 so that the main shield plate 215 is also electrically connected to the rear shield plate 118.

That is, the main shield plate 215 surrounds the upper mount area 103 together with the layer 37a on the inner surface of the case body 5 and the rear shield plate 118 to provide an electromagnetic shield, which prevents high-frequency noise generated by the circuit components 108 and noise from the FDD 140 and the power supply unit 150 from leaking outside the case 4.

As shown in FIGS. 1A and 24, the lower mount area 104 is partitioned into a first half zone 221 and a second half zone 222 by an expansion circuit board 220. The expansion circuit board 220 is disposed at a right angle with respect to the main circuit board 100. The expansion circuit board 220 is electrically connected to the lower surface of the main circuit board 100 via a connector 223. For this purpose, the main shield plate 215 has an elongated opening portion 224 for allowing the connector 223 to pass therethrough. As shown in FIG. 39, a reinforcing plate 225 is fixed to the front surface of the expansion circuit board 220 which opposes the first half zone 221. The reinforcing plate 225 also serves as a shield plate and has contact pieces 226 in contact with the ground wiring patterns 100a of the main circuit board 100. A plurality of expansion connectors 227a and 227b and a plurality of relay connectors 228a and 228b are mounted on the rear surface of the expansion circuit board 220 which opposes the second half zone 222.

As shown in FIG. 20, a hard disk drive (to be referred to as an HDD hereinafter) 231 and a bracket 232 for mounting a CD drive 230 using a compact disk (CD) as a ROM are detachably mounted on the first half zone 221 of the lower mount area 104. FIG. 20 is a perspective view of the reversed portable computer 1, viewed from the bottom side of the case 4. The HDD 231 and the bracket 232 are located side by side.

Figure 40:
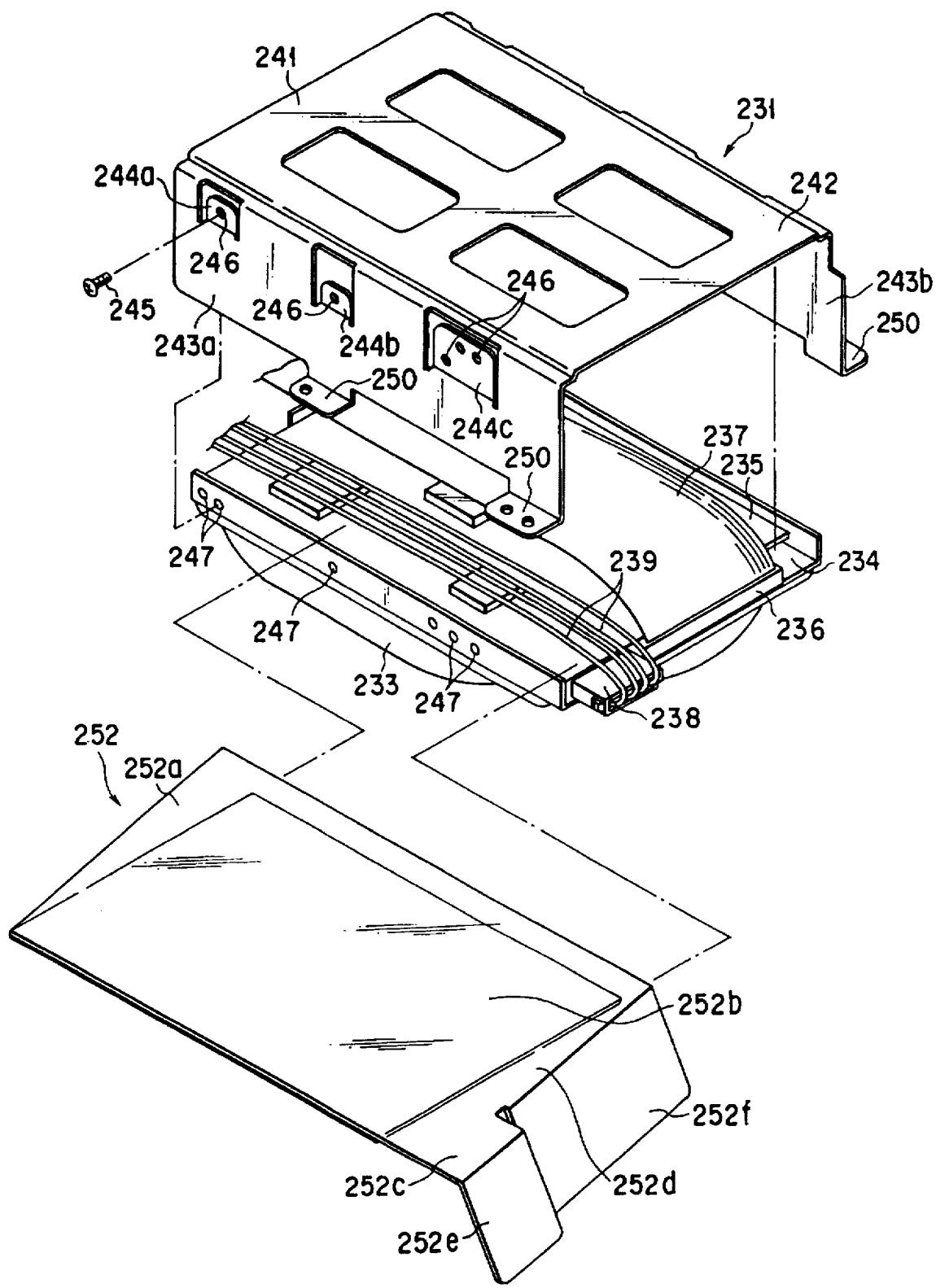

As shown in FIG. 40, the HDD 231 comprises a housing having a hermetic structure and a circuit board 235. A magnetic disk and a head are housed in the housing 233. The circuit board 235 is mounted on the lower surface of the housing 233 via a board bracket 234. Flat signal cables 237 are connected to the front end portion of the circuit board 235 via a first connector 236, and power cables 239 are also connected to the front end portion of the circuit board 235 via a second connector 238. FIG. 40 is a perspective view of the HDD 231, viewed from the lower surface side. In FIG. 40, the posture of the HDD 231 is reversed with respect to the case body 5.

The HDD 231 is supported on the lower surface of the main circuit board 100 via an HDD bracket 241. The HDD bracket 241 comprises a bottom plate 242 and a pair of side plates 243a and 243b. The bottom plate 242 covers the circuit board 235 of the HDD 231 from below. The side plates 243a and 243b cover the HDD 231 from the left and right sides. Each of the side plates 243a and 243b has three support pieces 244a, 244b, and 244c. The left and right side surfaces of the board bracket 234 are clamped between the support pieces 244a, 244b, and 244c of the side plates 243a and 243b. One or a plurality of through holes 246 are formed in each of the support pieces 244a, 244b, and 244c. A mount screw 245 is to be threadably engaged with each through hole 246. Each through hole 246 matches one of a plurality of screw holes 247 formed in the left and right side surfaces of the board bracket 234. The HDD 231 is fixed to the HDD bracket 241 by aligning the screw holes 247 with the through holes 246 of the HDD bracket 241 and turning the screws 245 into the screw holes 247 through the through holes 246. With this structure, the signal cables 237 and the power cables 239 are arranged between the circuit board 235 and the bottom plate 242 of the HDD bracket 241. The signal cables 237 and the power cables 239 are folded backward immediately after they are extracted from the first and second connectors 236 and 238, and the distal ends of these cables 237 and 239 are detachably connected to the relay connector 228b of the expansion circuit board 220 and a power supply connector (not shown) via a connector 251.

As shown in FIGS. 40 and 41, the signal and power cables 237 and 239 are covered with a cable guide 252. The cable guide 252 is formed By bending a thin plate consisting of a hard synthetic resin material, and has clamping portions 252a and 252b for vertically clamping the cables 237 and 239. The cable guide 252 is inserted between the bottom plate 242 of the HDD bracket 241 and the circuit board 235. The clamping portion 252a located above the cables 237 and 239 has first and second connector cover portions 252c and 252d extending below the first and second connectors 236 and 238. The first and second connector cover portions 252c and 252d protrude farther to the front wall 5b of the case body 5 than the HDD bracket 241.

The HDD bracket 241 can also be applied to another large-capacity HDD as an optional unit. In this case, after the HDD 231 as a standard unit is disconnected, an HDD as an optional unit may be inserted between the side plates 243a and 243b of the HDD bracket 241 to be fixed thereto with the screw holes of the HDD being aligned with the through holes 246.

Figure 43:
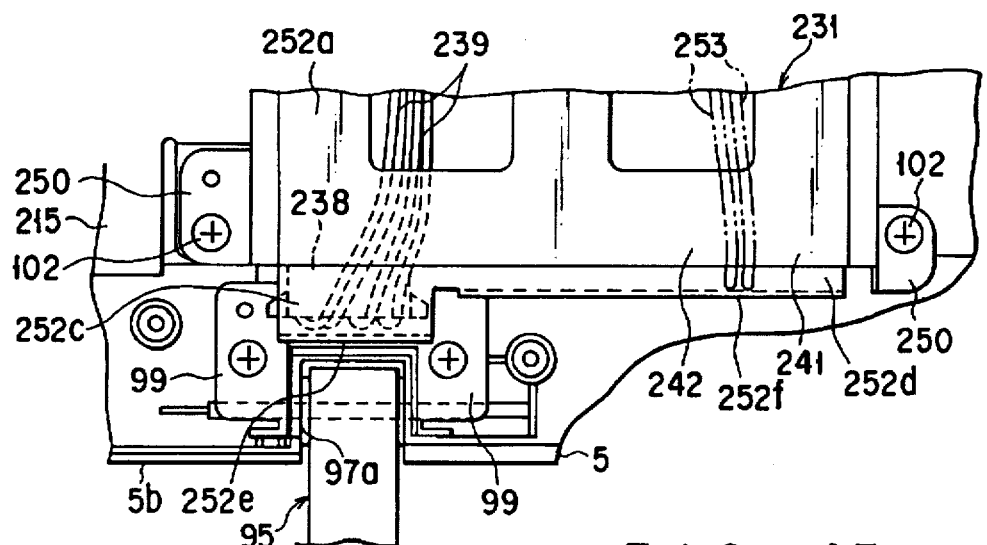

As shown in FIG. 42, the side plates 243a and 243b of the HDD bracket 241 have a plurality of support pieces 250 to be stacked on the mount pieces 216 of the main shield plate 215. The support pieces 250 are fixed to the boss portions 101 together with the main circuit board 100 and the main shield plate 215 by using the screws 102. With this structure, the HDD 231 is supported on the case body 5. The HDD 231 is disposed in a posture in which the first and second connectors 236 and 238 face the front wall 5b of the case body 5. The second connector 238 protrudes farther forward than the housing 233 and the HDD bracket 241, and is located near the handle receiving portion 96 of the bottom cover 6. For this reason, in this embodiment, a first guide piece 252e for restraining the power cables 239 from protruding forward is integrally formed on the first connector cover portion 252c of the cable guide 252. As shown in FIGS. 42 and 43, the first guide piece 252e extends upward from the connector cover portion 252c. The upper end of the first guide piece 252e reaches the inside of the second recess 97a of the case body 5 and is located inside the fitting portion between the second recess 97a and the handle receiving portion 96 of the bottom cover 6. The folded portions of the power cables 239 are abutted against the inner surface of the first guide piece 252e to restrain the power cables 239 from protruding forward. With this structure, the first guide piece 252e of the cable guide 252 prevents the power cables 239 from being caught between the handle receiving portion 96 and the second recess 97a when the bottom cover 6 is fitted on the opening portion of the bottom surface of the case body 5.

Assume that the CD drive 230 is mounted in the first half zone 221 of the lower mount area 104. In this case, as shown in FIG. 43, other signal cables 253 extending from the CD drive 230 may be caused to extend between the bottom plate 242 of the HDD bracket 241 and the circuit board 235. The signal cables 253 are inserted between the HDD 231 and the front wall 5b of the case body 5. For this reason, in this embodiment, a second guide piece 252f for restraining the signal cables 253 from protruding forward is integrally formed on the second connector cover portion 252d of the cable guide 252. Similar to the first guide piece 252e, the second guide piece 252f extends upward from the second connector cover portion 252d. The upper end of the guide piece 252f reaches the inside of the second recess 97a, and is located between the fitting portion between the second recess 97a and the handle receiving portion 96 of the bottom cover 6. The signal cables 253 are abutted against the inner surface of the second guide piece 252f to restrain the signal cables 253 from protruding forward. With this structure, the second guide piece 252f of the cable guide 252 prevents the signal cables 253 from being caught between the handle receiving portion 96 and the second recess 97a when the bottom cover 6 is fitted on the opening portion of the bottom surface of the case body 5.

Figure 44:
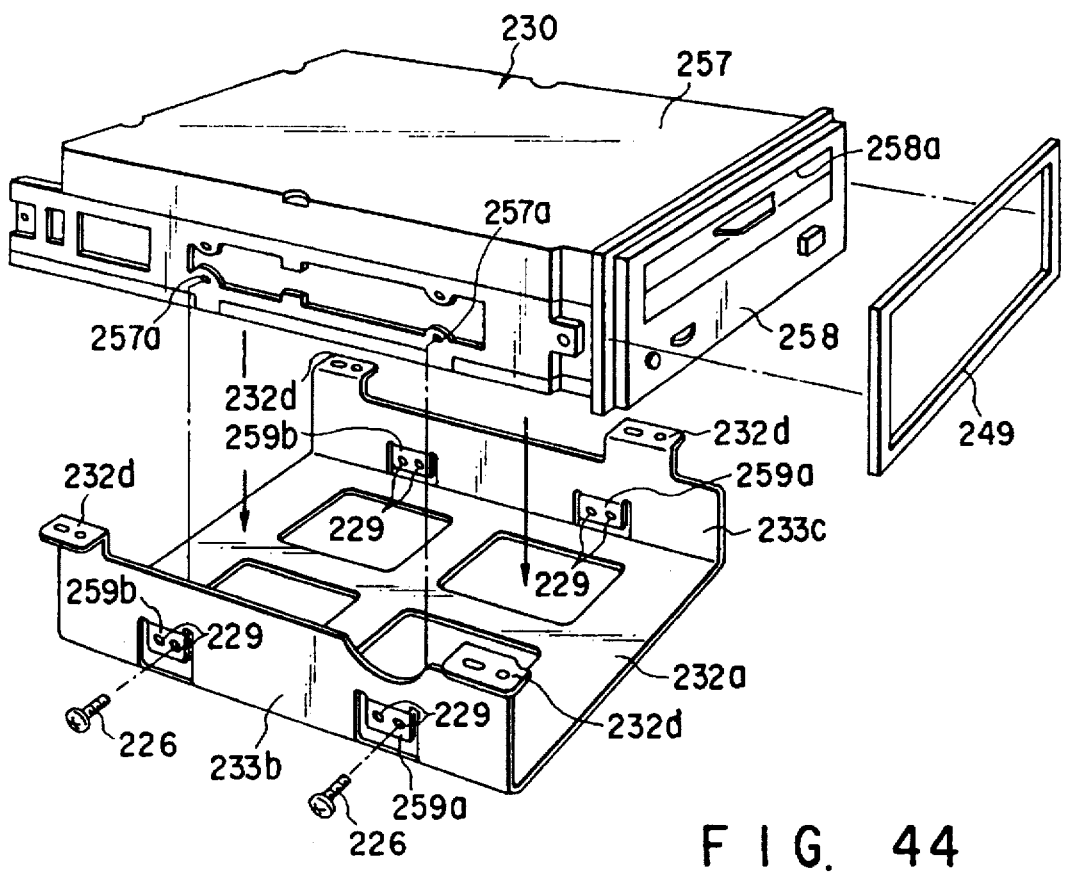

As shown in FIG. 44, the CD drive 230 has a box-like metal casing 257. A face panel 258 having an insertion port 258a for a compact disk is mounted on one end portion of the casing 257. The peripheral portion of the face panel 258 protrudes farther vertically and laterally than the casing 257. The CD drive 230 is mounted in the lower mount area 104 via the bracket 232. The bracket 232 comprises a bottom plate 232a covering the casing 257 from below, and a pair of side plates 232b and 232c covering the casing 257 from the left and right sides. Each of the side plates 232b and 232c has two support pieces 259a and 259b. The side surfaces of the casing 257 are clamped between these support pieces 259a and 259b. A plurality of through holes 229 for allowing mount screws 226 to be inserted therethrough are formed in each of the support pieces 259a and 259b. Each through hole 229 matches one of a plurality of screw holes 257a formed in the side surfaces of the casing 257. With this structure, the CD drive 230 is fixed to the bracket 232 by aligning the screw holes 257a with the through holes 229 of the bracket 232 and turning the screws 226 into the screw holes 257a via the through holes 229.

Figure 45:
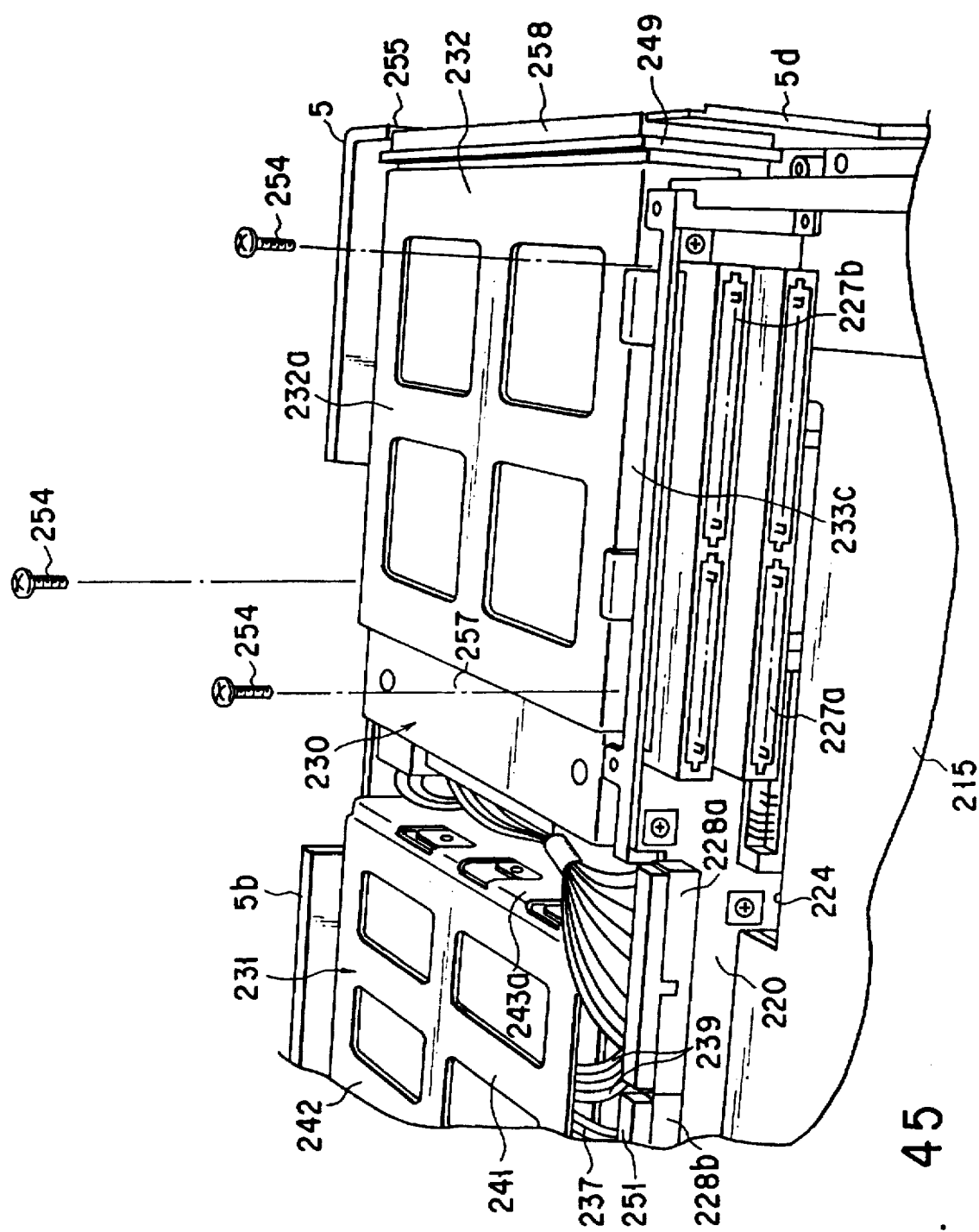

As shown in FIG. 44, the side plates 232b and 232c of the bracket 232 have a plurality of fixing pieces 232d. The fixing pieces 232d are fastened and fixed to the boss portions 101 of the case body 5 with screws 254 shown in FIG. 45. With this structure, the CD drive 230 is supported on the case body 5 in a posture in which the face panel 258 faces the right side wall 5d of the case body 5. An opening portion 255 through which the face panel 258 is exposed is formed in the right side wall 5d of the case body 5. As shown in FIGS. 5 and 46A, the opening portion 255 has an opening larger than the face panel 258, and a space 248 for causing the inside and outside of the case body 5 to communicate with each other is present between the edge of the opening portion 255 and the face panel 258.

A frame-like rectangular seal member 249 is mounted on the casing 257 of the CD drive 230. The seal member 249 is made of an elastic material such as rubber and is located at an end portion, of the casing 257, located on the face panel 258 side. As shown in FIG. 46A, the seal member 249 covers the space 248 between the opening portion 255 and the face panel 258 from the inside of the case body 5. With this structure, the interior of the case 4 is not seen through the space 248 to improve the outer appearance of the portable computer 1 and prevent dust and foreign substances from entering the case 4.

As shown in FIG. 46B, when the CD drive 230 is not mounted on the lower mount area 104, the opening portion 255 is covered with a detachable blind cover 256. The blind cover 256 is continuous with the right side wall 5d of the case body 5 to constitute part of the right side wall 5d. The blind cover 256 is held by the bottom cover 6, and can be removed from the case body 5 when the bottom cover 6 is removed from the case body 5.

As shown in FIGS. 1A and 2, the second half zone 222 of the lower mount area 104 serves to store large standardized expansion boards 260a and 260b which are commercially available. These expansion boards 260a and 260b are vertically stacked in the second half zone 222. The second half zone 222 is opened to the rear side of the case 4 when the rear panel 123 is removed. As shown in FIG. 30, when the rear panel 123 is removed, an expansion slot 320 for allowing insertion of a board is opened in the rear surface of the case 4. The expansion slot 320 has an opening shape elongated in the lateral direction and extending throughout the total width of the case 4.

A metal inner cover 321 is mounted on the left end portion of the second half zone 222, when viewed from the rear side of the portable computer 1. The inner cover 321 is fixed to the case body 5 together with the power supply unit 150 with screws. As shown in FIGS. 20 and 30, the inner cover 321 has a pair of connector extraction ports 322a and 322b through which relay connectors (not shown) of the expansion boards 260a and 260b are exposed. The inner cover 321 is located near the right side wall 5d of the case body 5. An opening portion 323 is formed in the right side wall 5d. As shown in FIG. 20, a frame-like rectangular cover support wall 324 is integrally formed on the right end portion of the bottom cover 6. The cover support wall 324 is inserted between the opening portion 323 and the inner cover 321. The cover support wall 324 has an opening/closing cover 325 for opening/closing the opening portion 323. The cover 325 is supported on the cover support wall 324 to be vertically pivotal between a closing position at which the opening portion 323 is closed and an opening position at which the opening portion 323 is opened. When the cover 325 is pivoted to the closing position, the cover 325 becomes continuous with the right side wall 5d of the case body 5 to constitute part of the right side wall 5d.

As shown in FIG. 25, a fan unit 264 is disposed on the left end portion of the second half zone 222. The fan unit 264 has a box-like fan frame 265. The fan frame 265 is fixed to the case body 5 together with the main circuit board 100 with screws. As shown in FIG. 33, the fan frame 265 is located below the card storage portion 171 and is adjacent to the left side wall 5c of the case body 5. The upper surface of the fan frame 265 opposes the shield plate 174 of the card storage portion 171 via a space 263. A shield member 262 filling the space 263 is bonded to the upper surface of the fan frame 265. The shield member 262 has the same arrangement as that of the shield member 92. That is, the shield member 262 comprises an outer tube formed by plating the surface of a polyester fiber with a conductive metal, and a foamed urethane elastic member filling the outer tube. The shield member 262 is in contact with the shield plate 174 to fill the space 263, thereby preventing high-frequency noise generated by the circuit components 108 on the main circuit board 100 from leaking through the space 263.

As shown in FIGS. 25 and 33, a pair of insertion guides 266a and 266b are mounted on the fan frame 265 to be arranged side by side in the vertical direction. The insertion guides 266a and 266b respectively have guide grooves 268a and 268b for guiding the expansion boards 260a and 260b in the inserting direction while slidably clamping the expansion boards 260a and 260b when the boards are inserted through the expansion slot 320. When the expansion boards 260a and 260b are inserted along the insertion guides 266a and 266b to predetermined positions in the second half zone 222, the expansion boards 260a and 260b are electrically connected to the expansion connectors 227a and 227b, respectively.

As shown in FIG. 38, the front end portion of the fan frame 265 is inserted into both the first half zone 221 of the lower mount area 104 and the upper mount area 103. A second cooling fan 267 for dissipating heat from the upper mount area 103 and the lower mount area 104 is mounted on the front end portion of the fan frame 265. The second cooling fan 267 is located inside the exhaust port 210.

With this structure, when the second cooling fan 267 is operated, outer air is drawn into the upper mount area 103 and the lower mount area 104 via the vent 211 of the right side wall 5d of the case body 5 and the lower vent 132 of the rear panel 123. As indicated by the arrows in FIG. 38, the drawn outer air flows in the upper and lower mount areas 103 and 104 toward the second cooling fan 267. In the process of this flow, the expansion boards 260a and 260b and the HDD 231 are cooled, and the circuit components 108 and the CPU 109 on the main circuit board 100 are also cooled. Thereafter, the outer air is exhausted outside the case 4 via the exhaust port 210.

Figure 47:
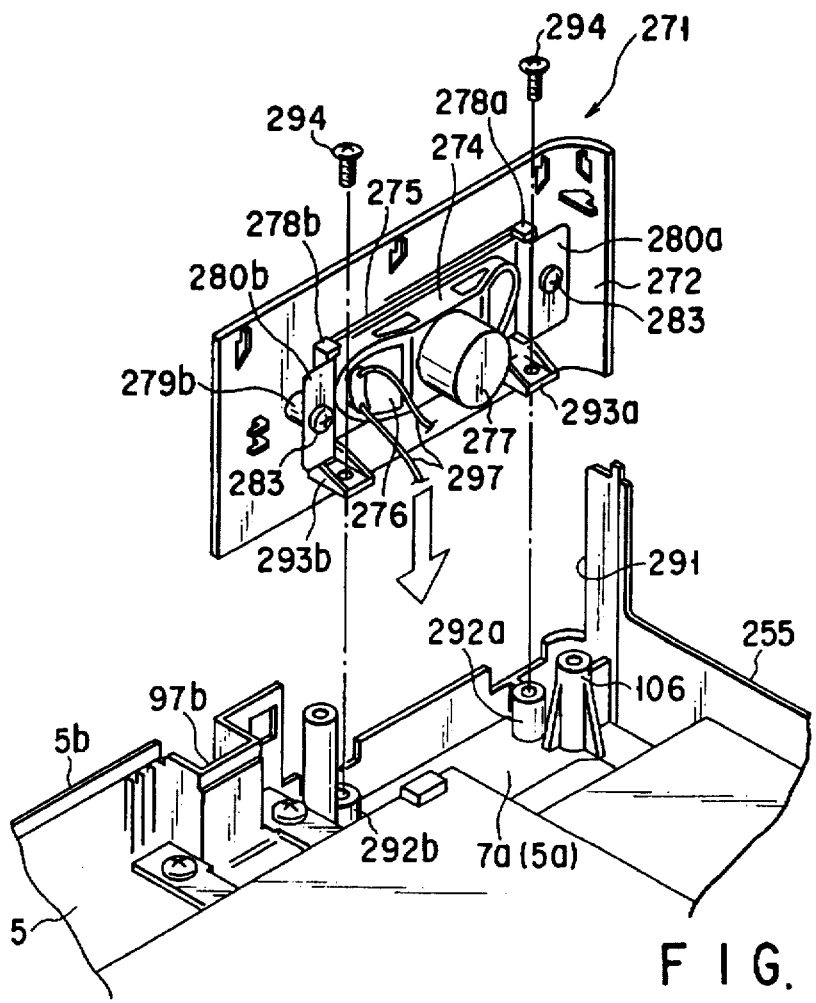
Figure 48:
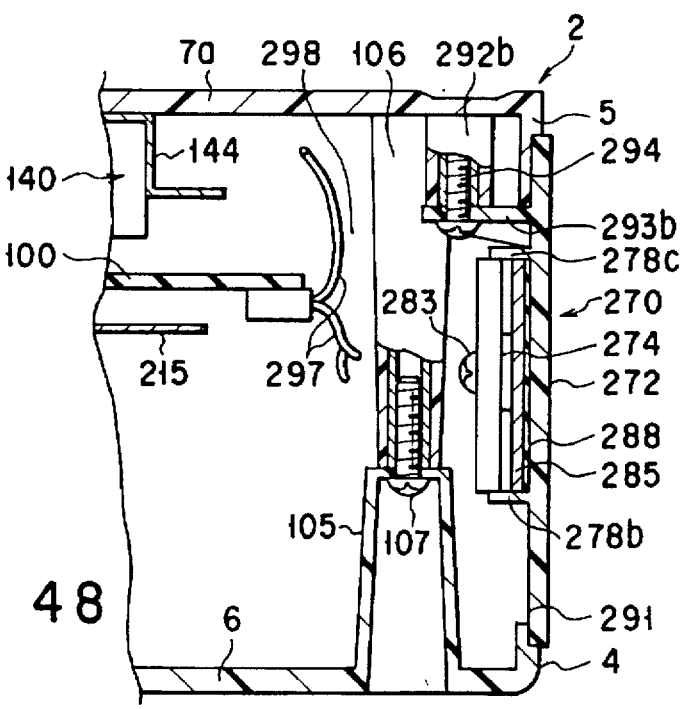
Figure 49:
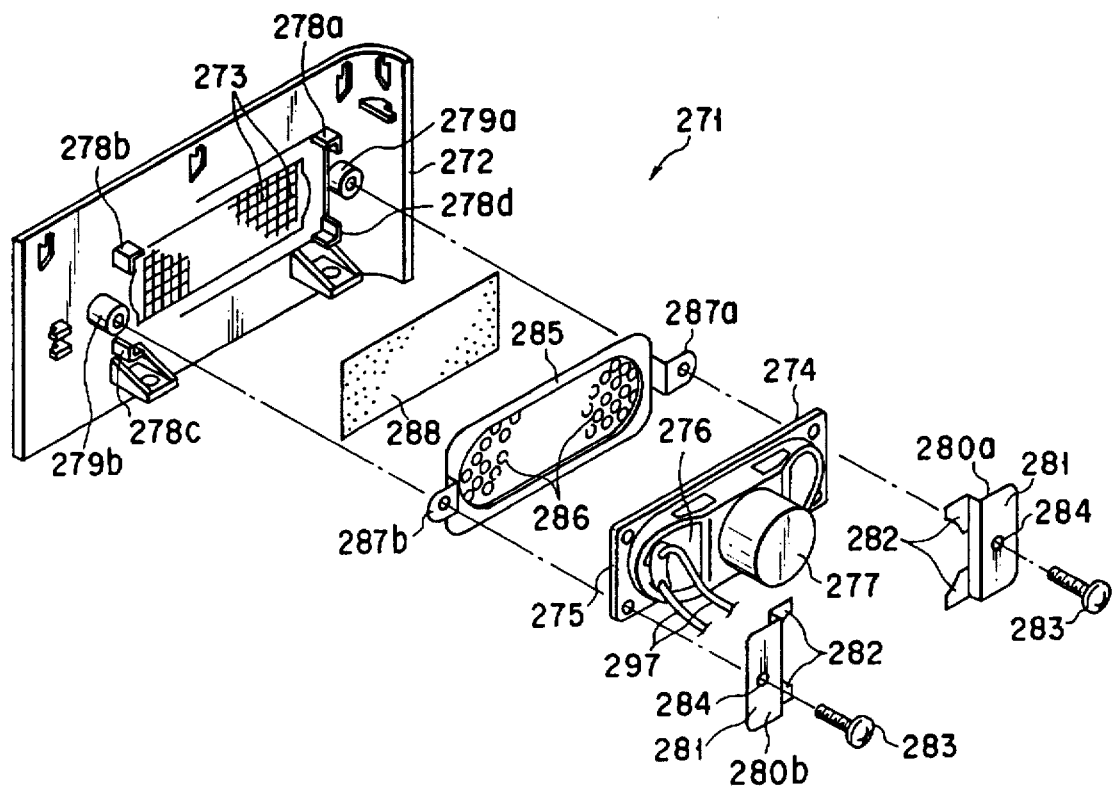

As shown in FIGS. 3 and 20, a pair of left and right speaker units 270 and 271 are disposed on the front wall 5b of the case body 5. These speaker units 270 and 271 serve to emit sounds reproduced by the CD drive 230. Since the speaker units 270 and 271 have the same arrangement, the right speaker 271 will be described as a representative. As shown in FIGS. 47 to 49, the speaker unit 271 has a support panel 272 consisting of a synthetic resin material. A large number of small holes 273 are formed in the central portion of the support panel 272 in the form of a mesh. A speaker 274 is mounted on the inner surface of the support panel 272. The speaker 274 has a rectangular metal speaker frame 275 and a black cone 276 supported on the front surface of the speaker frame 275 and vibrated by a magnet (not shown). The cone 276 opposes the small holes 273. A metal cover 277 covering the magnet and a voice coil is mounted on the rear surface of the speaker frame 275. The support panel 272 have support portions 278a to 278d for supporting the four corner portions of the speaker frame 275 and a pair of boss portions 279a and 279b respectively located on the left and right sides of the speaker 274. The support portions 278a to 278d serve to position the speaker 274 at a predetermined position on the support panel 272. With this positioning, the cone 276 is located to oppose the small holes 273.

The speaker 274 is fixed to the support panel 272 via a pair of metal press plates 280a and 280b. The press plates 280a and 280b have base portions 281 stacked on boss portions 279a and 279b, and tongue portions 282 which are in contact with the left and right end portions of the speaker frame 275. Through holes 284 through which set screws 283 extend are formed in the central portions of the base portions 281. When the screws 283 extending through the through holes 284 are threadably engaged with the boss portions 279a and 279b, the press plates 280a and 280b are fixed to the boss portions 279a and 279b, respectively, and the left and right end portions of the speaker frame 275 are clamped between the tongue portions 282 and the support panel 272.

A metal shield plate 285 is interposed between the speaker 274 and the support panel 272. The shield plate 285 serves to prevent a magnetic field from the cone 276 from leaking outside the case 4. The shield plate 285 has a flat rectangular shape covering the front surface of the cone 276. The shield plate 285 has a large number of through holes 286 so as not to interfere with sound radiation. Fixing tongue pieces 287a and 287b are integrally formed on the left and right end portions of the shield plate 285. The tongue pieces 287a and 287b are clamped between the boss portions 279a and 279b and the press plates 280a and 280b and are fixed to the support panel 272 together with the speaker 274.

In this embodiment, since the case body 5 is colored in a whitish color as described above, the support panel 272 is also colored in a whitish color. If the support panel 272 has a whitish color, the black cone 276 is seen from the outside of the case 4 through the small holes 273 and the through holes 286, and the front surface of the support panel 272 partly becomes black. In order to prevent this, a white woven cloth 288 is arranged between the inner surface of the support panel 272 and the cone 276. With the presence of the woven cloth 288, the black cone 276 is not easily seen from the outside of the case 4 through the small holes 273, thus maintaining the portable computer 1 in a good outer appearance.

These speaker units 270 and 271 are detachably attached on the front wall 5b of the case body 5. As shown in FIGS. 47 and 48, the front wall 5b of the case body 5 has notched portions 291 on the left and right sides of the handle 95. A pair of left and right seat portions 292a and 292b are formed upright on the inner surface, of the upper wall 5a, which faces the notched portion 291. The support panel 272 is stacked on the front wall 5b to cover the notched portion 291 from outside. A pair of left and right mount pieces 293a and 293b stacked on the seat portions 292a and 292b are formed upright on the inner surface of the support panel 272. The mount pieces 293a and 293b are fastened to the seat portions 292a and 292b with screws 294, respectively. With this fastening, the speaker units 270 and 271 are supported on the case body 5. The support panel 272 is continuous with the front wall 5b and the left and right side walls 5c and 5d on substantially the same planes, thus constituting parts of the front wall 5b and the side walls 5c and 5d.

According to the speaker units 270, 271 having the above arrangement, since the shield plate 285 is inserted between the speaker 274 and the support panel 272, a magnetic field from the speaker 274 can be prevented from leaking outside the case 4 through the support panel 272. Even if, therefore, a floppy disk is placed against the support panel 272, information stored in the floppy disk is not destroyed, and the influence of a magnetic field on the surroundings of the portable computer 1 can be suppressed.

In addition, since the speaker 274 is mounted on the case body 5 while it is attached to the support panel 272, damage to the cone 276 during this mounting operation can be prevented. Assume that the speaker 274 is mounted, as a single unit, on the case body 5. In this case, a mount space for the speaker 274 is narrow because the main circuit board 100 and other various parts are mounted in the case body 5. For this reason, the fragile cone 276 may interfere with a corner portion of the main circuit board 100 or circuit components mounted in the case body 5. As a result, the cone 276 may be damaged.

According to the above arrangement, however, since the speaker 274 can be mounted on the support panel 272 in a wide space independently of the case body 5, interference between the speaker 274 and peripheral parts such as the main circuit board 100 and the circuit components 108 can be prevented, thus facilitating the mounting of the speaker 274.

Furthermore, if various speakers 274 having different reproduction frequency bands are prepared as optional components, a speaker 274 can be selected and mounted on the support panel 272 in accordance with the taste of the operator. That is, the speaker 274 can be easily upgraded.

As shown in FIG. 20, a volume control dial 296 is disposed on the central portion of the front wall 5b. The dial 296 is located between the left and right speaker units 270 and 271. The dial 296 slightly protrudes from the front wall 5b to be operated with a finger of the operator. The speaker 274 is connected to the dial 296 and the main circuit board 100 via a lead wire 297. As shown in FIG. 48, the lead wire 297 is arranged through a space 298 between the front wall 5b and the main circuit board 100. In addition to the lead wire 297, the mount seat portions 105 and the coupling seat portions 106 which are abutted against each other are arranged in the space 298. If the abutting positions of the seat portions 105 and 106 and the wiring position of the lead wire 297 are on the same plane, the lead wire 297 may be caught between the seat portions 105 and 106 when the seats 105 and 106 are abutted against each other. For this reason, as shown in FIG. 48, the coupling seat portions 106 extending from the mount surface 7a are extended to a position closer to the bottom cover 6 than the wiring position of the lead wire 297. With this arrangement, the abutting positions of the mount seat portions 105 and the coupling seat portions 106 become closer to the bottom cover 6 than the wiring position of the lead wire 297, thereby preventing the lead wire 297 from being caught between the mount seat portions 105 and the coupling seat portions 106 when the bottom cover 6 is placed on the case body 5.

As shown in FIG. 50, the keyboard mount portion 7 has an expansion opening portion 300 in the central portion of the mount surface 7a. The expansion opening portion 300 communicates with the upper mount area 103 and the cord introduction port 27. The main circuit board 100 is exposed through the expansion opening portion 300. A cable 301 extending from the FDD 140, a power cable 302 extending from the power supply unit 150, and the cord 25 connected to the keyboard unit 18 are inserted between the expansion opening portion 300 and the main circuit board 100. Connectors 303a and 303b and a CPU connector 304 are arranged at a portion where the main circuit board 100 and the expansion opening portion 300 oppose each other. An expansion CPU 315 is selectively mounted on the CPU connector 304 to improve the memory performance.

A cover 305 consisting of a synthetic resin material and designed to open/close the expansion opening portion 300 is mounted on the mount surface 7a. As shown in FIG. 51, the inner surface of the expansion opening portion 300 which opposes the connectors 303a and 303b and the CPU connector 304 is covered with a conductive layer 37. The cover 305 has a pair of lock recess portions 306a and 306b. The operator can place/remove the cover 305 with his/her fingers being fitted in the lock recess portions 306a and 306b. A flange portion 307 receiving the peripheral portion of the cover 305 is formed on the peripheral portion of the expansion opening portion 300. The flange portion 307 has receiving recesses 308a and 308b in which the lock recess portions 306a and 306b are fitted. The lock recess portions 306a and 306b are fastened and fixed in the receiving recesses 308a and 308b with screws 310. With this structure, the cover 305 is fixed to the mount surface 7a on the same plane, thus constituting part of the mount surface 7a. Note that rubber caps 311a and 311b covering the screws 310 are detachably fitted in the lock recess portions 306a and 306b.

In this arrangement, when the expansion CPU 315 is to be additionally mounted, the keyboard unit 18 is removed from the mount surface 7a to expose the cover 305. The rubber caps 311a and 311b are then removed from the lock recess portions 306a and 306b, and the screws 310 are loosened to be removed. Finger tips of the operator are inserted in the lock recess portions 306a and 306b to lift the cover 305. With this operation, the expansion opening portion 300 is opened, and the CPU connector 304 is exposed through the expansion opening portion 300. In this state, the expansion CPU 315 is mounted on the CPU connector 304 through the expansion opening portion 300.

According to this arrangement, in additionally mounting the expansion CPU 315, there is no need to disassemble the case 4 or remove the main circuit board 100. Therefore, expansion of the portable computer 1 can be easily realized.

In addition, the cable 301 extending from the FDD 140, the power cable 302 extending from the power supply unit 150, and the cord 25 connected to the keyboard unit 18 are inserted into the expansion opening portion 300, and the connectors 303a and 303b for the connection of the cables 301 and 302 and the cord 25 are arranged on the upper surface of the main circuit board 100 which opposes the expansion opening portion 300. With this structure, the cables 301 and 302 and the cord 25 can be connected to the main circuit board 100 through the expansion opening portion 300. Therefore, all the connections between the keyboard unit 18, the FDD 140, the power supply unit 150, and the main circuit board 100 can be performed from the outside of the case body 5 after these components are mounted in the case body 5. Accordingly, assembly of the portable computer 1 is facilitated.

In the portable computer 1 having the above-described arrangement, when an optional unit such as the CD drive 230 or a large-capacity HDD is to be mounted on the lower mount area 104, the portable computer 1 is placed upside-down to expose the bottom cover 6. As is apparent, at this time, the display unit 3 needs to be held at the first position.

Subsequently, the screws 107 are loosened, and the bottom cover 6 is lifted to be separated from the case body 5. In this case, since the FDD 140 and the power supply unit 150 mounted, as standard units, in the portable computer 1 as well as the main circuit board 100 are supported on the case body 5, there is no possibility that the FDD 140 and the power supply unit 150 are removed together with the bottom cover 6 and cables and the like are extracted.

When the bottom cover 6 is removed, the entire lower mount area 104 is exposed to the outside of the case 4, as shown in FIG. 20. When the HDD 231 set on the first half zone 221 of the lower mount area 104 is to be replaced with a larger capacity HDD, the screws of the housing 233 are loosened, and the HDD 231 is removed from the first half zone 221 together with the housing 233. The screws used to fix the housing 233 to the case body 5 are loosened, and the HDD 231 is removed from the first half zone 221 together with the housing 233. Next the HDD 231 is removed from the housing 233, and the large-capacity HDD as an optional unit is then fixed to the housing 233 with screws. Thereafter, the housing 233 incorporating the HDD is fixed at a predetermined position on the first half zone 221 with screws, thus completing the mounting of the optional HDD.

Similarly, when the CD drive 230 is to be additionally mounted on the first half zone 221, the blind cover 256 is removed first to open the opening portion 255 of the right side wall 5d of the case body 5. The screws of the bracket 232 are then loosened, and the bracket 232 is removed from the first half zone 221. The CD drive 230 is then fixed to the bracket 232 with screws, and the bracket 232 is fixed at a predetermined position on the first half zone 221 again with screws. With this operation, the CD drive 230 is supported on the case body 5, and the face panel 258 is positioned at the opening portion 255.

When the expansion boards 260a and 260b are to be additionally mounted on the second half zone 222 of the lower mount area 104, the rear panel 123 is removed from the case body 5 to open the second half zone 222 to the rear side of the case 4 through the expansion slot 320, as shown in FIG. 30. The expansion boards 260a and 260b are then guided to the second half zone 222 by the insertion guides 266a and 266b. The leading ends of the expansion boards 260a and 260b are connected to the expansion connectors 227a and 227b. With this connection, the mounting of the expansion boards 260a and 260b is completed. As a result, the relay connectors of the expansion boards 260a and 260b are placed to oppose the connector extraction ports 322a and 322b. Therefore, when the expansion boards 260a and 260b are to be additionally mounted on the lower mount area 104, the bottom cover 6 need not be removed, and only the rear panel 123 needs to be removed from the case body 5.

According to the embodiment of the present invention, which has the above-described arrangement, the lower mount area 104, on which optional units such as a large-capacity HDD, the CD drive 230, and the expansion boards 260a and 260b are to be additionally mounted, is formed between the main circuit board 100 and the bottom cover 6. For this reason, the entire space below the main circuit board 100 can be used as the expansion space for the above optional units. Therefore, a sufficient expansion space can be ensured to allow many optional units to be mounted, as compared with a conventional technique of forming a recess in part of a case and using the recess as an expansion space.

In this embodiment, the lower surface of the main circuit board 100 is covered with the main shield plate 215, and the main circuit board 100 encloses the upper mount area 103 together with the layer 37a on the inner surface of the case body 5. With this structure, an electromagnetic shield can be provided for the FDD 140, the power supply unit 150, and the circuit components 108 mounted on the upper mount area 103. Therefore, leakage of noise from the base unit 2 can be prevented to realize a reliable countermeasure against electric wave troubles, in spite of the fact that the entire bottom of the case body 5 can be opened.

When the bottom cover 6 is removed, the entire lower mount area 104 is exposed to the outside of the case 4. For this reason, the main circuit board 100 need not be removed from the case 4 in mounting an optional unit. Therefore, mounting of an optional unit is facilitated, considering also that the lower mount area 104 is widely open.

Furthermore, since no partition walls for defining an expansion space in the case 4 are required, the shapes of the case body 5 and the bottom cover 6 can be simplified. For this reason, the mold structure for molding the case 4 can also be simplified, contributing to a reduction in manufacturing cost.

The portable computer 1 having the above arrangement has the second cooling fan 267 for forcibly cooling the interior of the case 4. When the second cooling fan 267 is operated, outer air drawn through the lower vent 132 of the rear panel 123 is mainly introduced into the lower mount area 104. In this case, when the connector cover 127 above the lower vent 132 is opened, the connector cover 127 overlaps the lower vent 132, as shown in FIG. 26. The presence of the connector cover 127 may interfere with introduction of outer air into the lower mount area 104.

However, since the connector cover 127 has the communicating hole 133 which communicates with the lower vent 132 when the connector cover 127 is opened, the lower vent 132 is not closed even if the connector cover 127 is opened to expose the expansion connectors 117. In addition, since the reinforcing plate 135 stacked on the inner surface of the rear panel 123 also has the communicating holes 137 communicating with the lower vent 132, the ventilation of the lower mount area 104 can be maintained, and overheat in an optional unit can be prevented.

The portable computer 1 has the display unit 3 pivotally coupled to the base unit 2. The liquid crystal display unit 41 of the display unit 3 is electrically connected to the main circuit board 100 via the cable 86 for transmitting electrical signals. Since this cable 86 is arranged between the first leg portion 55 and the adjacent projection 35, even if an electro-magnetic shield function is provided for the case 4 and the housing 40, noise generated by the cable 86 may leak from the case 4 via the boundary portions between the first pivot leg portion 55 and the projection 35. According to the above arrangement, however, since the portion, of the cable 86, which extends between the first leg portion 55 and the projection 35 is covered with the metal guide tube 90, noise from the cable 86 can be shielded by the guide tube 90. Furthermore, since the guide tube 90 is in contact with the layer 37a on the inner surface of the case body 5 and with the layer 43a on the inner surface of the housing 40 via the shield member 92, the guide tube 90 can be directly grounded to the case body 5 and the housing 40. Therefore, leakage of noise from the boundary portions between the first leg portion 55 and the projection 35 can be reliably prevented, and electric wave troubles can be more effectively reduced.

The present invention is not limited to the above-described embodiment. Various changes and modifications can be made within the spirit and scope of the invention.

For example, in the above embodiment, the bottom cover and the rear panel are separately formed. These parts may be integrated so that the bottom and rear surfaces of the case may be continuously opened.

In addition, the portable electronic apparatus according to the present invention is not limited to a portable computer, and the present invention can be equally applied to other apparatuses such as a wordprocessor.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A portable electronic apparatus wherein plurality of card-like electronic components are loaded/unloaded therethrough comprising:

a case having a side wall in which a card insertion port is opened;

a circuit board housed in said case, said circuit board having upper and lower surfaces; and first and second housings disposed on the upper and lower surfaces of said circuit board, said first and second housings forming first and second card storage portions in cooperation with the upper and lower surfaces of said circuit board, said first and second card storage portions being arranged at the same position so as to oppose each other across said circuit board and continuous with said card insertion port, said card-like electronic components being removably housed in said first and second card storage portions through said insertion port, said card-like electronic components being parallel to said circuit board when said card-like electronic components are housed in said first and second card storage portions.

2. An apparatus according to claim 1, wherein said first and second card storage portions respectively have an opening portion continuous with said insertion port, said opening portion being opened to a position located deeper in said case than said insertion port, and said card-like electronic components has a distal end portion which protrudes from said opening portions towards said insertion port, when said card-like electronic components are housed in said first and second card storage portions.

3. An apparatus according to claim 2, wherein said case has a card cover for opening/closing the card insertion port, and the card-like electronic components stored in said first and second card storage portions are located deeper in said case than the card insertion port.

4. An apparatus according to claim 2, wherein said case has an inner cover positioned between said opening portions and said card insertion port, said inner cover covering said circuit board and said first and second card storage portions from the direction of said insertion port, and having an introduction port continuous with said opening portions.

5. A portable electronic apparatus wherein a plurality of card-like electronic components are loaded/unloaded therethrough comprising:

a case having a wall in which a card insertion port is opened;

a circuit board housed in said case;

first and second card storage portions being arranged to oppose each other across said circuit board, said card storage portions each having an opening portion continuous with said insertion port, said opening portions being opened to a position located deeper in said case than said insertion port, said card-like electronic components being removably housed inside first and second card storage portions through said insertion port and said opening portions, said card-like electronic components having a distal end portion which protrudes from said opening portions to said insertion port, when said card-like electronic components are housed in said first and second card storage portions; and a card cover for opening/closing the card insertion port.

* * * * *